United States Patent [19]

Motoyama

[11] Patent Number: 5,612,952
[45] Date of Patent: Mar. 18, 1997

[54] PACKET SWITCH AND BUFFER FOR STORING AND PROCESSING PACKETS ROUTING TO DIFFERENT PORTS

[75] Inventor: Masahiko Motoyama, Kanagawa-ken, Japan

[73] Assignee: Kabushiki Kaisha Toshiba, Kanagawa-ken, Japan

[21] Appl. No.: 308,794

[22] Filed: Sep. 19, 1994

[30] Foreign Application Priority Data

Sep. 20, 1993 [JP] Japan .................................. 5-232651
Dec. 28, 1993 [JP] Japan .................................. 5-351057

[51] Int. Cl.$^6$ ...................................................... H04J 3/02
[52] U.S. Cl. .......................... 370/412; 370/428; 370/395
[58] Field of Search ................................ 370/58.1, 58.2, 370/58.3, 60, 60.1, 61, 94.1, 54, 94.2

[56] References Cited

U.S. PATENT DOCUMENTS

| 5,184,346 | 2/1993 | Kozaki et al. | 370/60 |
| 5,271,004 | 12/1993 | Proctor et al. | 370/60 |
| 5,274,641 | 12/1993 | Shobatake et al. | 370/94.1 |
| 5,280,475 | 1/1994 | Yanagi et al. | 370/60 |
| 5,410,540 | 4/1995 | Aiki et al. | 370/60 |

OTHER PUBLICATIONS

"A Shared Buffer Memory Switch for an ATM Exchange", Hiroshi Kuwahara et al., Proc. ICC, pp. 118–122, (1989).
"An Efficient Self–timed Queue Architecture for ATM Switch LSI's", Harufusa Kondoh et al., IEEE 1994 Custom Integrated Circuits Conference, pp. 637–640, (1994).

*Primary Examiner*—Wellington Chin
*Assistant Examiner*—Huy D. Vu
*Attorney, Agent, or Firm*—Finnegan, Henderson, Farabow, Garrett & Duner, L.L.P.

[57] ABSTRACT

A packet switch has a buffer memory for storing data obtained from data packets having routing tags input from a plurality of different input ports. Plural routing tag registers store the respective routing tags in the order of input. Plural address information registers respectively corresponding to the plural routing tag registers store address information representative of a buffer memory storage region where data corresponding to the routing tags are stored. A controller searches the routing tag registers in the order of their input. A reading is made of address information stored in the address information registers corresponding to routing tags for a special output port. Data stored in the storage region of the buffer memory indicated by the address information is output to the special output port. After the routing tag registers and the address information registers corresponding to the data have been output to the output port, contents of the routing tag registers and the address information registers are shifted to the next routing tag registers and address information registers in order.

20 Claims, 58 Drawing Sheets

SEQUENTIAL SEARCH CIRCUIT

PACKET SWITCH AND BUFFER FOR STORING AND PROCESSING PACKETS ROUTING TO DIFFERENT PORTS

BACKGROUND OF THE INVENTION

The present invention relates to an ATM switch for switching and processing packets having a fixed length, called ATM cells (to be hereinafter referred to as cells), and more particularly to a packet switch for carrying out a switching process on the basis of a routing tag, called a header, given to each packet having a fixed length.

An ATM switch is well known as an example of a packet switching apparatus. In order to effectively utilize memory regions for storing the cells, in general, a common buffer memory for storing the cells to each output port is provided in the ATM switch so that the cells stored in the buffer memory may be switched and processed. Such an ATM switch is also called a common buffer type switch because it stores the cells to the different output ports and switches the cells stored in the common cell buffer memory.

The conventional ATM switch is composed of a multiplexer for multiplexing cells input from each external input port, a cell buffer memory for storing the cells multiplexed by the multiplexer, a demultiplexer for multiplexing and outputting the cells stored in the cell buffer memory and for demultiplexing the cells thus multiplexed, and an address controller for controlling addresses indicative of the memory regions of the cells stored in the cell buffer memory.

The address controller is composed of address registers each provided for associated output ports for storing addresses indicative of the memory regions for writing the cells to be stored next in the cell buffer memory, a write controller for controlling each write address register, readout address registers each provided for associated output ports for storing the readout address of the cells to be output to the demultiplexer next, a readout controller for controlling each readout address register, a controller for controlling the write controller and the readout controller, and a vacant address buffer memory for storing vacant addresses.

The common buffer type switching apparatus is, in general, composed of a common buffer using a logic FIFO (First In First Out) for every output port. The common buffer of the common buffer type switching apparatus is so constructed that the addresses indicative of the memory regions storing the cells to respective output ports are connected in relation in a chain-like manner by pointers. The operation of the address controller using this structure will be described. The address of the cell, to be output next, connected by the address pointer chain for each output port is indicated by each readout address. Namely, the cell stored in the memory region designated by the address pointed out by the readout address is the oldest cell in the cells to the corresponding output port and is the cell to be output next.

When the cell stored in the address indicated by the readout address is output, subsequently, a level of the address pointer corresponding to the address is read out, the level of the address pointer is input into the readout address, and this is the address to be read out next.

Also, the header of the cell which has been newly input is analyzed by the address controller, and is stored in the memory region corresponding to the address indicated by the write address pointer corresponding to the output port. Thereafter, a vacant address is read out from the vacant address memory to become a next write address and is stored in the cell buffer memory and the write address. Thus, the logic FIFO corresponding to each output port is formed. With such an arrangement, it is necessary to effect a control for the chain-like connection by using the address pointer for each output port, and to further effect a control by providing the output address to be read out next for each output port and the write address to be written next for each output port in the form of a pair. In addition, it is necessary to provide the vacant address controller for controlling the vacant addresses in a batch manner. In view of these requirements, an overall control system is needed for these controls together.

Also, the ATM switch requires a "multi-port function". The multi-port function means a function of outputting the cell, input from an input port, to a plurality of ports. In order to realize the multi-port function in the above-described ATM switch, a method is provided in which the cell input from the input port is copied into a plurality of copies when input and is stored in the cell buffer memory. The method however suffers from a problem that a writing speed to the cell buffer memory would be N times larger than the case where the multi-port function is not provided. Also, a method is used in the conventional ATM switch, in which the addresses indicative of the memory regions which store the cells are connected in the chain-like manner by the address pointers. It is therefore impossible to branch the address pointers for transmitting the same cell to the different output ports. Thus, it would be difficult to realize the multi-port function. Also, there is another feasible method in which the input cell is repeatedly read out to the output ports when the input cell is output to the output port. In this method, the number of the readouts of the cell stored in the cell buffer memory is calculated and the cell is canceled when the cell has been output to all the copy output ports. Accordingly, in order to count the number of the readouts, a counting means is additionally needed.

Also, in the ATM switch, it is important to know how many cells stay in the cell buffer memory. For example, in a telecommunication as for audio data in which a change of a delay time would largely affect the transmission quality, it is necessary to suppress the change of the transmission delay. The conventional apparatus for canceling the cells which suffers from remarkable delay change is composed of a counter for generating a clock, a time stamp adder for adding the clock generated by the counter from each input port to the input cell, a cell switch for switching the cells output from the time stamp adder, and a cell output controller provided for each output port for calculating a difference between the time stamp information added to the cell output from the cell switch and a current time transferred from the counter and for controlling the output of the cell in response to the result of the calculation. The clock time produced by the counter is added to the cell input into this apparatus by each time stamp adder provided for each input port and is transferred to the cell switch. In the cell switch, the switching operation is carried out on the basis of the routing information added to the cell, and the result is transferred to each cell output controller provided for each output port. Each cell output controller seeks a difference between the time stamp information added to the cell and the current time produced by the counter. Each cell output controller nullifies the cell since the delay exceeds the upper limit in the case where the difference is larger than a predetermined level. Thus, it is possible to nullify the cell which suffers from a large delay. However, since the cell having the large delay generated by the ATM switch is nullified until it is transferred to the cell output controller, the cell to be nullified occupies the memory regions within the cell buffer memory of the ATM switch. Thus, disadvantageously, it is impossible to effectively utilize the memory regions for storing the cell.

As described above, there are cases that the cell transfer delay would be produced in the ATM switch. The ATM switch having a priority function for output the cell with a priority out of the accumulated cells has been conventionally proposed. In the proposed ATM switch, the priority information is added to each cell stored in the cell buffer memory of the ATM switch, and the readout of the cell is controlled on the basis of the priority information. However, it is necessary to search the cell to be output with priority while depending upon the address pointer for every output port. Thus, the conventional system suffers from a problem that the further complicated control is required, in addition to the above-described control operation.

SUMMARY OF THE INVENTION

An object of the invention is to provide a packet switch and a buffer memory in which packets routing to different output ports may be stored in the same storage means whereby switching and storage processing may be performed with a low power consumption and these functions may be readily realized, or in which a priority function for outputting a special packet with priority.

According to the present invention, in order to attain this and other objects, there is provided a packet switch for storing and switching a plurality of packets routing to different output ports, comprising:

storage means for storing at least information data obtained, respectively, from the packets composed of information data to which routing tags that have been input from a plurality of different input ports are given;

a plurality of routing tag storage means connected for storing each routing tag obtained from each of the packets, in the order of input;

a plurality of address information storage means provided in correspondence with the plurality of routing tag storage means, respectively, for storing address information representative of storage region of the storage means where at least information data corresponding to the routing tags stored in each of the routing tag storage means are stored; and control means for controlling:

searching each of the plurality of routing tag storage means in the order of input of the routing tags;

reading out the address information stored in the address information storage means corresponding to the routing tag storage means storing the routing tags corresponding to the special output port;

outputting at least information data stored in the storage region of the storage means indicated by the address information to the special output port;

shifting contents of the routing tag storage means and the address information storage means stored in and after the routing tag storage means and the address information storage means corresponding to at least information data that have been output to the output port, to the next routing tag storage means and address information storage means in order; and as a result, storing the address information read out in at least the address information storage means out of the routing tag storage means and the address information storage means which are vacant.

Furthermore, the routing tag stored in each of the routing tag storage means is composed of bit information at least corresponding to a number of the output ports and each of the routing tag storage means is so constructed that the bit information at least corresponding to the number of the output ports has bit information region where the bit information may be stored for storing the routing tag for each of the output ports. Thus, it is possible to readily attain the multi-port function in which the same information data may be output to the different output ports.

The packet switch may further include a plurality of stay length counters for counting a time from a moment when the routing tag is stored in each of the routing tag storage means corresponding to each of the routing tag storage means and each of the address storage means, wherein the control means controls comparing predetermined time information with a value of each of the stay length counters, shifting, if the value of each of the stay length counter is larger than the predetermined time information, contents of the routing tag storage means and the address information storage means stored in and after the routing tag storage means and the address information storage means corresponding to the time counter, to next routing tag storage means address information storage means in order, and as a result, storing the address information read out into the address information means of the vacant routing tag storage means and the address information storing means. Thus, the priority function to output the special packet with priority may readily be attained.

In order to attain this and other objects, according to the present invention, there is provided a buffer memory comprising:

storage means for storing at least information data obtained, respectively, from information data to which routing tags are given;

a plurality of routing tag storage means connected for storing each routing tag obtained from each of the information data, in the order of input;

a plurality of address information storage means provided in correspondence with the plurality of routing tag storage means, respectively, for storing address information representative of storage region of the storage means where at least information data corresponding to the routing tags stored in each of the routing tag storage means are stored; and control means for controlling:

searching each of the plurality of routing tag storage means in the order of input of the routing tags;

reading out the address information stored in the address information storage means corresponding to the routing tag storage means storing the special routing tags;

reading out at least information data stored in the storage region of the storage means indicated by the address information;

shifting storage contents of the routing tag storage means and the address information storage means stored in and after the routing tag storage means and the address information storage means corresponding to at least information data that have been read out, to the next routing tag storage means and address information storage means in order; and as a result, storing the address information read out in the address information storage means out of the routing tag storage means and the address information storage means which are vacant.

According to the invention, there is provided a buffer memory comprising:

storage means for storing at least information data obtained, respectively, from information data to which priority information is given;

a plurality of priority information storage means connected for storing each of priority information given to the information data, in the order of input;

a plurality of address information storage means provided in correspondence with the plurality of priority information storage means, respectively, for storing address information representative of storage region of the storage means where information data corresponding to the priority information stored in each of the priority information storage means are stored; and control means for controlling:

searching each priority information storage means in the order that the pieces of priority information have been input;

reading out the address information stored in the address information storage means corresponding to the priority information storage means storing the special priority information;

reading out at least information data stored in the storage region of the storage means indicated by the address information;

shifting storage contents of the priority information storage means and the address information storage means stored in and after the priority information storage means and the address information storage means corresponding to at least information data that have been read out, to the next priority information storage means and address information storage means in order; and as a result, storing the address information read out in the address information storage means out of the priority information storage means and the address information storage means which are vacant.

BRIEF DESCRIPTION OF THE DRAWINGS

In the accompanying drawings:

FIG. 68 is a chart showing a logic structure;

DESCRIPTION OF THE PREFERRED EMBODIMENTS

Figure 1:
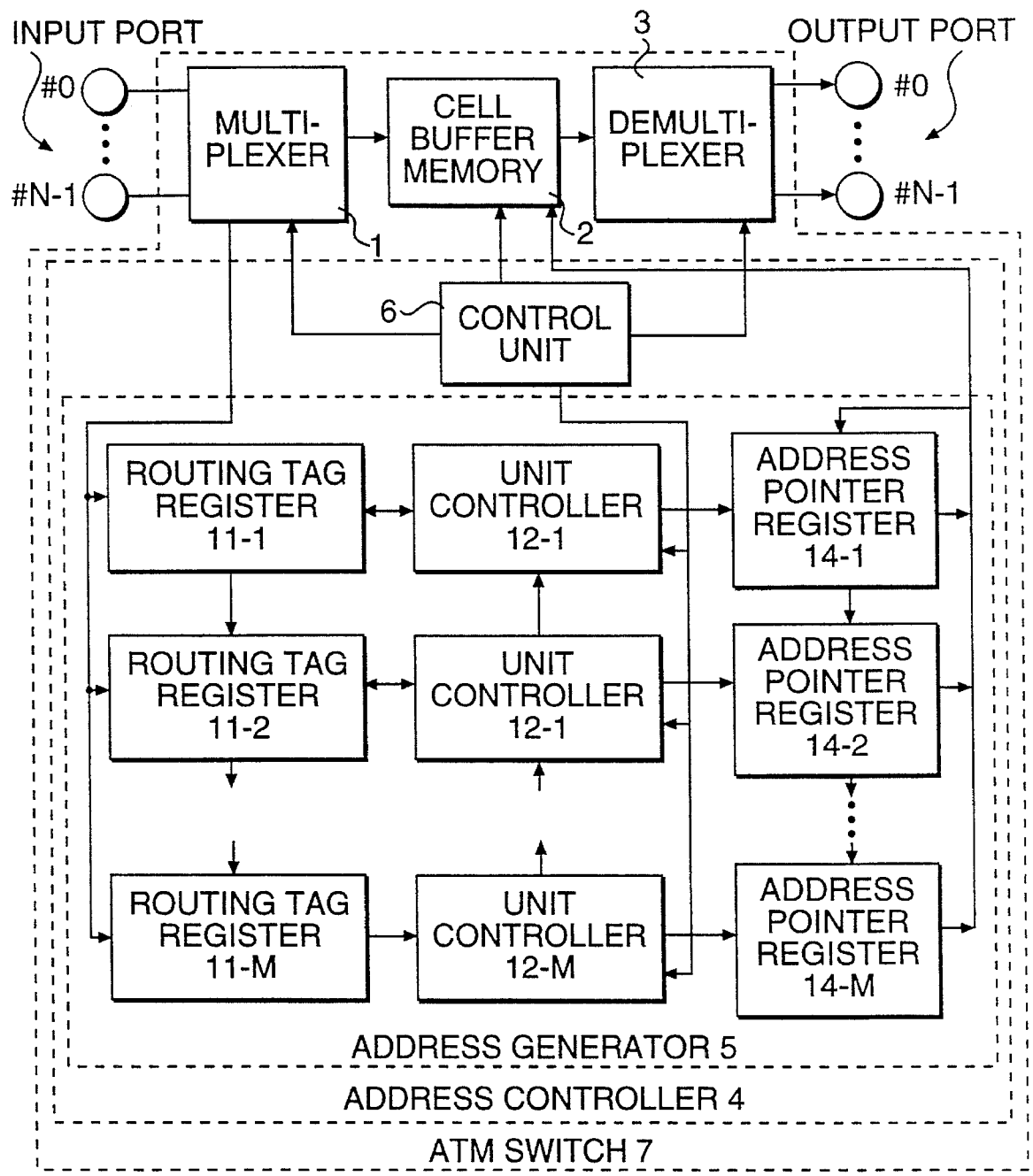
FIG. 1 is a diagram showing an overall structure of a packet switch according to the invention.

FIG. 1 is a view showing an overall structure of an ATM switch as an example of a packet switching apparatus according to the present invention. The ATM switch 7 is composed of a multiplexer 1 for multiplexing cells input from each input port #0 to #N-1, a cell buffer memory 2 for storing the multiplexed cells, a demultiplexer 3 for demultiplexing the multiplexed cells output from the cell buffer memory 2, output ports #0 to ,#N-1 connected to the demultiplexer 3 and an address controller 4 for controlling the addresses indicative of the memory region stored in the cell buffer memory 2.

The address controller 4 is composed of an address generator 5 for generating readout address and write addresses of the cells stored in the cell buffer memory 2, and a controller 6 for controlling the multiplexer 1, the demultiplexer 3, the cell buffer memory 2 and the address generator 5. The address generator 5 is composed of routing tag registers 11-1 to 11-N 11-M for storing routing tags added to the cells, respective address pointer registers 14-1 to 14-M, where the addresses indicative of the memory regions of the cells stored in the cell buffer memory 2 are stored, provided corresponding to the respective routing tag registers 11-1 to 11-N, and unit controllers 12-1 to 12-N provided for controlling, as a pair, the respective routing tag registers 11-1 to 11-N and the respective address pointer registers 14-1 to 14-N.

The operation of the ATM switch 7 shown in FIG. 1 will be explained. The cells input from the input ports =0 to #N-1 are multiplexed by the multiplexer 1. At this time, the routing tags given to the cells are transferred to the address generator 5. The address generator 5 stores the routing tags given to the cells in the vacant routing tag registers out of the routing tag registers 11-1 to 11-N. The addresses of the cell buffer memory 2 output from the address pointer registers provided to make a pair with the stored routing tag registers are output to the cell buffer memory 2. The cell buffer memory 2 stores the multiplexed cells, transferred from the multiplexer 1, respectively, into the memory regions indicated by the addresses generated by the address pointer registers of the address generator 5. When the cells are output, the address generator 5 first searches the routing tag registers for the cells routing to the output ports to which the cells are output. Then, the address generator 5 generates the addresses of the cell buffer memory 2 indicated by the address pointer registers corresponding to the routing tag registers. The generated readout addresses are transferred to the cell buffer memory 2. The cell buffer memory 2 outputs the cells stored in the readout addresses generated by the address generator 5 and transfers them to the demultiplexer 3. In the demultiplexer, the multiplexed cells transferred from the cell buffer memory 2 are demultiplexed and output to the respective output ports #0 to #N-1.

Figure 3:
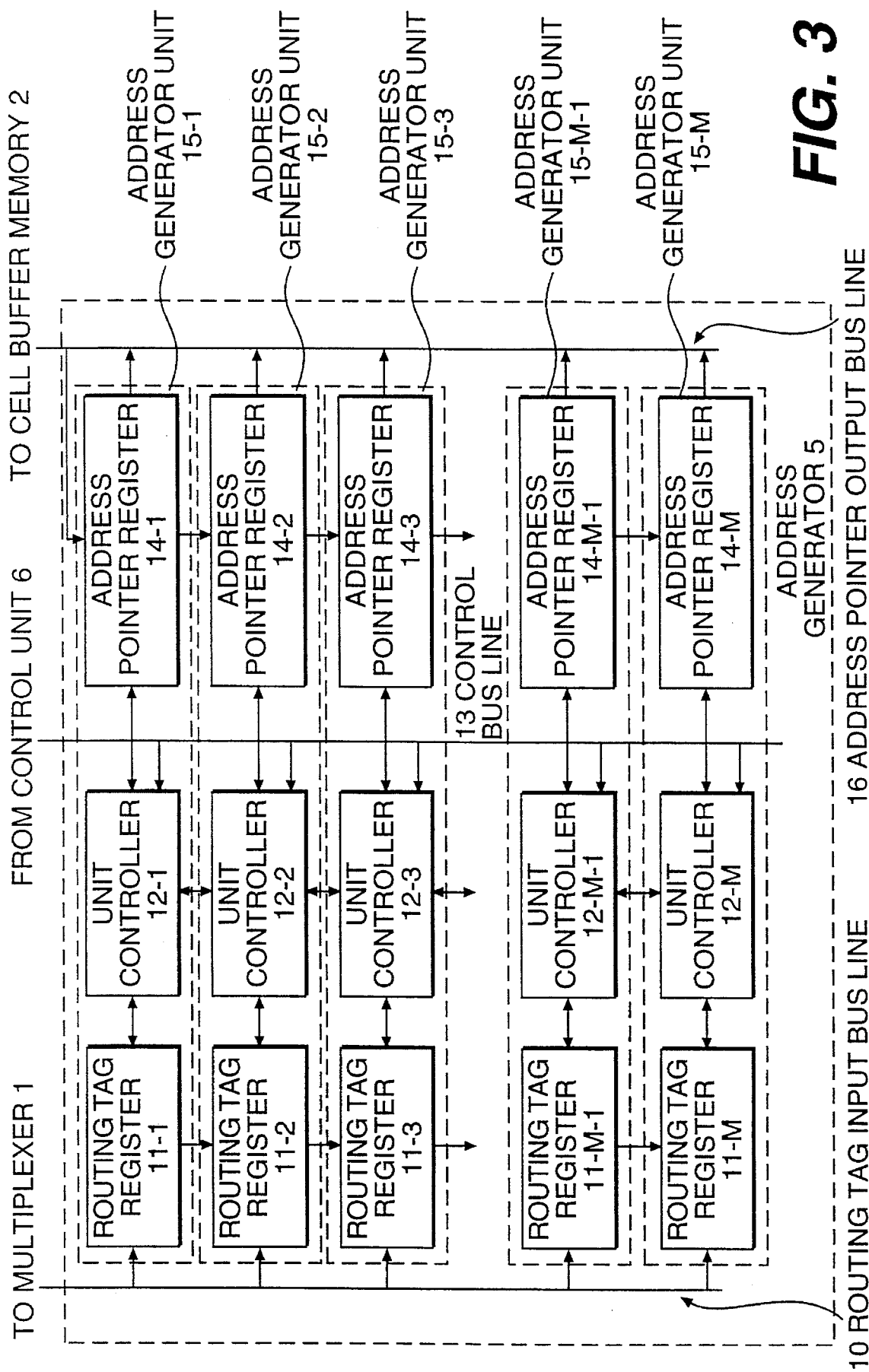
FIG. 3 is a diagram showing a structure of the address generator shown in FIG. 1.

The structure of the address generator 5 is shown in FIG. 3. The address generator 5 is so constructed that address generating units 15-1 to 15-N each composed of the routing tag registers 11-1 to 11-N, the address pointer registers 14-1 to 14-N and unit controllers 12-1 to 12-N are connected as shown in FIG. 3. The positions of the address generating units 15-1 to 15-N of the address generator 5 means the "arrival order" of the cells. In the example shown in FIG. 3, the arrival order means that the lower, the older. Namely, the routing tags of the input cells are stored from the bottom in order of the arrival. In this case, the routing tag is stored in the address generating unit 15-N. Also, if vacant regions of the routing tags are available by the output of the cells, the tags stored in the routing tag registers 11-1 to 11-N and the address pointer registers 14-1 to 14-N are shifted downwardly. Accordingly, the lower the tag, the older the tag becomes. The routing tag registers 11-1 to 11-N are registers for storing the routing tags extracted by the address controller 4. The routing tag registers 11-1 to 11-N are constituted by the registers corresponding to the respective output ports for realizing the multi-port function. Accordingly, if the number of the output ports is N, the routing tag registers are composed of N bit registers.

The address pointer registers 14-1 to 14-N are registers for storing the addresses indicative of the memory regions of the cells stored in the cell buffer memory 2. Each of the address pointer registers 14-1 to 14-N is initialized so as to correspond to the address of the cell buffer memory 2 in one-to-one relation. For example, in the case where the addresses of the cells to be stored are 0 to M-1, the values of the address pointer registers 14-1 to 14-N are each initialized 0 to M-1 like an example shown in FIG. 2.

Each of the unit controllers 12-1 to 12-N is a controller for controlling the write and output of the routing tag registers 11-1 to 11-N and the address pointer registers 14-1 to 14-N corresponding to each of the unit controllers 12-1 to 12-N on the basis of the control information transferred from the controller 6.

Figure 2:
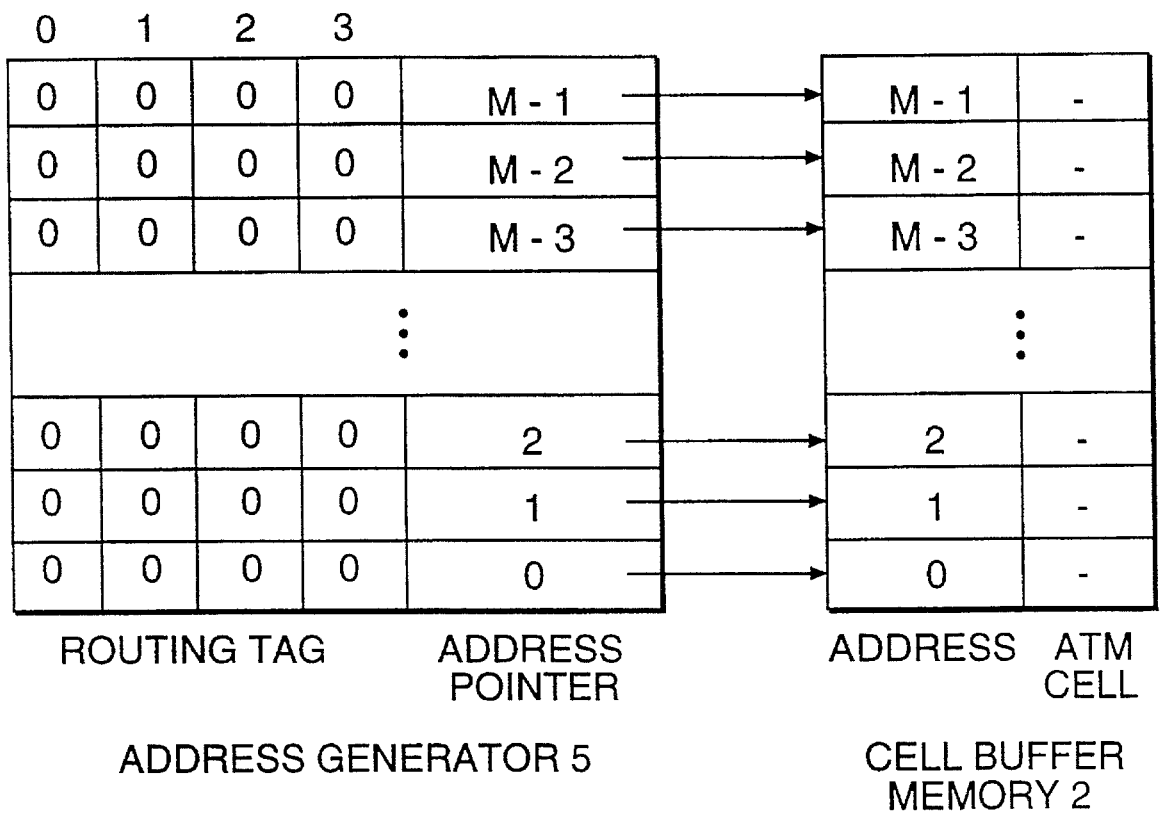
FIG. 2 is a chart showing a storage initial stage operation of the address generator and the cell buffer memory shown in FIG. 1.

The operation of the address generator 5 will now be described. It is assumed that the cell buffer memory 2 has address spaces of 0, 1, 2, . . . , M-1 where M is the number of the cells which may be stored in the cell buffer memory 2. It is assumed that the address generator 5 and the cell buffer memory 2 are initialized as shown in FIG. 2. The address generator 5 stores the values of the routing tag and the address pointer as a pair. The cells are stored in the cell buffer memory 2. FIG. 2 shows an example where the routings are four outputs of 0 to 3 (N=4). In the figure, "–" means that the content of no concern. In the initial condition, since the cells are unstable, all the cells are indicated by "–". In the example shown in FIG. 2, the values of the address pointer registers 14-1 to 14-N are stored in good order as 0, 1, 2, . . . , M-1 from below. Any order relation may be used if the addresses of the cell buffer memory 2 are in one-to-one relation with the values of the address pointer registers 14-1 to 14-N. "0000" which represents non-existence of the cell is stored as the routing tag.

Figure 4:
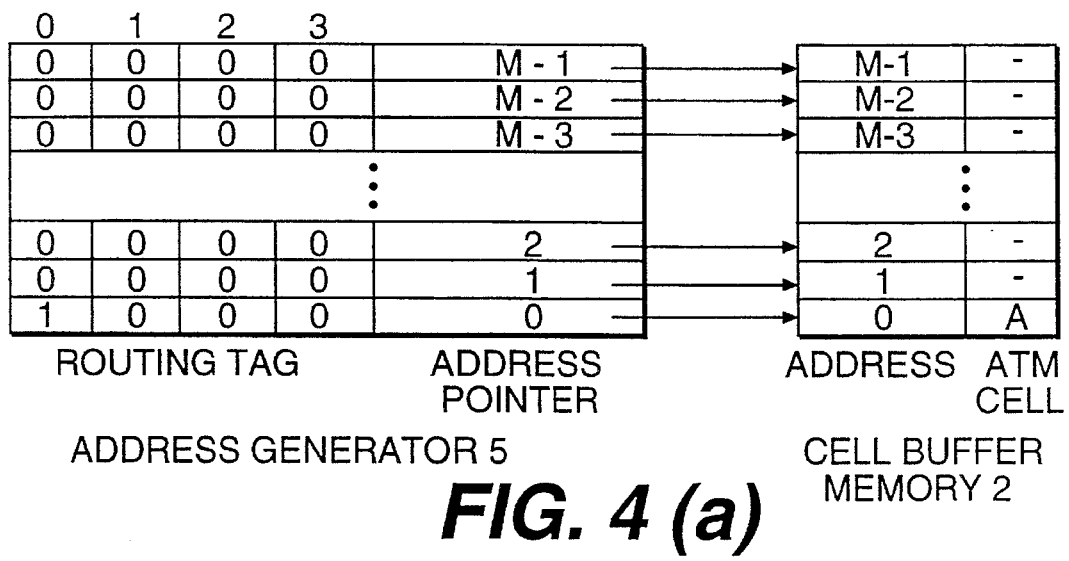
FIGS. 4(a), 4(b) and 4(c) are charts showing an example of the write operation of the address generator and the cell buffer memory.
Figure 4:
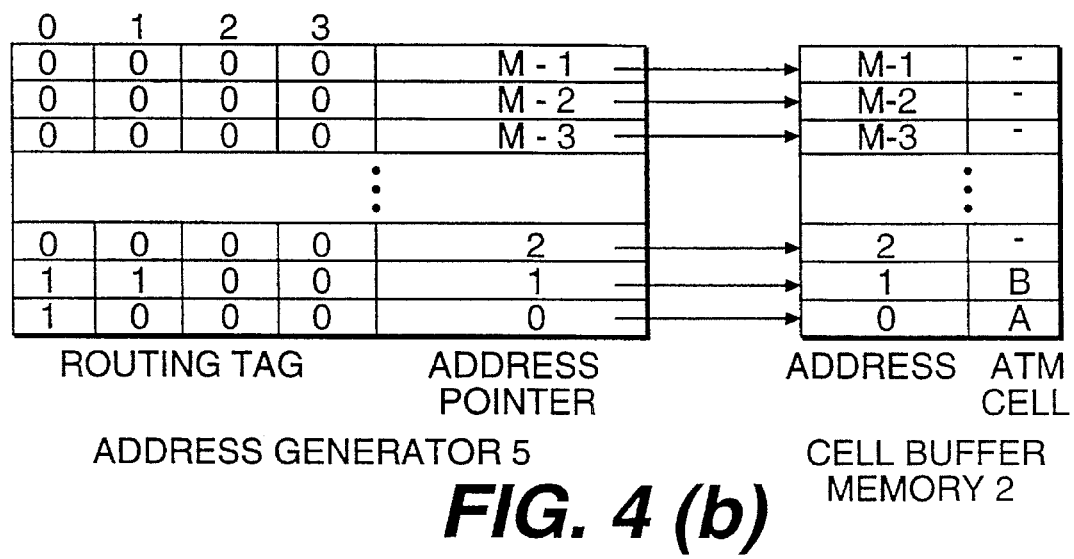
Figure 4:
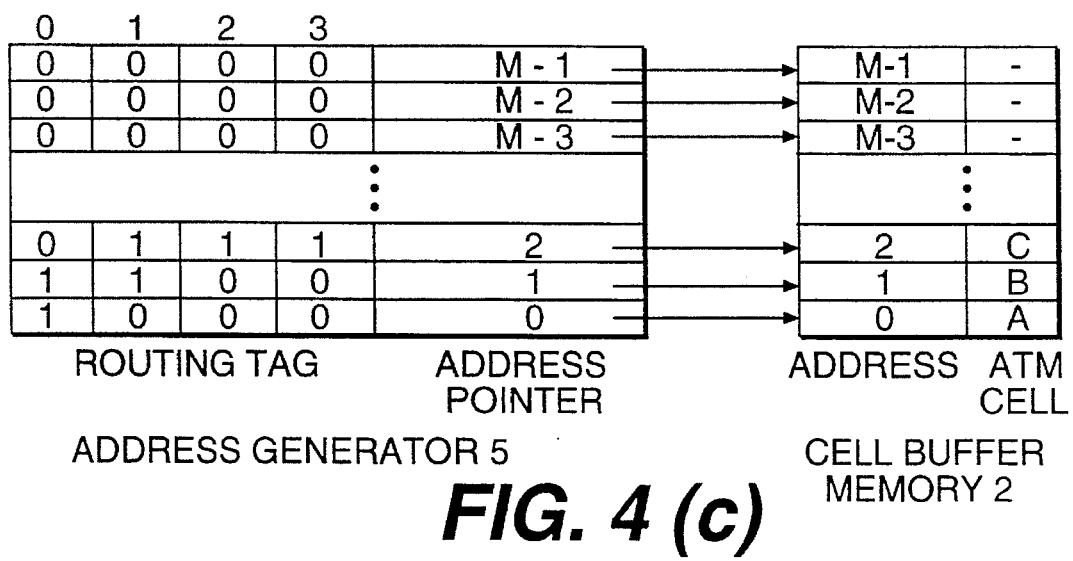
Figure 5:
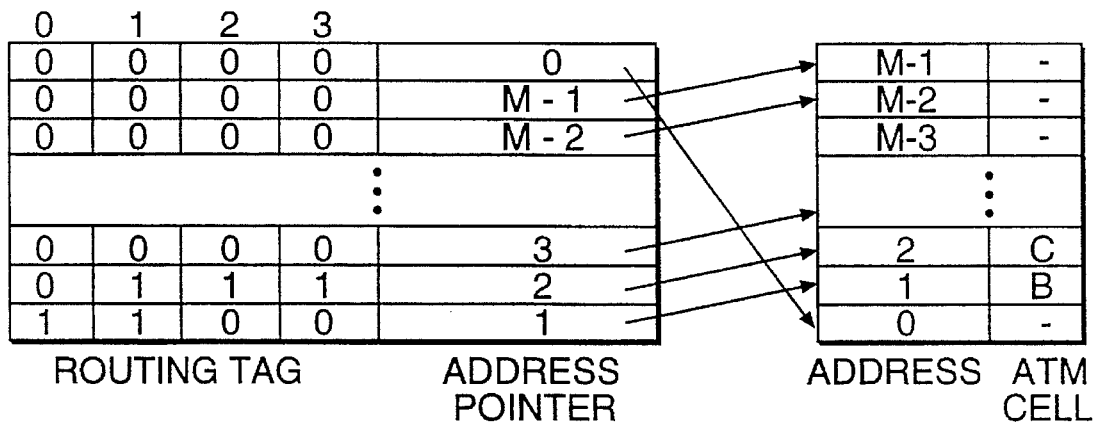
FIGS. 5(a), 5(b) and 5(c) are charts showing an example of the read operation of the address generator and the cell buffer memory.
Figure 5:
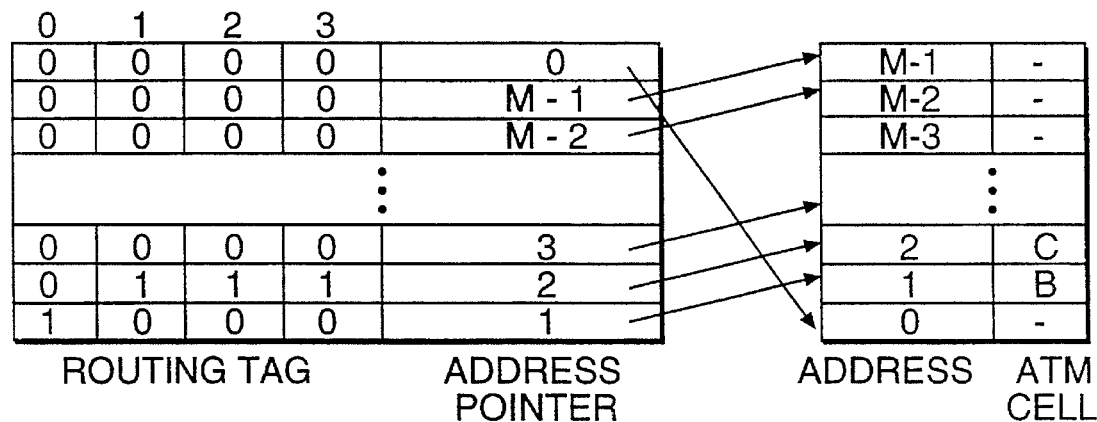
Figure 5:
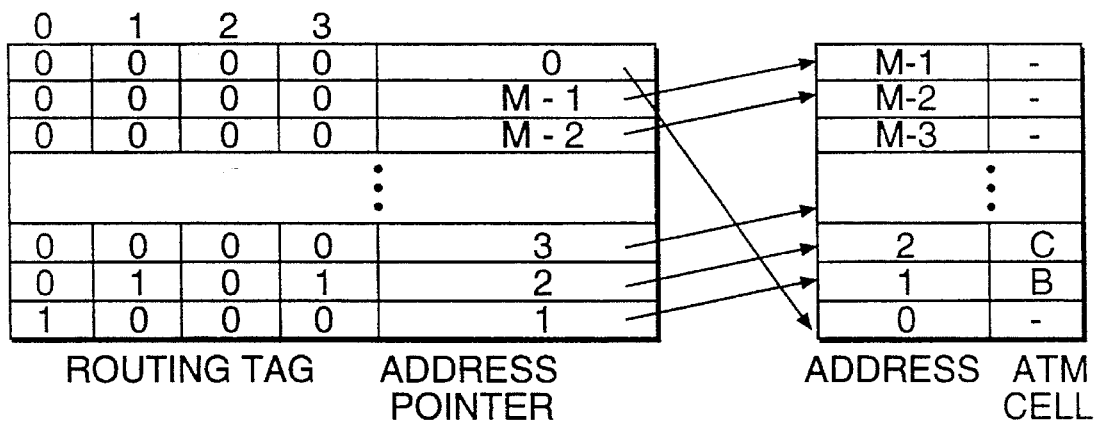

First of all, the operation will be explained when the write address is output. For example, the operation will be explained in the case where the cell A routing to the output port 0 is input in the initial condition, subsequently, the cell B routing to output ports 0 and 1 is input, and thereafter the cell C routing to output ports 1, 2 and 3 is input. First of all, the operation will be explained in the case where the cell A is input. The routing tag of "1000" (routing to the output port 0) is transferred to the address generator 5. The routing tag fed to the address generator 5 is written from the lower one of the routing tag registers 11-1 to 11-N without any space. In the initial condition, any one of the routing tag is not written. Accordingly, the input routing tag is stored in the lowermost one. The value of the address pointer registers 14-1 to 14-N of the written unit becomes the write address of the cell of the cell buffer memory 2. Accordingly, the cell A is stored in the address 0. The condition after the routing tag and the cell are written is shown in FIG. 4(a). Subsequently, the operation will be explained when the cell B having the value (routing to the output ports 0 and 1) of "1100" is input as the routing tag. The value of "1100" is transferred to the address generator 5 and is stored in the lowermost one of the vacant routing tag registers 11-1 to 11-N. Since one routing tag was already written in the address generator 5, the value of "1100" is written in the second lowest routing tag register 11-M-1. The cell B is written in the address indicated by the address pointer register 14-M-1 of the unit, i.e., the address 1. The condition after the routing tag and the cell have been written is shown in FIG. 4(b). The operation will be explained when the cell C having the value (routing to the output ports 1, 2 and 3) of "0111" is input as the routing tag. The value of "0111" is transferred to the address generator 5 and is stored in the lowermost one of the vacant routing tag registers 11-1 to 11-N. Since two routing tags were already written in the address generator 5, the value of "0111" is written in the third lowest routing tag register 11-M-2. The cell C is written in the address indicated by the address pointer register 14-M-2 of the unit, i.e., the address 2. The condition after the routing tags and the cells have been written is shown in FIG. 4(c). The operation will be explained when the readout address is output. For example, the operation will be explained in the case where the cell routing to the output port 0 is output, the cell routing to the output port 1 and the cell routing to the output port 2 is output under the condition shown in FIG. 4(c). In case of the cell output, the oldest cell is output from the cells routing to the output ports. In the address generator 5, the older routing tags are stored in order from the lowermost one in FIG. 4(c). First of all the operation will be explained in the case where the cell routing to the output port 0 is output. The oldest cell in the cells routing to the output port 0 is the cell stored in the address of the cell buffer memory 2 indicated by the lowermost routing tag register 11-N. Accordingly, the value 0 of the address pointer of the lowermost unit is transferred to the cell buffer memory 2. The cell buffer memory 2 outputs the cell A, stored in the fed address 0, to the output port #0 through the demultiplexer 3. The bit corresponding to the output port of the routing tag corresponding to the output cell is reset to zero. If zero is stored with respect to all the output ports, the information stored in the address generating units above the address generating unit in question is each shifted by one step down, and the routing tag of the address generating unit and the address pointer value are shifted to the uppermost address generating unit. The address pointer value stored at the shifted position is input into the uppermost one. Accordingly, after the cell of the routing tag A has been output, the content of the address generator 5 is changed as shown in FIG. 5(a). Subsequently, the operation will be explained when the cell routing to the output port 1 is output. Since the cell routing to the output port 0 has been output, the contents of the address generator 5 and the cell buffer memory 2 are those shown in FIG. 5(a). When the cell routing to the output port 1 is output from this condition, the unit in which the value of the register is 1 corresponding to the output port 1 is searched from the lower one to the upper one of the address generating units. In this case, the lowermost address generating unit is selected. The value of the address pointer of the lowermost address generating unit, i.e., 1 is transferred from the address generator 5 to the cell buffer memory 2. The cell B stored in the address 1 is output in the cell buffer memory 2. At this time, in the address generator 5, the register corresponding to the output port 1 is reset to zero. Since this cell is not shifted because the cell is output to the output port 0. Accordingly, after the cell routing to the output port 1 has been output, the respective contents are changed as shown in FIG. 5(b). Subsequently, the operation will be explained in the case where the cell routing to the output port 2 is output. The oldest cell of the cells routing to the output port 2 is the cell stored in the address corresponding to the second lowest unit of the address generator 5, i.e., the cell C stored in the address 2 of the cell buffer memory 2. The value 2 of the second lowest address pointer is transferred from the address generator 5 to the cell buffer memory 2. In the cell buffer memory 2, the cell C stored in the address 2 is read out, transferred to the cell demultiplexer and output from the output port 2. After the cell routing to the output port 2 has been output, the respective contents are changed as shown in FIG. 5(c). As described above, according to the present invention, it is possible to readily realize the multi-port function by the packet switching apparatus.

Figure 6:
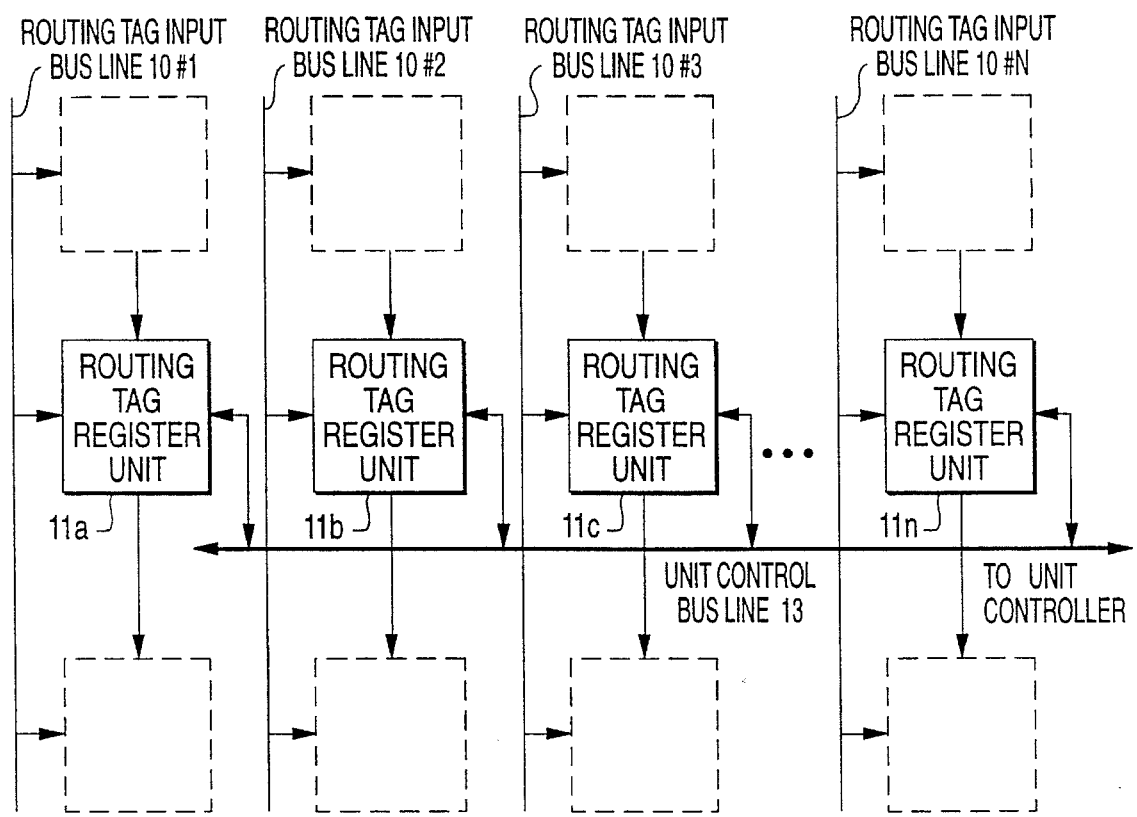
FIG. 6 is a diagram showing a structure of an address information register shown in FIG. 1.
Figure 7:
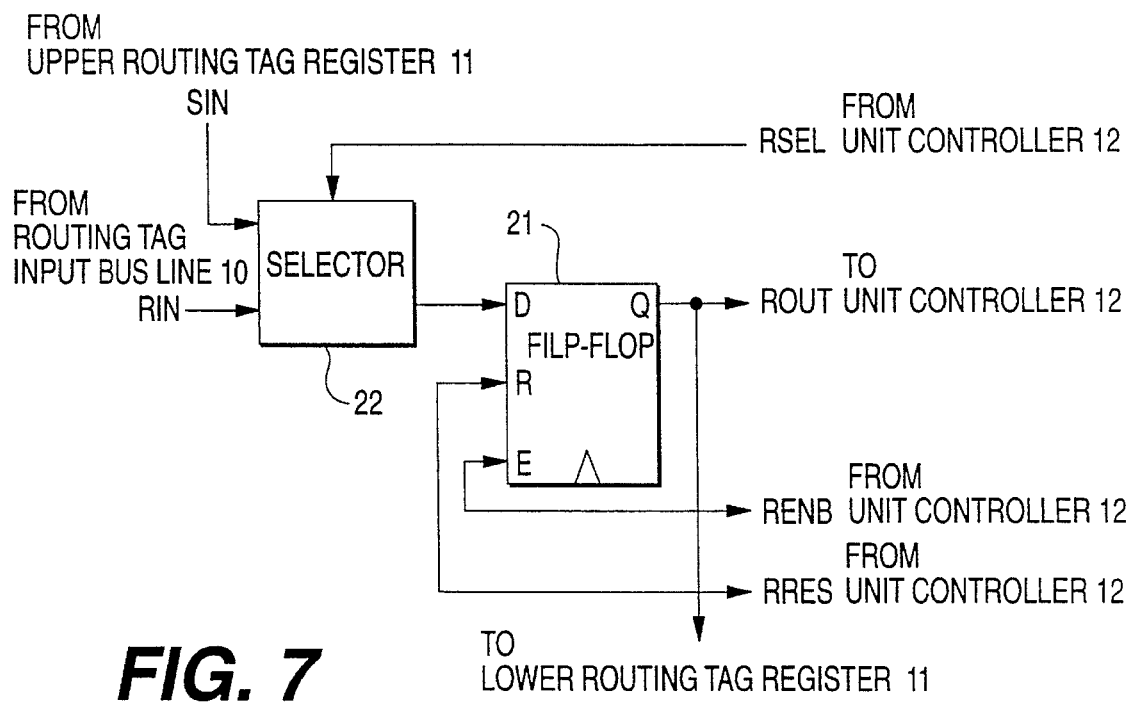
FIG. 7 is a diagram showing a structure of a routing tag register unit shown in FIG. 1.
Figure 8:
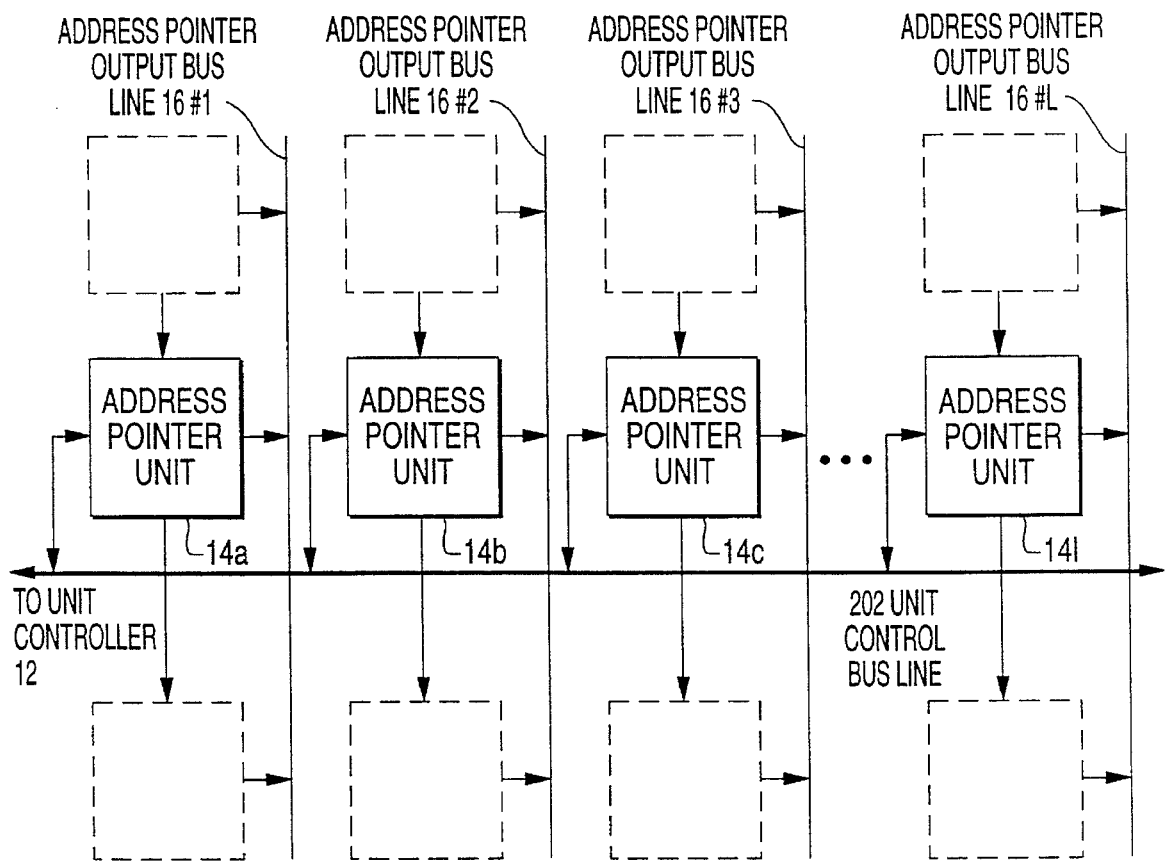
FIG. 8 is a diagram showing a structure of an address pointer register shown in FIG. 1.
Figure 9:
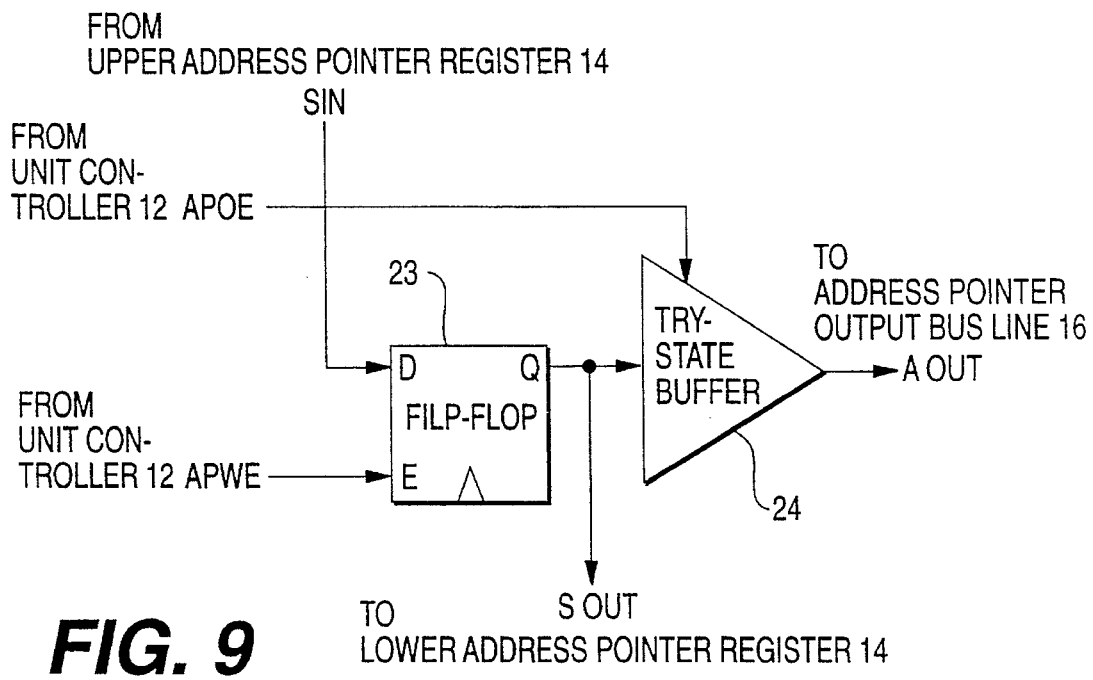
FIG. 9 is a diagram showing a structure of an address pointer register unit shown in FIG. 1.
Figure 10:
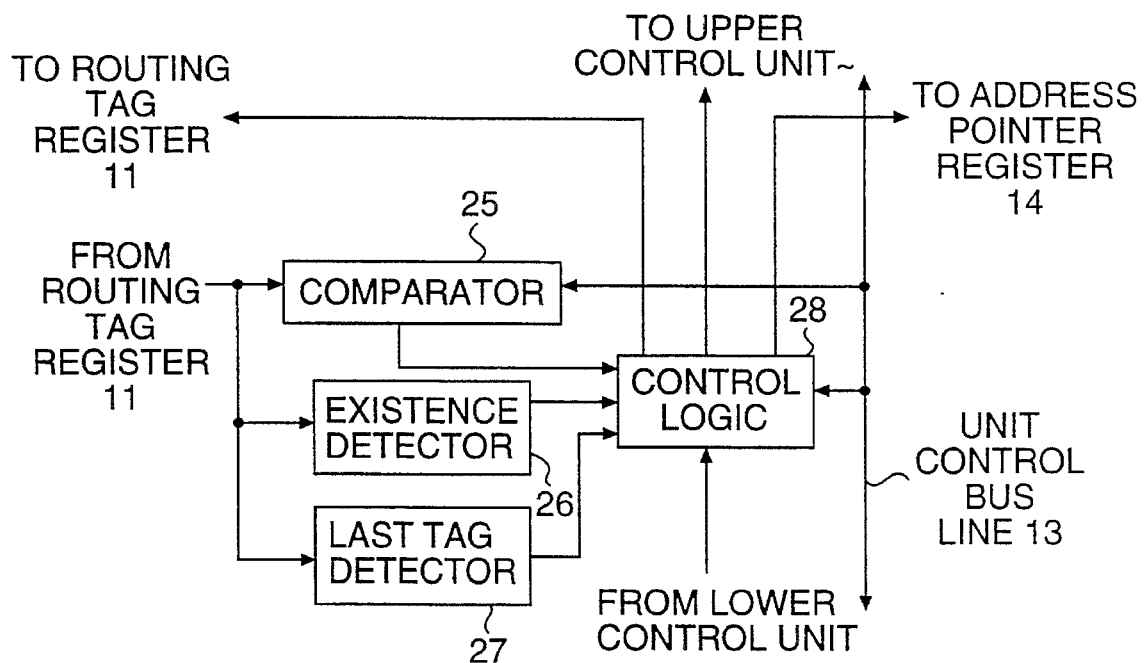
FIG. 10 is a diagram showing a structure of a unit controller shown in FIG. 1.

Subsequently, the structure of the routing tag registers 11 will be described. The structure of the routing tag registers 11-1 to 11-N is shown in FIG. 6. The routing tag registers 11-1 to 11-N are a number (N) of routing tag register units arranged as shown in FIG. 7. The respective routing tag register units 11a, 11b, ..., 11n in the routing tag registers 11-1 to 11-N are corresponding to the output ports. Accordingly, N of the routing tag register units 11a, 11b, ..., 11n are required as the same number as the output ports. The existence of the cell in the cell buffer memory 2 may be detected by calculating the logic sum (N bit) of each bit of the routing tag registers 11-1 to 11-2. When the logic sum is 1, the cell is present, whereas when the logic sum is 0, no cell is present. Thus, the existence of the cell may be detected. Furthermore, it is possible to add a bit representative of the existence of the cell to the routing tag registers 11-1 to 11-N. In the case where the bit which shows the existence of the cell is used, a circuit for detecting the existence of the cell is unnecessary. Also, it is possible to save a processing time for detection, advantageously. If the bit which shows the existence of the cell is not used, it is advantageous that the register indicative of the existence of the cell is unnecessary, and the size of the hardware may be made compact. The routing tag register units 11a, 11b, ..., 11n are composed of selectors 22 and flip-flop circuits 21 as shown in FIG. 7. In FIG. 7, SIN is the routing tag input in the shift operation, RIN is the input from a routing tag input bus line 10 in cell input, RSEL is the switching signal between RIN and SIN, ROUT is the output of the flip-flop circuit 21, RRES is the reset signal of the flip-flop circuit 21, and RENB is the write enable signal of the flip-flop circuit 21. In accordance with the instruction from the unit controller 12, the selector 22 switches the signal RIN from the input bus line and the signal SIN from the adjacent routing tag register. The flip-flop circuit 21 stores the signal switched by the selector 22 in accordance with the instruction from the unit controller 12. In the cell input, the selector 22 is instructed by the unit controller 12 so as to output the signal from the input bus line. In the non-cell input, the selector 22 is instructed to output SIN. The structure of the address pointer registers 14 will be explained. The structure of the address pointer registers 14 is shown in FIG. 8. The address pointer registers 14 are L address pointer register units 14a, 14b, ..., 14l arranged as shown in FIG. 9. The value of L by which a size of the address space of the cell buffer memory 2 is M is $\log_2 M$. The address pointer register units 14a, 14b, ..., 14l are composed of flip-flop circuits 23 for storing the values of the addresses and tristate buffers 24 for controlling the output of the values of the addresses to the address pointer output bus line. The write to the flip-flop circuit 23 and output control of the tristate buffer 24 are carried out by the unit controller 12. The write to the flip-flop circuit 23 is carried out when the cell indicated by the address pointer of the unit older than the unit (including the unit of interest) in the cell output is output and the shift operation is concomitant therewith. The output enablement of the tristate buffer 24 is executed when the corresponding unit is searched upon the cell input and output. FIG. 10 shows a structure of the unit controller 12. The unit controller 12 is composed of a comparator for comparing the routing tag of the routing tag register 11 and the routing tag to be output, an existence detector 26 for detecting whether or not the cell is stored in the address corresponding to the unit of interest, a last tag detector for detecting that a value of one stored in the routing tag register 11 is the last one tag, and a control logic 28 for generating information to be fed to the control information adjacent unit of the address pointer register 14 and the routing controller register, from the information transferred from the last one detector 27, the unit controller bus line 13 and the adjacent unit. The operation of the control logic 28 will be explained. Upon the cell input, in the case where the cell is stored in the address corresponding to the unit lower than the unit of interest and the cell is not stored in the address corresponding to unit of interest, the routing tag is written in the routing tag register, and a value of the address pointer is output to the output bus line 16. Upon the cell output, in the case where when the value of the routing tag transferred from the controller 6 to be output is compared with a value of the routing tag stored in the routing tag register 11, these values are coincident with each other, and the cell is not detected in the unit lower than the unit of interest, the value stored in the address pointer register 14 is output to the address pointer output bus line 16. In the case where the number of "1" stored in the routing tag register 11 is two or more, the register corresponding to the output port to which the value has been output is reset to zero. In the case where the number of "1" stored in the routing tag 11 is one, the value of the address pointer is output and at the same time, the shift operation of the address pointer register 14 above the output unit and the routing tag register 11 is executed.

Figure 11:
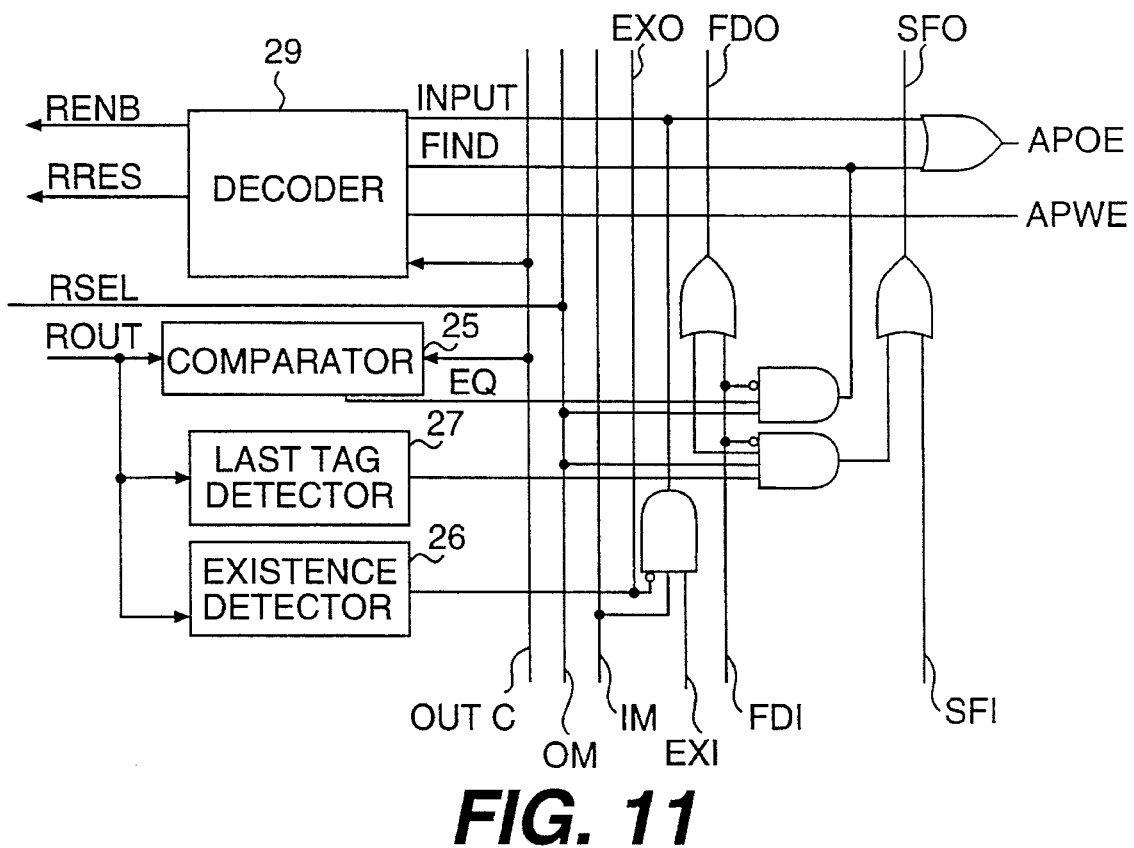
FIG. 11 is a diagram showing a detail of the structure of the unit controller shown in FIG. 1.

An example of the detailed structure of the unit controller 12 for realizing these operations is shown in FIG. 11 where RENB is the write enable signal for the routing tag register 11, RSEL is the input switching signal for the routing tag register 11, RRES is the reset signal for the routing tag register 11, ROUT is the value of the routing tag register 11, APWE is the write enable signal for the address pointer register 14, APOE is the output enable signal for the address pointer register 14, OUTC is the value of the routing tag to be output, OM is the signal representative of the output mode, IM is the signal representative of the input mode, EXI is the signal representative of the fact that the cell is stored in the address corresponding to the unit below the unit of interest, EXO is the signal representative of the fact that the cell is stored in the address corresponding to the unit of interest, FDI is the signal representative of the fact that the routing tag to be output to the unit below the unit of interest is detected, FDO is the signal representative of the fact that the routing tag to be output to the unit of interest and the unit below the unit of interest is detected, SFI is the signal representative of the fact that the routing tag to be output to the unit below the unit of interest is detected, and for instructing the shift of the units onward since the unit is vacant, SFO is the signal representative of the fact that the routing tag to be output to the unit of interest and the unit below the unit of interest is detected, and for instructing the shift of the units onward since the unit is vacant, EQ is the signal showing the fact that the routing tag of the unit of interest is coincident with the routing tag to be output, INPUT is the signal showing the fact that the routing tag is stored in the unit of interest upon the input, and FIND is the signal representative of the fact that the unit of interest is instructed to output the value of the address pointer upon the output.

The last one detector is a circuit for detecting that the routing tag stored in the routing tag register 11 of the unit is only one. A decoder 29 generates a control signal for the routing tag register 11. The decoder 29 transfers the signal representative of the write enablement to all the routing tag register units for storing the information from the routing tag input bus line into all bits of the routing tag registers 11 in the case where the routing tag is stored in the unit of interest upon the input. Upon the cell output, in the case where the unit of interest is detected and the shift operation is not carried out thereon, in order to reset only one bit corresponding to the routing tag to be output from the routing tag register 11, the decoder 29 transfers the signal representative of the write enablement only to the specified bit, and at the same time, instructs the reset only for the specified bit. Upon the cell output, in the case where the unit of interest is detected and the shift operation is carried out thereon, in order to store the content of the routing tag register 11 of the unit of one-step-up into all the bits, the decoder 29 transfers the write enable signal to all the bits. By using the address generator 5 which operates in accordance with the control of the unit controller 12 thus constructed, it is possible to easily realize the multi-port function.

A first modification of the first embodiment will be explained. The first embodiment is directed to a system in which the shift operation is carried out simultaneously with the output when the address pointer is output. In the first modification, the shift operation is not effected upon the output of the address pointer, but the shift operation is carried out in a different timing in a batch manner. The operation upon the cell input is the same as that of the first embodiment. Upon the cell output, the routing tag to be output is searched, and the value of the address pointer register 14 of the searched unit is output. At this time, only a bit corresponding to the searched routing tag register 11 is reset. The shift operation is not carried out upon the output. Accordingly, after the output of the cell, in the address generator 5, some values of the routing tag register 11 are vacant. The elimination of the vacant region means the shift operation. Upon the shift operation, the unit where the routing tag register 11 is vacant is searched out. The value of the address pointer of the unit which has been searched is output to the address pointer output bus line. The shift operation is carried out for the searched unit and the units onward (including the unit which has been searched). The address pointer which has been output to the address pointer output bus line is input to the uppermost unit, and the values of the units onward from the searched unit are shifted by one unit. This operation is repeatedly carried out so that the vacant region generated in the midway of the address generator unit may be shifted.

The explanation will be made with reference to an example of the storage contents of the address generator 5 and the buffer memory 2 shown in FIGS. 12(a) to 12(c).

Figure 12:
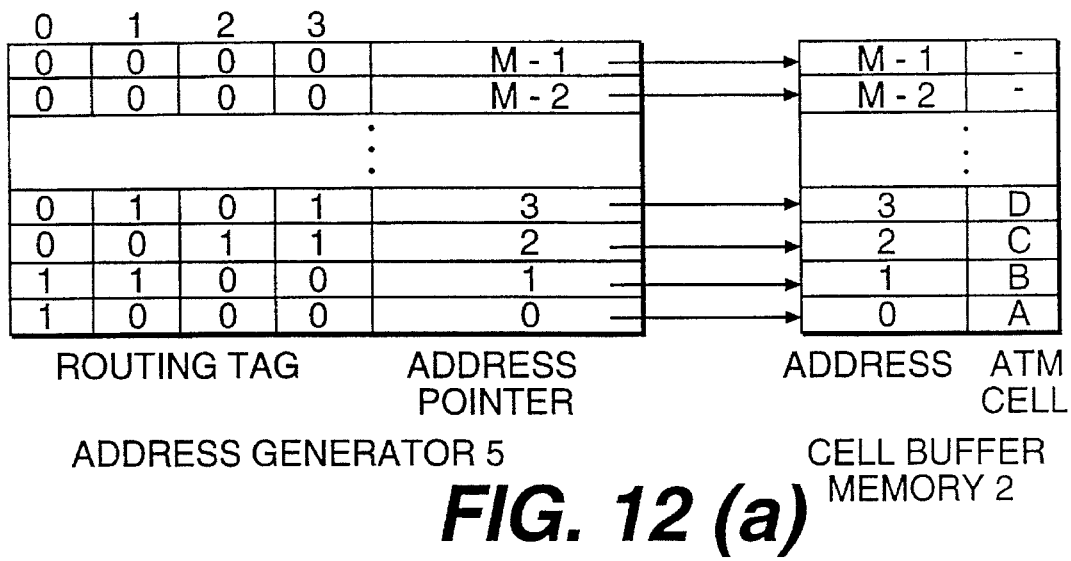
FIGS. 12(a), 12(b) and 12(c) are charts for illustrating the shift operation mode shown in FIG. 1.
Figure 12:
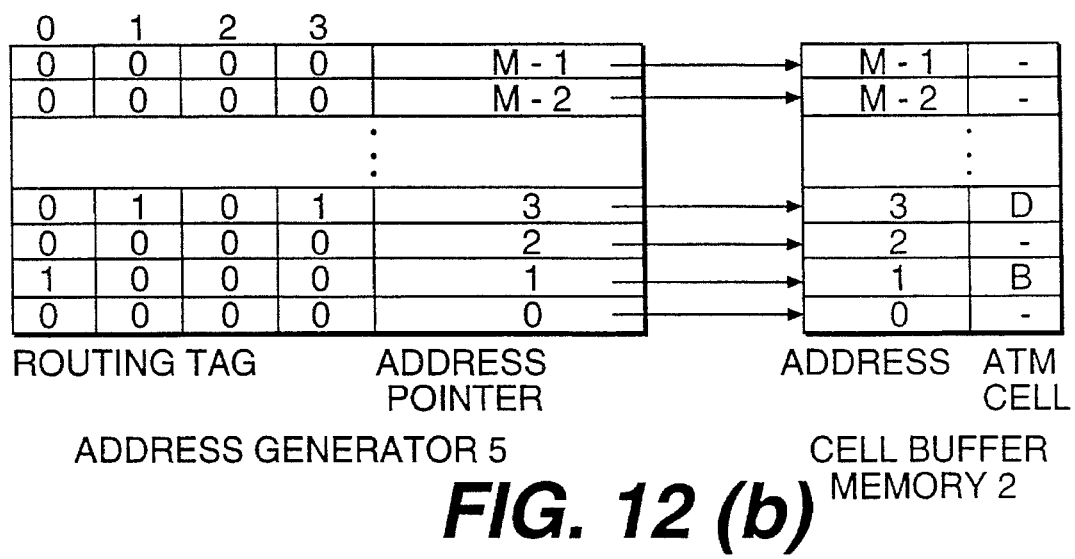
Figure 12:
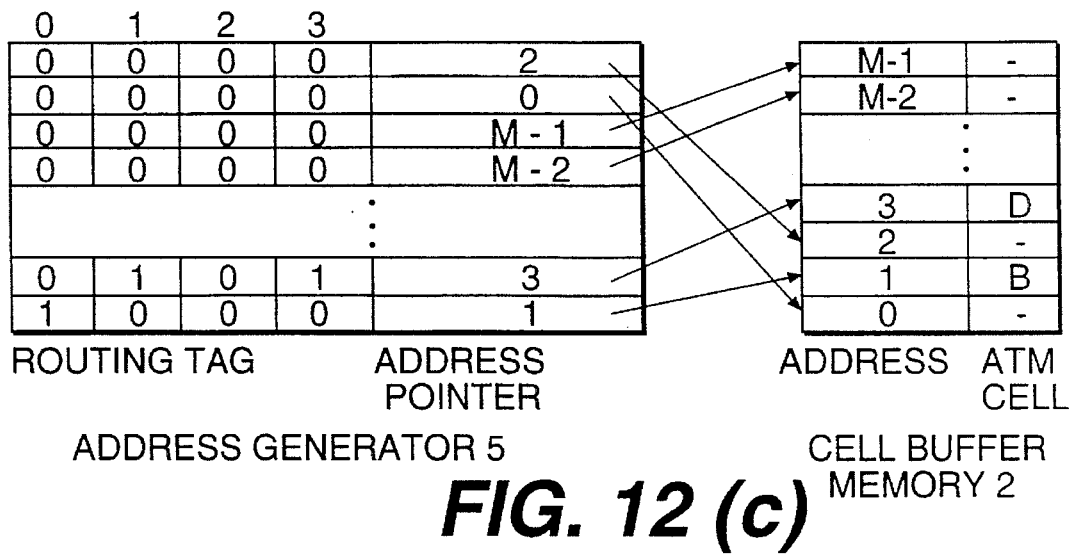

In FIG. 12(a), a cell routing to the output port 0 is stored in the lowermost address generating unit of the address generator 5, a cell routing to the output ports 0 and 1 is stored in the second address generating unit from the bottom of the address generator 5, a cell routing to the output port 2 and 3 is stored in the third address generating unit from the bottom, and a cell routing to the output ports 1 and 3 is stored in the fourth address generating unit from the bottom.

Under this condition, the cells are output in order of the output port 0, output port 1, ouput port 2 and output port 3.

In this case, the values of the address pointers corresponding, respectively, to the first, the second, the third and the third ones from the bottom are transferred to the cell buffer memory 2. Namely, the values of the address pointer to be transferred are 0, 1, 2 and 2 the cells A, B, C and C are output from the output ports 0, 1, 2 and 3 of the cell buffer memory 2, respectively.

After the cells have been output, the output routing tag registers 11 are reset, so that the condition is shown in FIG. 12(b).

The shift operation means the operation to nullify the address generator units of the address generator 5 having such vacancy. In the condition shown in FIG. 12(b), the first unit and third unit from the bottom are vacant. According to the shift operation, the value of the routing tag of the shifted unit is nullified, and the value of the address pointer is shifted to the uppermost position. In the case of the example shown, the content of the lowermost unit is shifted to the uppermost position, and subsequently, the content of the third unit from the bottom is shifted to the uppermost position. After the shift operation has been effected, the address generator 5 and the cell buffer memory 2 are changed to the condition shown in FIG. 12(c).

Figure 13:
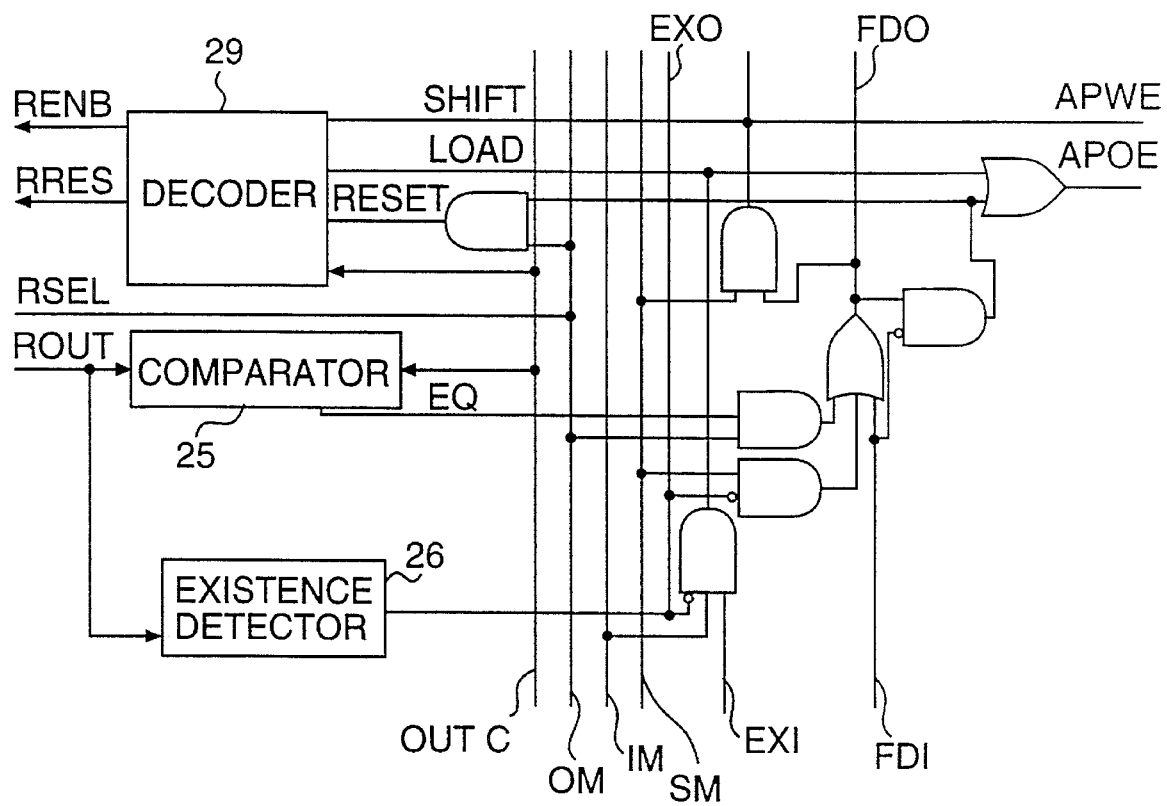
FIG. 13 is a diagram showing a structure of the unit controller for realizing the shift operation mode shown in FIG. 1.

The structure of the unit controller 12 for carrying out such an operation is shown in FIG. 13 where RENB is the write enable signal for the routing tag register 11, RSEL is the input switching signal for the routing tag register 11, RRES is the reset signal for the routing tag register 11, ROUT is the value of the routing tag register 11, APWE is the write enable signal for the address pointer register 14, APOE is the output enable signal for the address pointer register 14, OUTC is the value of the routing tag to be output, OM is the signal representative of the output mode, IM is the signal representative of the input mode, SM is the signal representative of the shift operation mode, EXI is the signal representative of the fact that the cell is stored in the address corresponding to the lower unit, EXO is the signal representative of the fact that the cell is stored in the address corresponding to the unit of interest, FDI is the signal representative of the fact that the routing tag to be output before the unit of interest is detected, FDO is the signal representative of the fact that the routing tag to be output before the unit of interest is detected, SHIFT is the signal representative of the shift operation, LOAD is the signal for instructing the writing of the routing tag from the routing tag input bus line upon the input, and RESET is the signal representative of the reset of the value of the routing tag read out upon the cell output.

When the LOAD signal or SHIFT signal is H, the decoder 29 transfers the write enablement to all the routing tags. When the RESET signal is H, the decoder 29 transfers the signal for resetting only the bit corresponding to the routing tag to be output.

With such a unit controller 12, it is possible to constitute the address generator 5 having the three operational modes of the input operation, the output operation and the shift operation.

In the address generator 5 having the shift operational mode, it is possible to dispense with the last one detector described in conjunction with the first embodiment, to thereby make small a hardware scale of the unit controller.

A second modification of the first embodiment will now be described.

Figure 14:
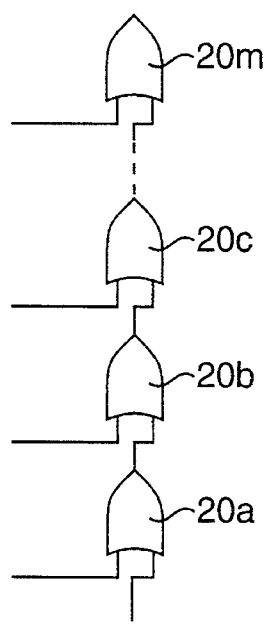
FIG. 14 is a diagram showing a sequential search circuit.

In the first embodiment and the first modification, a sequential search circuit shown in FIG. 14 is used to search the oldest cell. The search circuit is simple where OR gates 20a, 20b, ..., 20m are connected in series but it takes a long time to conduct the search. In the search circuit shown in FIG. 14, the search time is in proportion to the number M of the units.

A system where a layer structure is used for the search according to the second modification will be described. Also, the similar layer structure may be used in the output of the address pointer, and this will be described together.

The oldest cell in the cells having the same routing tag is output upon the cell output. Accordingly, the information to be required for the respective units upon the cell output is whether or not a cell to be output is present in the lower units (older units) than the unit of interest.

Assuming that the signal a (0, i) representative of the identification is written in the routing tag to be output from the i-th unit from the bottom, in order to know whether the identification has been already effected in the unit lower than the i-th unit, it is sufficient to calculate S(i–1) =a(0,0)+a(0,1)+. . . +a(0,i–1) where+means the logic sum.

Figure 15:
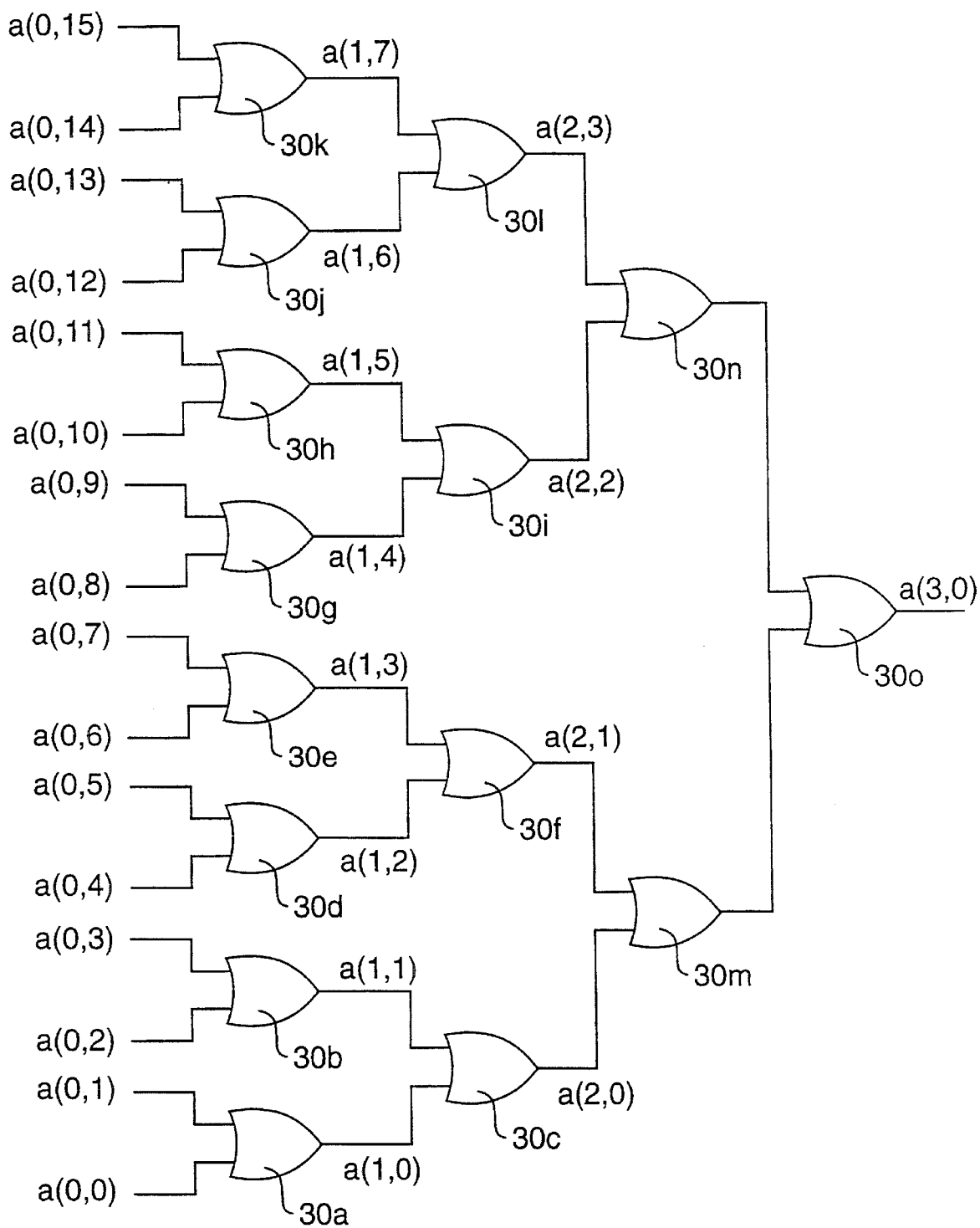
FIG. 15 is a diagram showing a tree of a logic adder circuit.

As shown in FIG. 15, in the case where logic adder circuits are connected in a layer fashion, which circuits are composed of a logic adder circuit 30a for logically adding a(0,0) and a(0,1), a logic adder circuit 30b for logically adding a(0,2) and a(0,3), a logic adder circuit: 30d for logically adding a(0,4) and a(0,5), a logic adder circuit 30e for logically adding a(0,6) and a(0,7), a logic adder circuit 30g for logically adding a(0,8) and a(0,9), a logic adder circuit 30h for logically adding a(0,10) and a(0,11), a logic adder circuit 30j for logically adding a(0,12) and a(0,13), a logic adder circuit 30k for logically adding a(0,14) and a(0,15), a logic adder circuit 30c for logically adding the outputs a(1,0) and a(1,1) of the logic adder circuits 30a and 30b, a logic adder circuit 30f for logically adding the outputs a(1,2) and a(1,3) of the logic adder circuits 30d and 30e, a logic adder circuit 30i for logically adding the outputs a(1,4) and a(1,5) of the logic adder circuits 30g and 30h, a logic adder circuit 30l for logically adding the outputs a(1,6) and a(1,7) of the logic adder circuits 30j and 30k, a logic adder circuit 30m for logically adding the outputs a(2,0) and a(2,1) of the logic adder circuits 30c and 30f, a logic adder circuit 30n for logically adding the outputs a(2,2) and a(2,3) of the logic adder circuits 30i and 30l, and a logic adder circuit 30o for logically adding the outputs of the logic adder circuits 30m and 30n, the value in each layer is a(i,j)=a(i–1,2j)+(i–1,2j+1). In consideration of this, S(i) is deformed as follows:

$$S(i)=b_0(i)\cdot a(0,x_0(i))+b_1(i)\cdot a(0,x_1(i))+\ldots +b_K(i)\cdot a(0,x_K(i)) \quad (1)$$

where K=log$_2$M $$b_j(i) = \left\lceil \frac{i+1}{2^j} \right\rceil \bmod 2$$

$$x_j(i) = \left\lceil \frac{i-2^j+1}{2^j} \right\rceil$$

i=0, . . . , M–1

When this is calculated in the case where K=4(M=16), Table 1 is given.

The value required in the i-th unit is S (i–1). Accordingly, the value required in each unit is given in Table 2.

Figure 16:
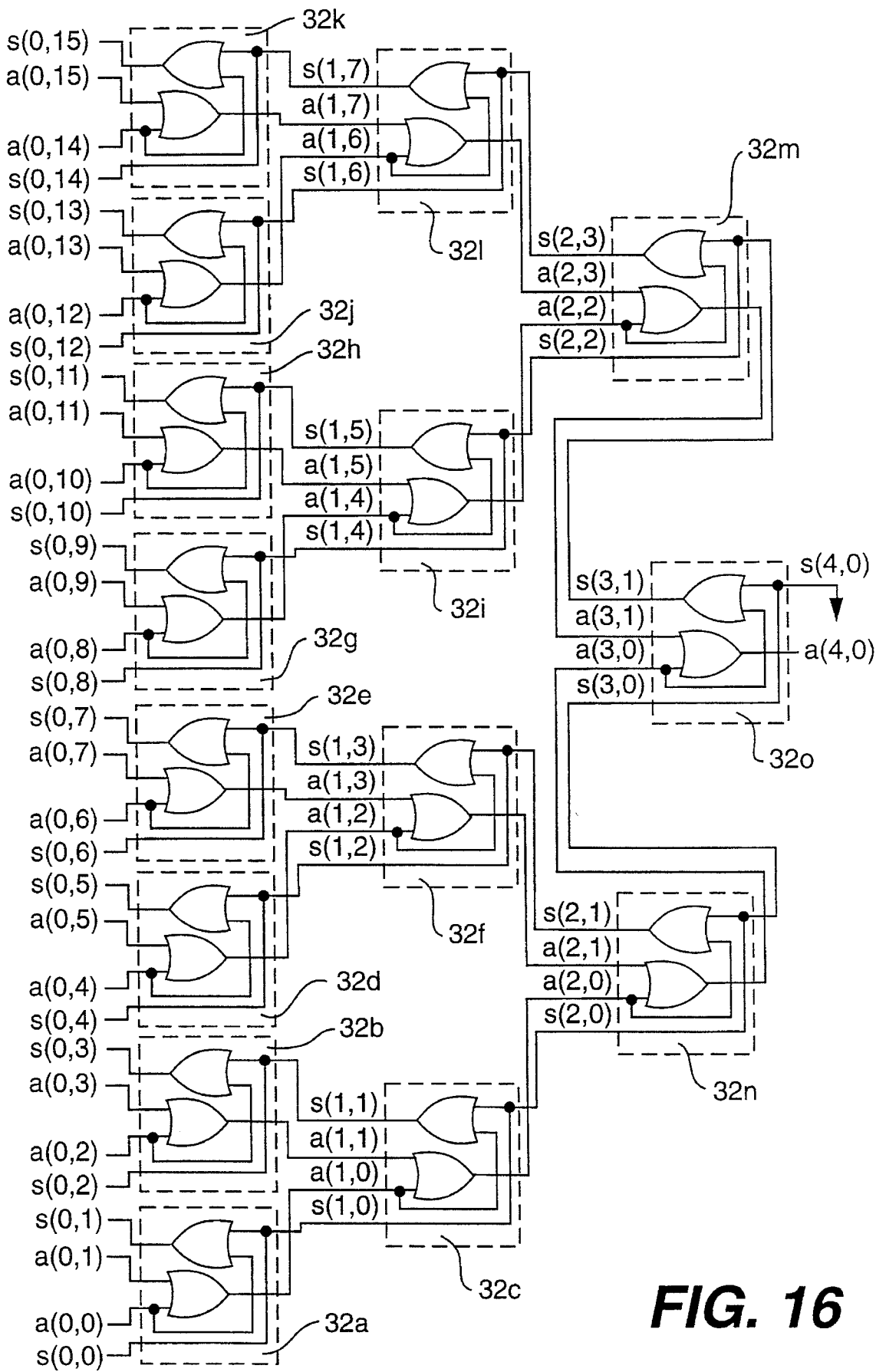
FIG. 16 is a diagram showing a tree of a logic search circuit.
Figure 17:
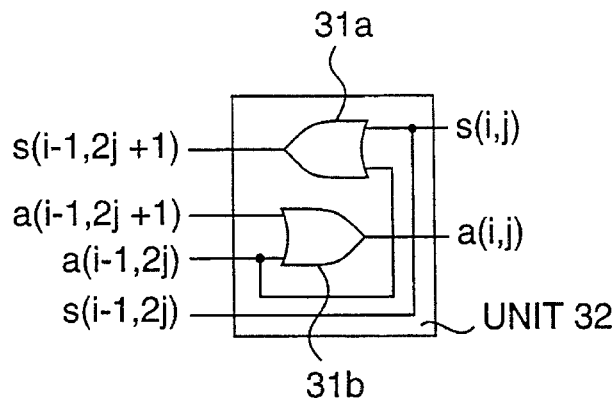
FIG. 17 is a diagram showing basic components of the tree of the logic search circuit.

A structure of the search circuit for realizing this is shown in FIG. 16. In the structure shown in FIG. 16, the units shown in FIG. 17 are connected in a tree. The structure of FIG. 17 will be explained instead of the explanation of FIG. 16. The unit 32 is basically composed of two logic adder circuits 31a and 31b. a(i–1,2j+1) and a(i–1,2j) are logically added in the logic adder circuit 31b to obtain the output of a(i,j). On the other hand, a(i–1,2j), and the outputs S (i,j) and S(i–1,2j) from the next unit are logically added in the logic adder circuit 31a to obtain the output of S(i-1,2j+1). This is the structure of the basic unit 32. In FIG. 17, $$a(i,j)=a(i-1,2j)+a(i-1,2j+1) \quad s(i-1,2j)=s(i,j)$$

TABLE 1

| | Values of S(i) (in case of K = 4) |
|---|---|
| i | S(i) |
| 0 | a(0,0) |
| 1 | a(1,0) |
| 2 | a(0,2) + a(1,0) |
| 3 | a(2,0) |
| 4 | a(0,4) + a(2,0) |
| 5 | a(1,2) + a(2,0) |
| 6 | a(0,6) + a(1,2) + a(2,0) |
| 7 | a(3,0) |
| 8 | a(0,8) + a(3,0) |
| 9 | a(1,4) + a(3,0) |
| 10 | a(0,10) + a(1,4) + a(3,0) |
| 11 | a(2,2) + a(3,0) |
| 12 | a(0,12) + a(2,2) + a(3,0) |
| 13 | a(1,6) + a(2,2) + a(3,0) |
| 14 | a(0,14)(1,6) + a(2,2) + a(3,0) |
| 15 | a(0,4) |

TABLE 2

| | Values of S(i) required in each unit (in case of K = 4) |
|---|---|
| unit | value required in S(i) |
| 0 | unnecessary |
| 1 | s(0) = a(0,0) |
| 2 | s(1) = a(1,0) |
| 3 | S(2) = a(0,2) + a(1,0) |
| 4 | S(3) = a(2,0) |
| 5 | S(4) = a(0,4) + a(2,0) |
| 6 | s(5) = a(1,2) + a(2,0) |
| 7 | s(6) = a(0,6) + a(1,2) + a(2,0) |
| 8 | a(7) = a(3,0) |
| 9 | s(8) = a(0,8) + a(3,0) |
| 10 | s(9) = a(1,4) + a(3,0) |
| 11 | s(10) = a(0,10) + a(1,4) + a(3,0) |
| 12 | S(11) = a(2,2) + a(3,0) |
| 13 | s(12) = a(0,12) + a(2,2) + a(3,0) |
| 14 | s(13) = a(1,6) + a(2,2) + a(3,0) |
| 15 | s(14) = a(0,14) + a(1,6) + a(2,2) + a(3,0) |

$$s(i-1, 2j+1) = s(i,j) + a(i-1, 2j)$$

$$s(K, 0) = 0 \quad (2)$$

$$s(j) = s(0, j-1) \quad (3)$$

The units are connected in accordance with the foregoing conditions. In this example, M is set to 6. It is possible to easily expand the application irrespective of the value of M.

Also, when the address pointer is output, the output is effected by utilizing the bus and the tristate buffer connected to the bus. This structure suffers from the disadvantage that the access to the bus is slow. In order to increase the speed of the output of the address pointer, the structure will be explained where the selectors are connected in a layer fashion.

Figure 18:
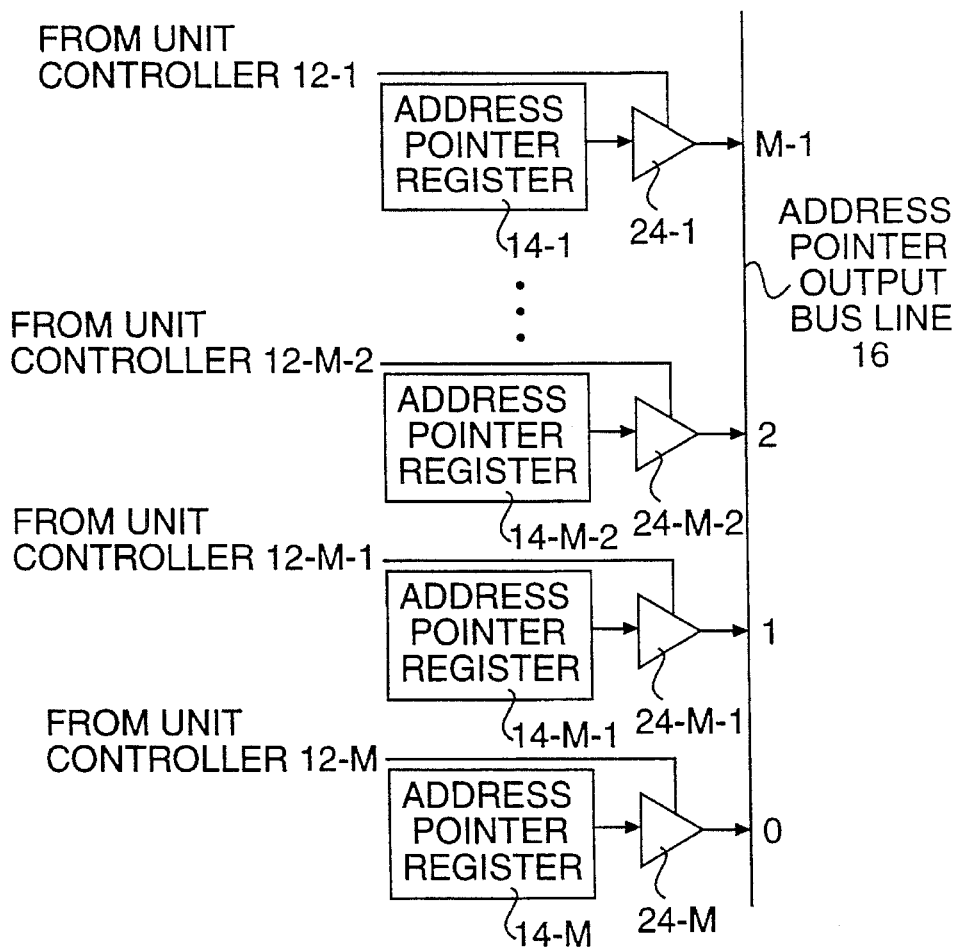
FIG. 18 is a diagram showing an output bus line access circuit.

FIG. 18 is a view showing a concept of the address pointer output circuit using the bus. As shown in FIG. 18, the addresses of the address pointer registers 14-1, . . . , 14-N are once stored in the buffers 24-1, ..., 24-N, and thereafter are output to the address pointer output bus 16 in accordance with the control signals from the respective unit controllers 12-1, . . . , 12-N.

The structure is a circuit where the value of each unit is output to the bus in accordance with an output control signal generated in the unit controller 12 of each unit. This is equivalent to the selector M=1. In general, in such a structure, the load imposed on the bus and the output circuit to the bus is increased, and it is difficult to realize the high speed operation.

Figure 19:
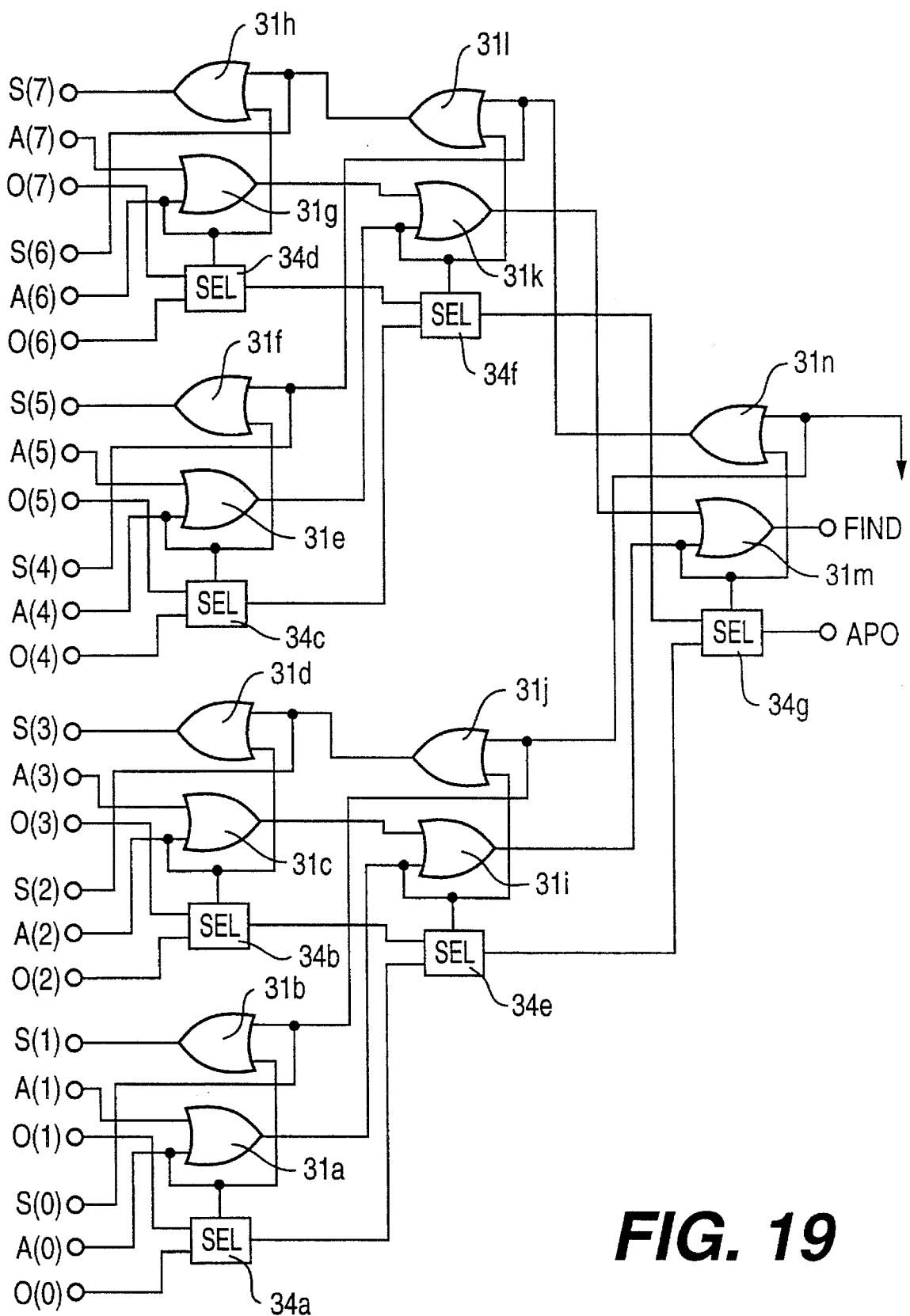
FIG. 19 is a diagram showing a layer type bus output circuit.

FIG. 19 shows an output selector circuit where a layer selector is added to a layer search circuit. In FIG. 19, O(i) is the value of the address pointer of the i-th unit, A(i) is the signal showing whether or not the i-th unit has the routing tag to be output, S(i) is the signal showing whether or not the i-th unit has the routing tag to be output to the unit older than the i-th unit, APO is the value of the address pointer to be output, and FIND is the signal representative of the existence of the cell having the routing tag to be output. For the layer search circuit of FIG. 16, selectors (SEL) 34a to 34g are connected to the unit pairs of logic adder circuits 31a and 31b, 31c and 31d, 31e and 31f, 31g and 31h, 31i and 31j, 31k and 31l and 31m and 31n, respectively. As shown in FIG. 19, the selectors (SEL) are added to thereby realize a desired operation. The selectors are 2 to 1 selectors. In the case where the address pointer to be output is present in the lower unit, the lower unit is selected. Except for this condition, the upper unit is selected. Thus, it is possible to output the lower address pointer with priority.

Figure 20:
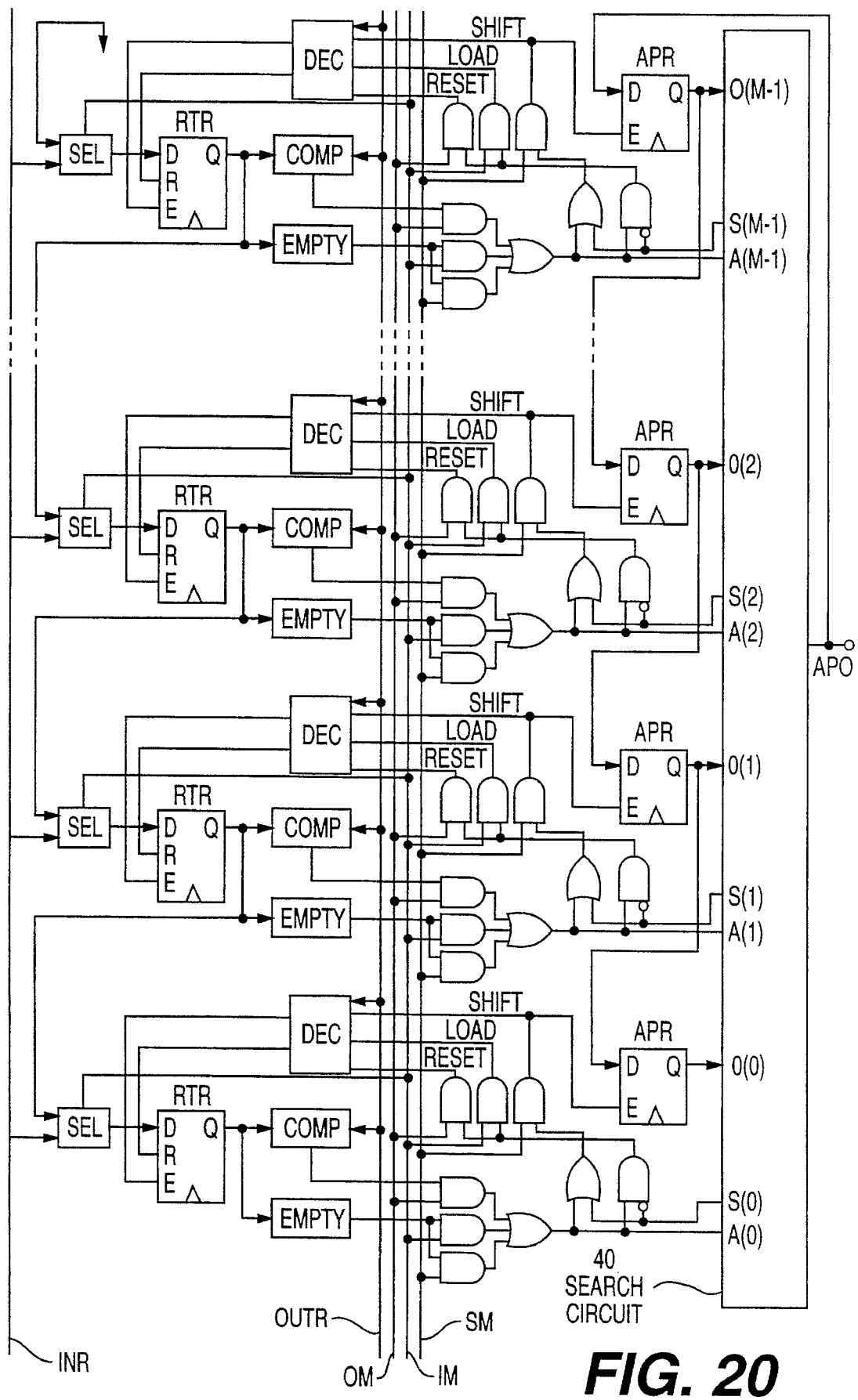
FIG. 20 is a diagram showing a structure of an address generator using the layer type search circuit and the bus output circuit.

The structure of the address generator using this circuit is shown in FIG. 20.

In FIG. 20, O(i) is the value of the address pointer of the i-th unit, A(i) is the signal showing whether or not the i-th unit has the routing tag to be output, S(i) is the signal showing whether or not the i-th unit halving the routing tag to be output to the unit older than the i-th unit is stored, APO is the value of the address pointer to be output by the search, OUTR is the value of the routing tag to be output, INR is the value of the routing tag given to the input cell, OM is the signal representative of the output mode, IM is the signal representative of the input mode, SM is the signal representative of the shift mode, RESET is the output of the value of the address pointer of the unit of interest upon the output mode and the signal for resetting the register, corresponding to OUTR, to zero, LOAD is the signal for writing the routing tag from INR to the unit of interest in the input mode, and SHIFT is the signal for instructing the shift operation over the unit of interest in the shift mode.

Also, RTR is the routing tag register, APR is the address pointer register, COMP is the comparator for comparing the value of the routing tag register and the value of the routing tag to be output, EMPTY is the vacancy detector for detecting that the meaningful routing tag is not stored in the routing tag register, SEL is the 2 to 1 selector, and DEC is the circuit for generating signals such as reset or write for each bit of the routing tag register RTR from the signals of SHIFT, LOAD, RESET and OUTR.

The search circuit 40 calculates the value of $S(i)=A(0)+A(1)+\ldots+A(i-1)$, and output the value of C,(j)to APO when $A(0)=L$, $A(1)=L$, . . . , $A(j-1)=L$ and $A(j)=H$. In APO, the address pointer output corresponds to the bus.

When the routing tag is not stored in the i-th unit in the cell input or when the value of the routing tag of the i-th unit is coincident with the value of the routing tag to be output upon the cell output, the value of A(i) becomes H level. A(i) is input into the search circuit 40.

In the cell input, the value of A(i) shows the fact that the routing tag is not stored in the i-th unit. In the cell input, in the case where the value of the routing tag from 0 to (i–1)-th units is not vacant, that is, in the case where the value of S(i) is L, the value from the routing tag input bus is stored in the i-th unit and the value of the address pointer of the i-th unit is output to APO. The value of APO is transferred to the cell buffer memory and the cell is stored in the corresponding address. In the cell output, the value of A(i) shows the fact that the value of the routing tag which the same as the routing tag to be output is stored in the i-th unit. Accordingly, the value of S(i) shows whether or not the unit having the routing tag to be output is present in the zero to (i–1)-th unit. In the case where the value of S(i) is L and the value of A(i) is H, the value of the address pointer of the i-th unit is output and the routing tags from i to M–1 units and the values of the address pointers are shifted. The value of APO is transferred to the cell buffer memory and the cell stored in the associated address is output.

In contrast to the fact that the search time of the search circuit shown in FIG. 14 is in proportion to M, if the search circuit shown in FIG. 15 is used, the search time is in proportion to $\log_2 M$. Accordingly, it is possible to improve the search time.

A third modification of the first embodiment will be explained. This modification relates to a switch structure for realizing a "trunk grouping".

The trunk grouping means a technique for handling a plurality of wiring lines as if they were a single, wire.

Figure 21:
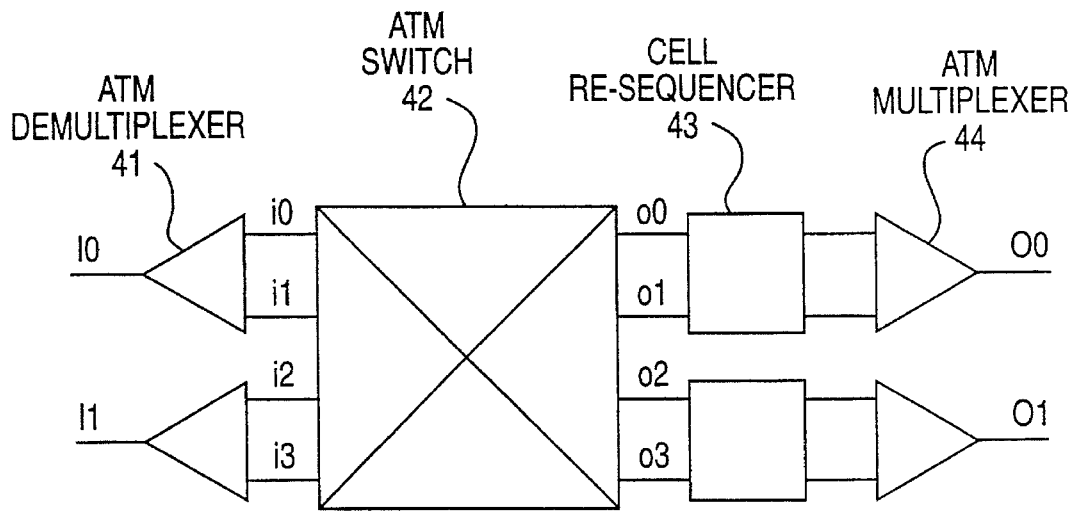
FIG. 21 is a diagram showing a feasible example of a trunk grouping function.

An example of an apparatus for realizing the trunk grouping function is shown in FIG. 21. The apparatus is composed of cell demultiplexer 41 for demultiplexing the input cell stream, a cell switch 42 for switching the demultiplexed cells, cell order aligning circuits 43 and cell multiplexers 44. The apparatus shown in FIG. 21 is an example for realizing the two-input tow-output type cell switch by using the four-input four-output type cell switch. I0 and I1 are the input interface having an operational speed twice higher than that of the cell switch interface, and O0 and O1 are the output interface having an operation speed twice higher than that of the cell switch interface of the cell switch 42. i0, i1, i2 and i3 are the input interfaces of the cell switch 42, o0, o1, o2 and o3 are the output interfaces of the cell switch 42.

Figure 22A:
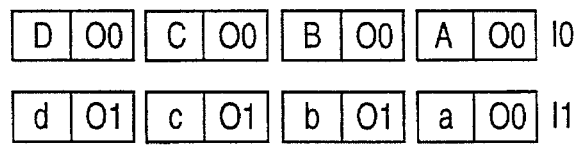
FIGS. 22(a), 22(b), 22(c) and 22(d) are charts showing the trunk grouping function.

For the sake of illustrating the operation of the apparatus, the case where the cell is input as shown in FIG. 22(a) will be explained.

Figure 22B:
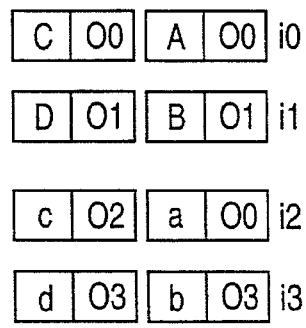
Figure 22C:
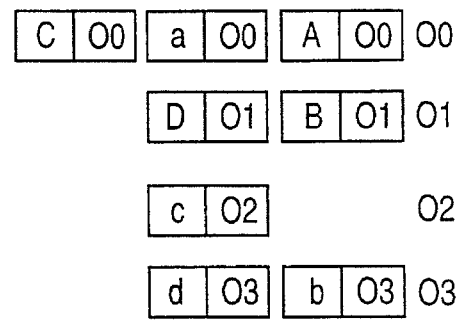
Figure 22D:
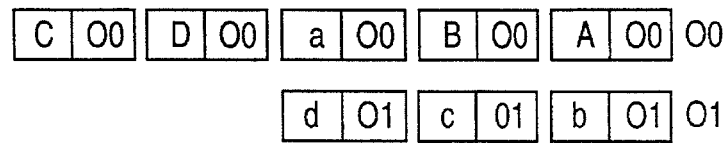

In this example, the cell A routing to output O0, the cell B routing to output O0, the cell C routing to output O0, and the cell D routing to output O0 are input in order from the input I0, and the cell a routing to output O0, the cell b routing to output O0, the cell c routing to output O0, and the cell d routing to output O0 are input in order from the input I1. The thus input cell stream is divided into two by cell demultiplexer 41 as shown in FIG. 22(b). The cell stream divided by the cell demultiplexer 41 is switched in accordance with each routing tag by the cell switch 42 as shown in FIG. 22(c). When such switched cells are input into the cell multiplexer 44, the order of the cells C and D are reversed as shown in FIG. 22(d).

In order to avoid such an interchange of the cells, the cell order aligning circuit 43 is used. The cell order aligning circuit 43 serves to temporarily store the cells and aligning the order of the cells in accordance with, for example, information such as time stamp.

According to this method, an extra circuit is needed, and it is necessary to store the cells in order to align the order, so that the time delay is remarkable.

According to this embodiment, the trunk grouping function is realized in the cell switch 42.

The cells input from the same trunk group have to be switched without changing the order. The operation of the address generator 5 will be explained where the trunk grouping is realized.

This operational example is the case where the output port 0 and the output port 1 are grouped into the output group 0 and the output port 2 and the output port 3 is not grouped.

Figure 23A:
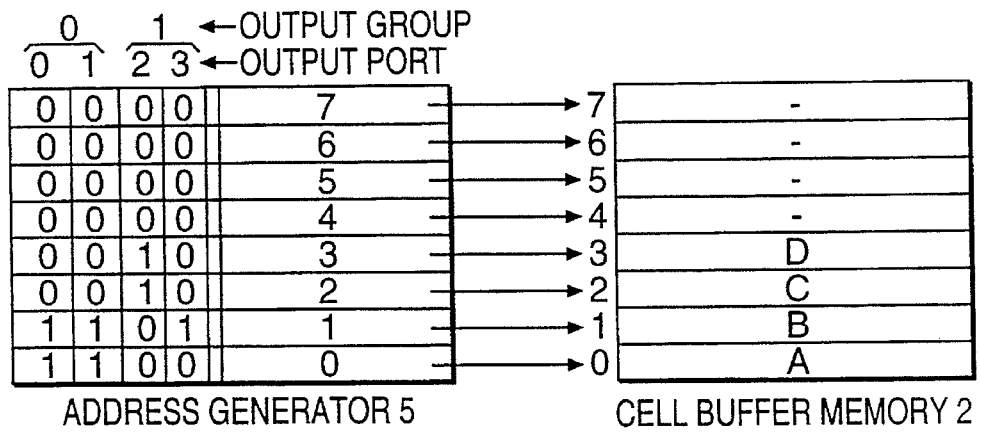
FIGS. 23(a), 23(b), 23(c), 23(d), 23(e) and 23(f) are charts showing the operation of the address generator in the trunk grouping.

Assume that FIG. 23(a) show the initial condition. Namely, the oldest cell A is routed to the output group 0, the second oldest cell B is routed to the output group 0 and the output port 3, the third oldest cell C is routed to the output port 2 and the fourth oddest cell D is outport port 2.

For the routing tag of the cell trunk-grouped and routing to the output, 1 is written in both bills of the grouped output ports. Accordingly, the routing tag of the cell routing to the output group 0 is "1100".

In FIGS. 23(a), the operation is shown where the cells are output in order of the output group 0, the output group 0, the output port 2 and the output port 3 from this condition.

Figure 23B:
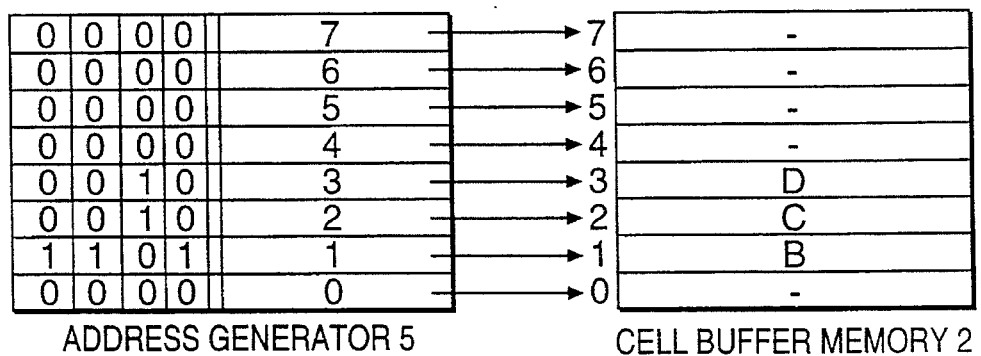

The operation will first be explained where the cell routing to the output group 0 is output. The oldest cell in the cells routing to the output group 0 is the cell stored in the lowermost unit of the address generator 5. Accordingly, the lowermost unit is searched, the address 0 is transferred from the address generator 5 to the cell buffer memory 2, the cell A is output from the cell buffer memory 2 and the this is output from the output port 0. At this time, the bit corresponding to the output group 0 of the routing tag register 11 of the address generator 5 is reset (see FIG. 23(b)).

Figure 23C:
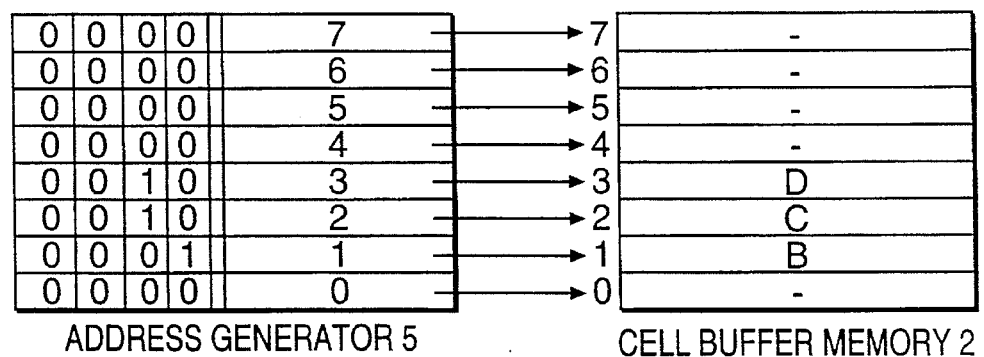

The operation will next be described where the cell routing to the output group 0 is output. The second oldest cell in the cells routing to the output group 0 is the cell stored in the second lower unit from the bottom of the address generator 5. Accordingly, the second unit from the bottom is searched, the address 1 is transferred from the address generator 5 to the cell buffer memory 2, the cell B is output from the cell buffer memory 2 and the this is output from the output port 1. At this time, the bit corresponding to the output group 0 of the routing tag register 11 of the address generator 5 is reset (see FIG. 23(c)).

Figure 23D:
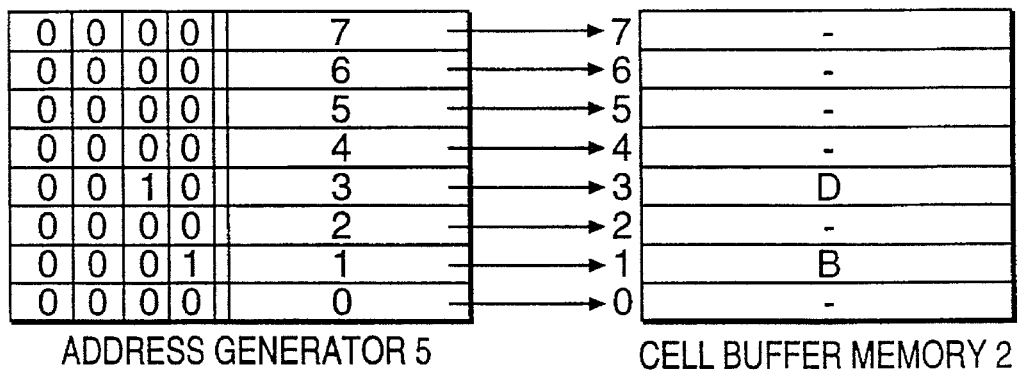

The operation will next be described where the cell routing to the output port 2 is output. The oldest cell in the cells routing to the output port 2 is the cell stored in the third unit from the bottom of the address generator 5. Accordingly, the third unit from the bottom is searched, the address 2 is transferred from the address generator 5 to the cell buffer memory 2, the cell C is output from the cell buffer memory 2 and the this is output from the output port 2. At this time, the bit corresponding to the output port 2 of the routing tag register 11 of the address generator 5 is reset (see FIG. 23(d)).

Figure 23E:
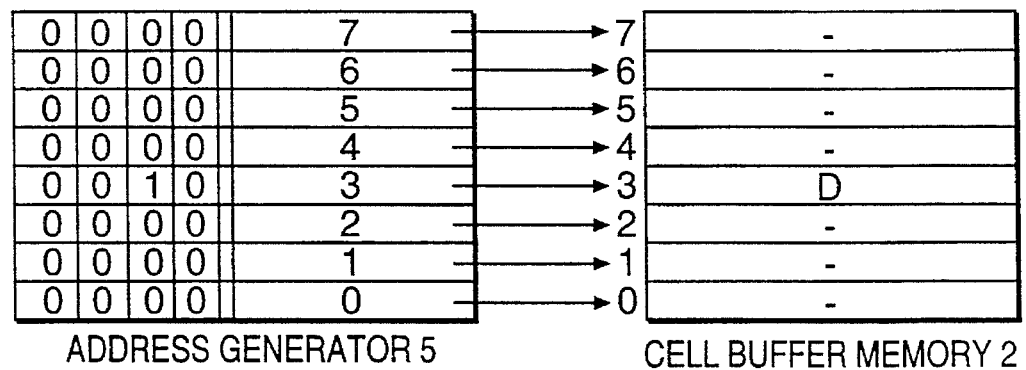

The operation will next be described where the cell routing to the output port 3 is output. The oldest cell in the cells routing to the output port 3 is the cell stored in the second unit from the bottom of the address generator 5. Accordingly, the second unit from the bottom is searched, the address 2 is transferred from the address generator 5 to the cell buffer memory 2, the cell B is output from the cell buffer memory 2 and this is output from the output port 3. At this time, the bit corresponding to the output port 3 of the routing tag register 11 of the address generator 5 is reset (see FIG. 23(e)).

Figure 23F:
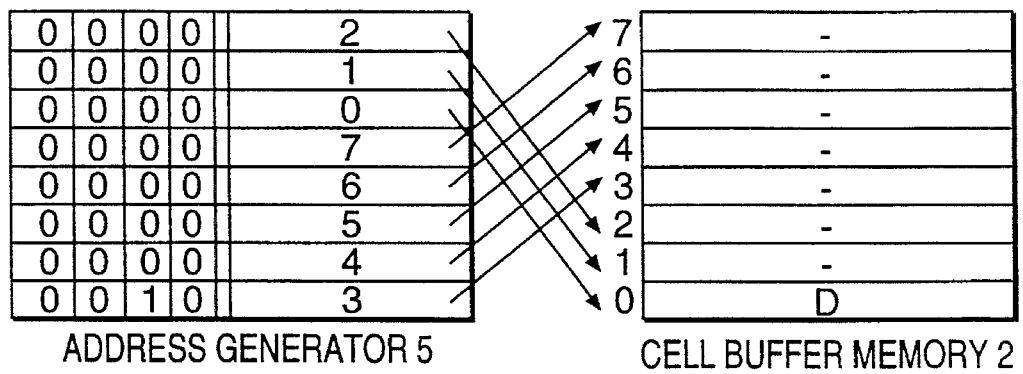

Under this condition, the vacant units are nullified. The condition is changed to that shown in FIG. 23(f).

Figure 24:
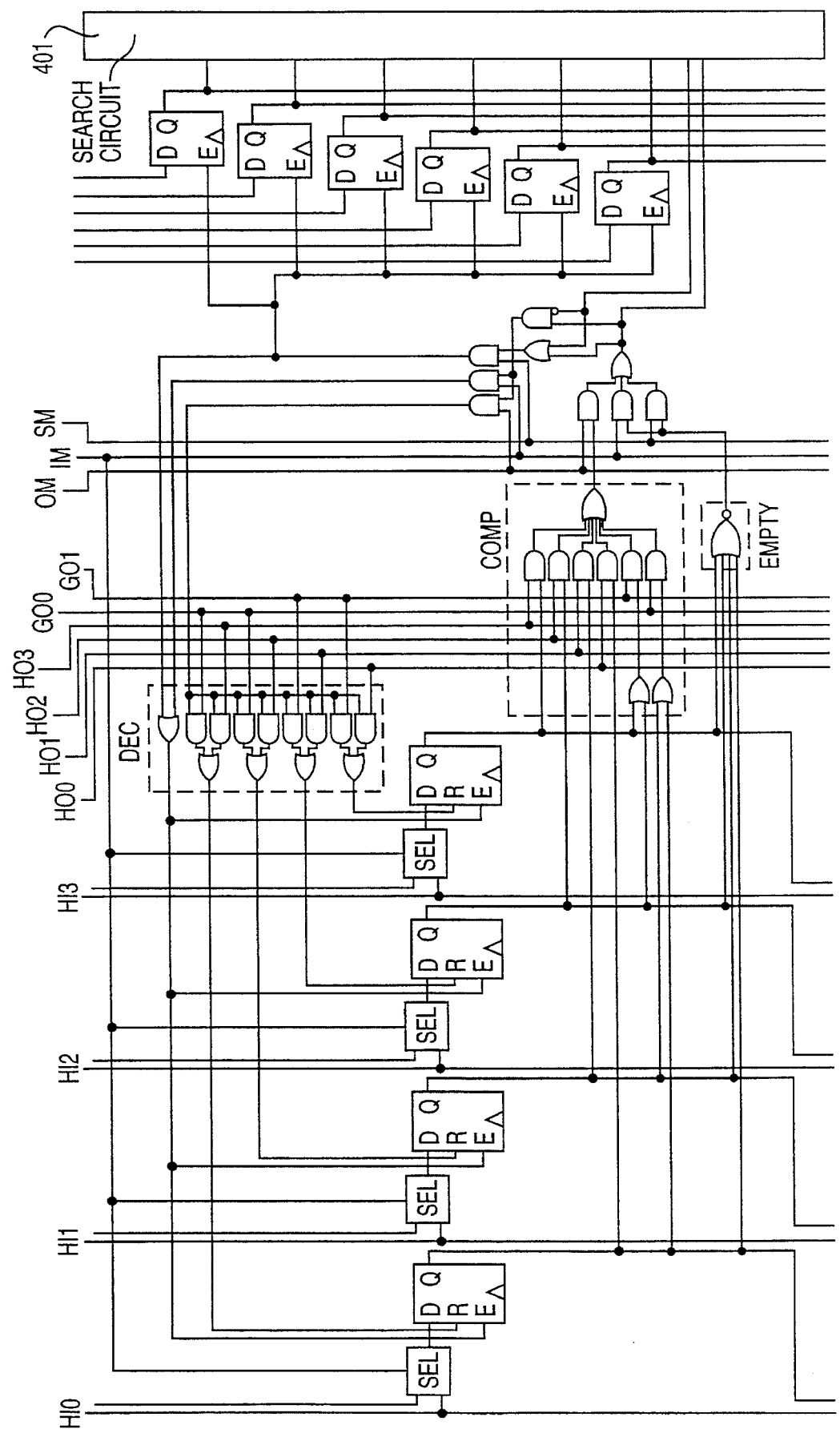
FIG. 24 is a diagram showing a structure of the address generator for realizing the trunk grouping operation.

An example of the structure of the address generator 5 for realizing such an operation is shown in FIG. 24.

This embodiment represents one example of the address generator 5 of the four-input four-output cell switch 42. The apparatus shown is an example for realizing two trunk groups.

This is different in the structure of the comparator COMP and the decoder DEC for generating the control signal of the routing tag register from the address generator 5 where the trunk grouping is not effected.

Figure 25:
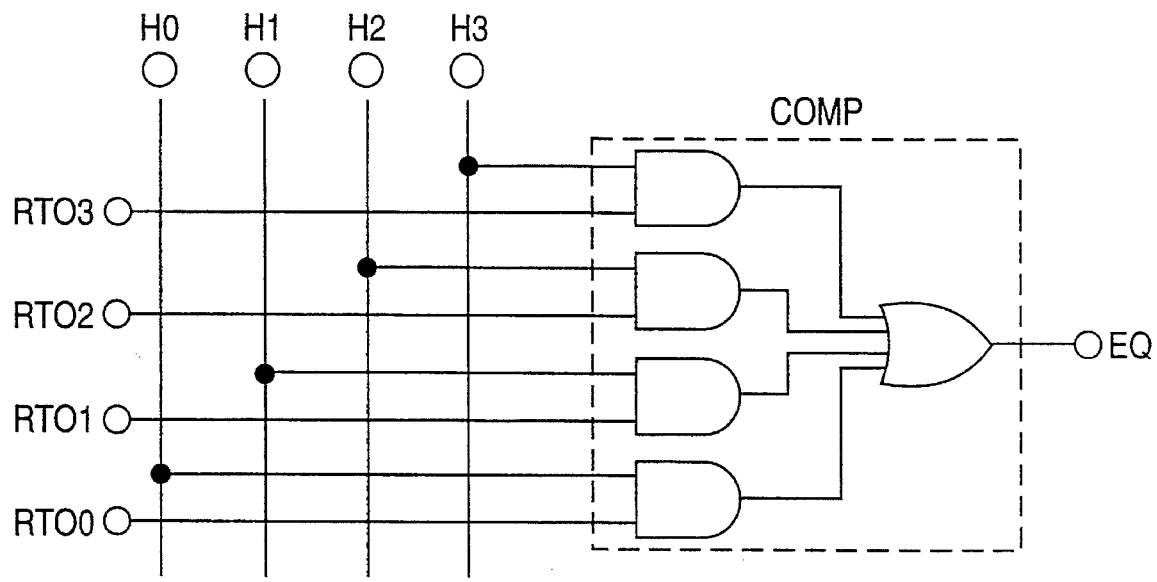
FIG. 25 is a diagram showing a structure of a comparator (having no trunk grouping function)

FIG. 25 shows an example of the structure of the comparator where the trunk grouping is not effected. In the structure shown in FIG. 25, four AND circuits and this output are input into an OR circuit. RTO0, RTO1, RTO2 and RTO3 are the outputs of the registers corresponding to the output ports 0, 1, 2 and 3 of the routing tag registers, respectively, and OH0, OH1, OH2 and OH3 are the signals representative of the numbers of the port to which the outputs are fed, respectively. EQ is the signal showing the fact that the cell having the routing tag which is coincident with the routing tag to be output in the routing tags stored in the units is stored. For example, when the cell routing to the output port 0 is output, OH0 is in H level. At this time, in the case where H is stored in RTO0, that is, the cell routing to the port 0 is stored, EQ is H and the fact is shown where the cell routing to the port 0 is stored.

Figure 26:
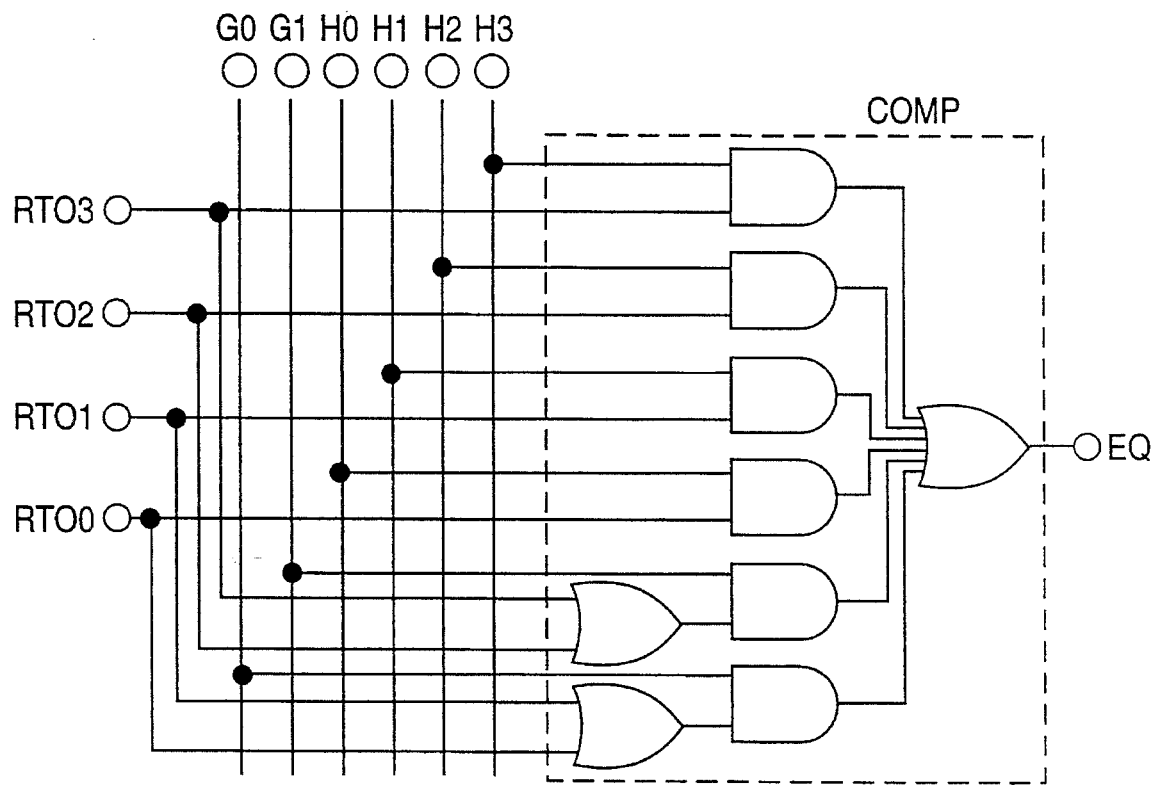
FIG. 26 is a diagram showing a structure of a comparator (having the trunk grouping function)

FIG. 26 shows an example of the structure of the comparator where the trunk grouping is effected. In the comparator, the cells routing to the ports 0 and 1 are grouped as group 0 and the cells routing to the ports 2 and 3 are grouped as group 1. OG0 and OG1 are the signals representative of the numbers of the trunk groups to be output, respectively. For instance, when the cell routing to the trunk group 0 is output, OG0 is in H level. At this time, when RTO0 or RTO1 is H, this shows that the cell routing to the trunk group 0 is stored, and EQ is in H level.

Figure 27:
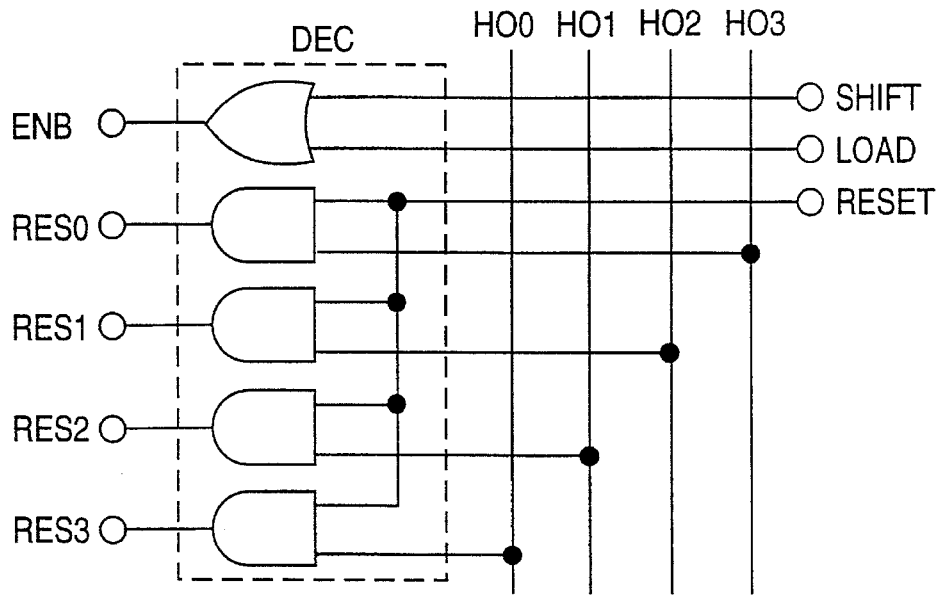
FIG. 27 is a diagram showing a structure of a decoder (having no trunk grouping function)

FIG. 27 shows an example of the structure of the decoder where the trunk grouping is not effected. In the structure shown in FIG. 27, SHIFT is the signal for instructing the shift operation to the unit of interest in the shift operation mode, LOAD is the signal for instructing the writing of the routing tag to the unit of interest in the decoder input mode, RESET is the signal for instructing the reset of the bit corresponding to the output port ill the case where the cell to be output to the unit of interest in the output mode is present, and ENB is the write enable signal of the routing tag register, RES0, RES1, RES2 and RES3 are the reset signals corresponding to the output ports 0, 1, 2 and 3, respectively. Since the writing is effect to all the bits of the routing tag registers in the shift operation or the routing tag input, the write enable signal ENB is in H level. The bits of the routing tags are reset only. For example, when the cell routing to the output port 1 is output, only the bit corresponding to the output port 1 is reset. Thus, RES1 is in H level.

Figure 28:
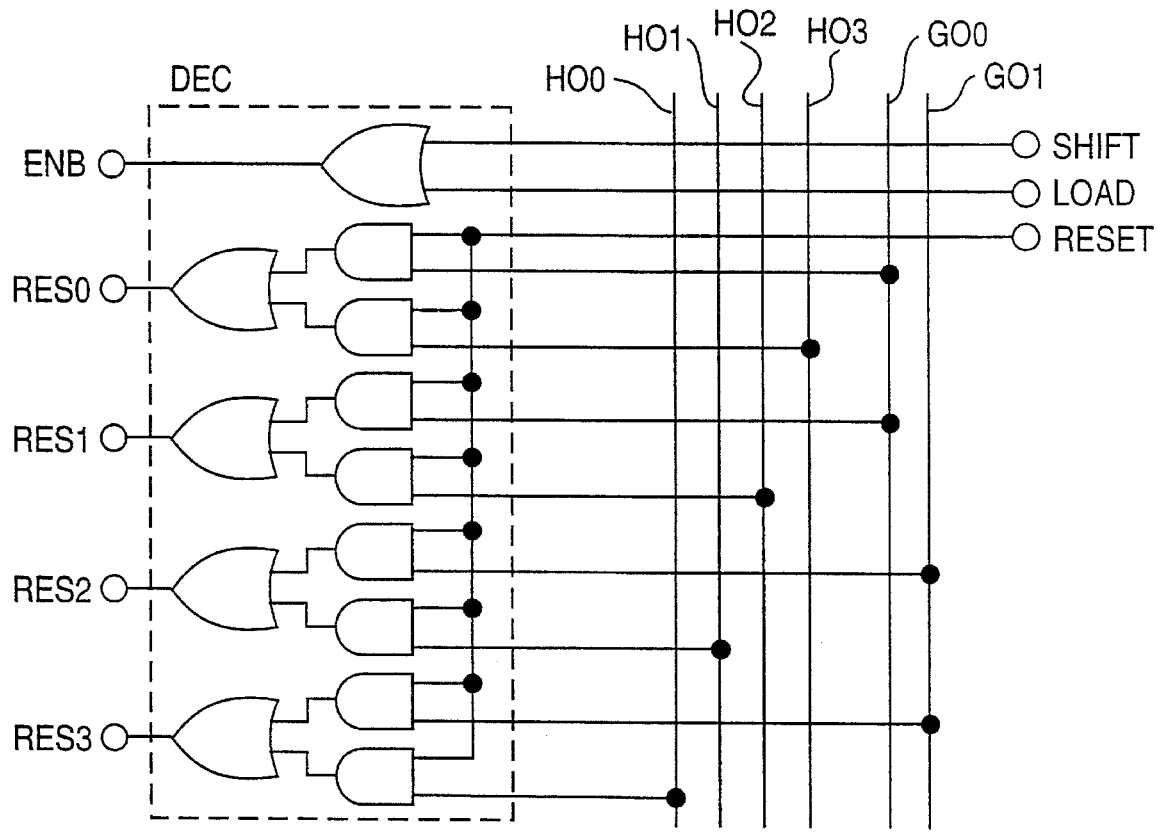
FIG. 28 is a diagram showing a structure of a decoder (having the trunk grouping function)

FIG. 28 shows an example of the structure of the decoder where the trunk grouping is effected. In the structure shown in FIG. 28, RES0 is in H level when the output port 0 or the output group 0 is output, RES1 is in H level when the output port 1 or the output group 1 is output, RES2 is in H level when the output port 2 or the trunk group 1 is output, and RES3 is in H level when the output port 3 or the trunk group 1 is output.

With such a comparator and such a decoder, it is possible to readily realize the trunk grouping function.

A fourth modification of the first embodiment will now be described. In the modification, the address output in the cell output is achieved in parallel.

In the first embodiment and the foregoing modifications thereof, the output of the address in the cell output is carried out in a sequential manner. According to this method, searches should be effected by N times for outputting the address for reading out the cells in all the output ports.

The structure of the address generator 5 will be explained in which the address output is in parallel.

Figure 29:
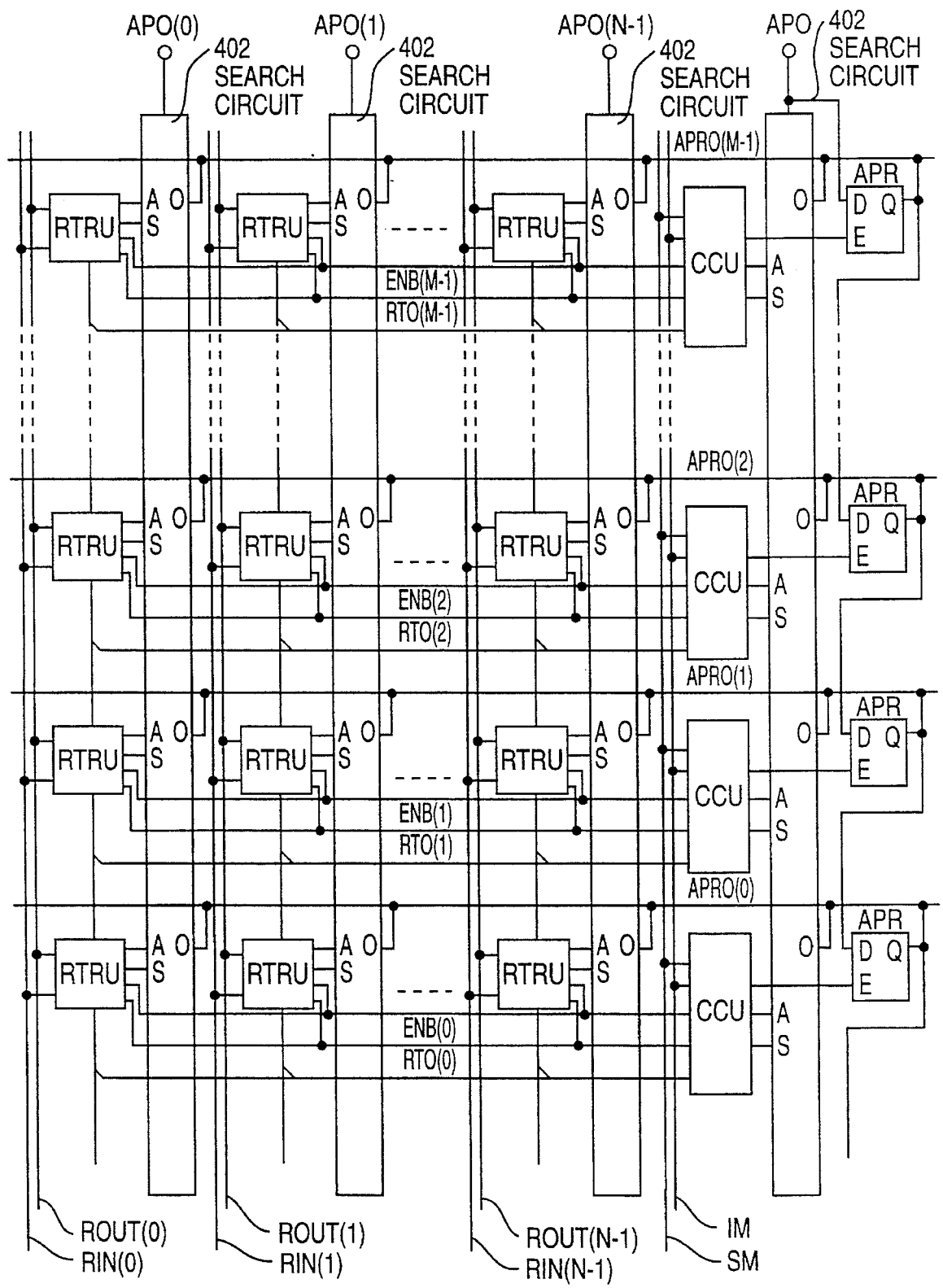
FIG. 29 is a view showing a structure of the address generator for the parallel search.

The structure of the address generator 5 is shown in FIG. 29.

The address generator is composed of detectors 402 corresponding to the respective output ports, routing tag register units RTRU connected to the detectors 402, unit controllers CCU and address pointer registers APR.

The detector which has been described in conjunction with, for example, the second modification may be used as the detector 402.

Figure 30:
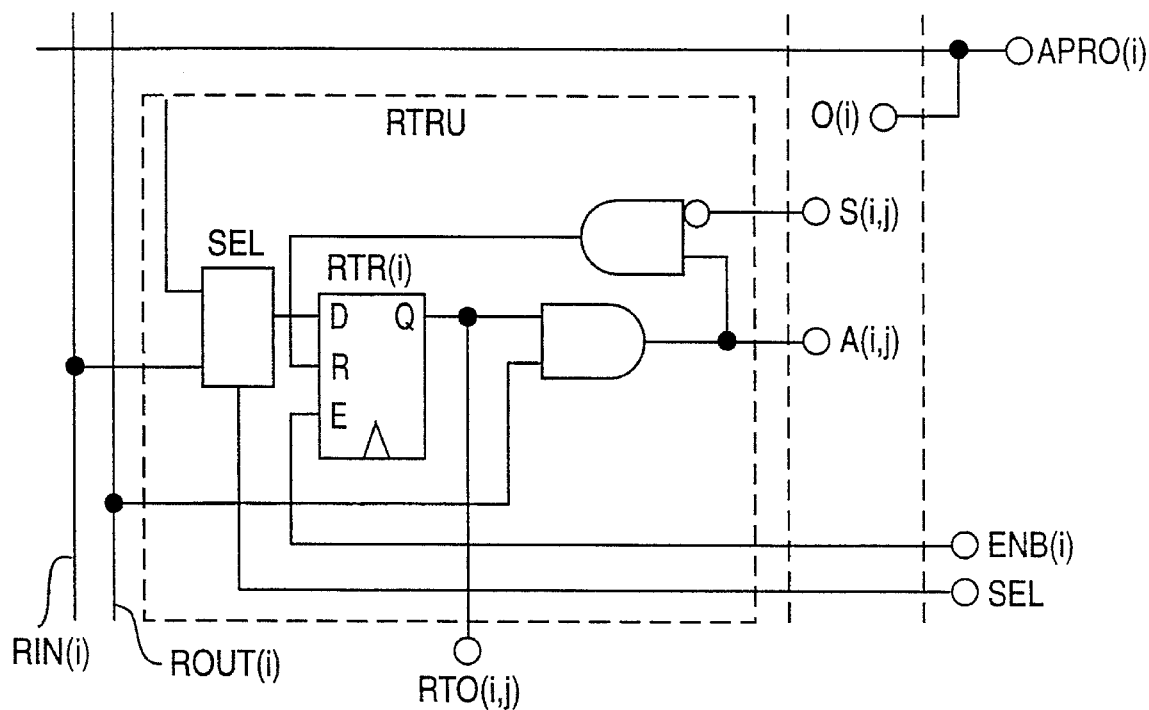
FIG. 30 is a view showing a structure of the routing tag register unit for the parallel search.

The structure of the routing tag register unit is shown in FIG. 30. When the cell routing to the output port j is output, ROUT(j) is in H level. In this case, if the value of RTRU is H, H is input into the A(i,j) of the search circuit. The search circuit search the oldest cell by using the value of the other units. The search result is given by S(i,j). When the cell to be output is present in the older units (lower units) than the unit i, S(i,j) is in H level, and when it is not present, S(i,j) is in L level. Accordingly, when the value of A(i,j) is H and the value of S(i,j) is L, the unit i is the oldest unit. When the value of the address pointer register of the unit i is input in APRO and the unit i is the oldest cell, the value of APRO is transferred to the cell buffer memory from the address generator as the address of the cell to be output. Then, since the address is output, the value of the routing tag register unit corresponding to the output port j of the routing tag register is reset.

In the input mode, the selector is switched on the RIN(j) side by the switch signal SEL, and the value of RIN(j) is written by the signal of ENB(i) generated by the unit controller. RIN is the value showing the routing tag of the cell input.

In the shift mode, the selector is switched on RTRU(i,j) side by the switch signal SEL, and the value RTRU(i,j) is written by the signal of ENB(i) generated by the unit controller. RTO is the value (RTO (i+1,j)) of the routing tag register of the one-step-up unit.

The unit controller controls the routing tag registers and the address pointer registers in the input mode and the shift mode.

In the input mode, when the unit of interest is vacant and the cell is stored in the older unit than the unit of interest, the routing tag of the cell input in this unit.

In the shift mode, when the unit of interest is vacant or the vacancy of the older unit than the unit of interest is detected, the shift operation is carried out. The value of the adjacent unit is written in the routing tag register and the address pointer register.

Figure 31:
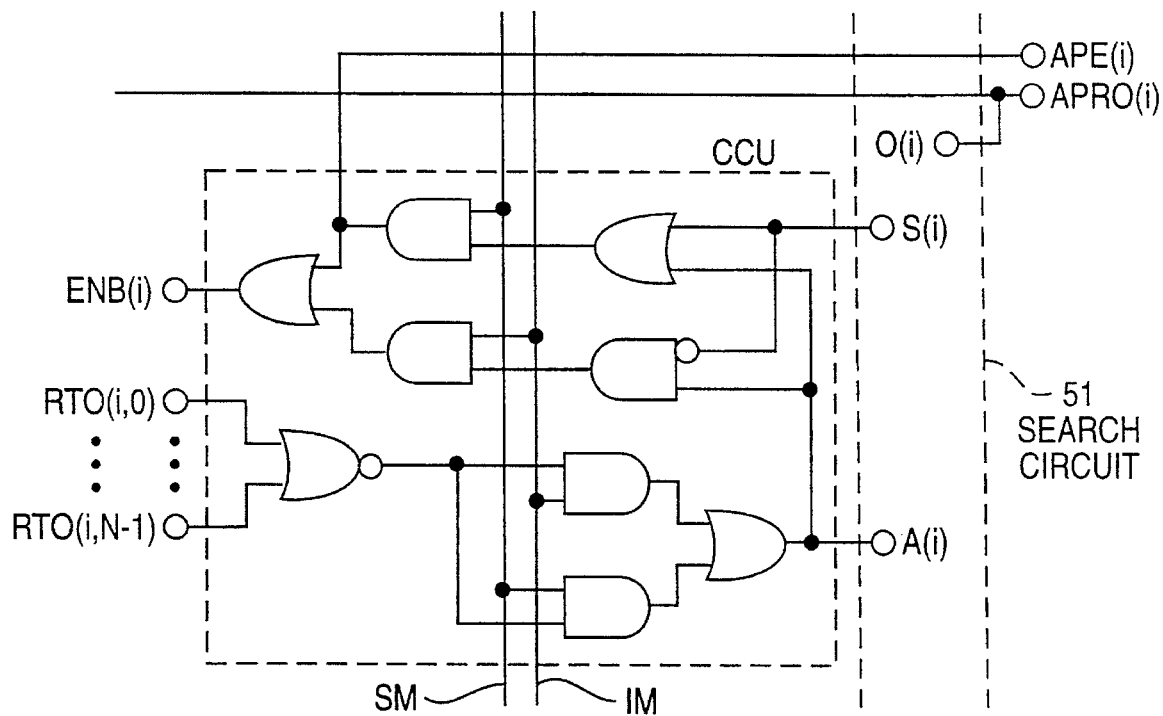
FIG. 31 is a view showing a structure of the unit controller for the parallel search.

The structure of the unit controller for carrying out such an operation is shown in FIG. 31.

In FIG. 31, IM is the signal representative of the input mode, SM is the signal representative of the shift mode, RTO(i,j) is the output value of the bit corresponding to the output port j of the routing tag of the i-th unit, APRO(i) is the value of the address pointer register, ENB(i) is the write enable signal of the routing tag register, and A(i) is the output of the search circuit 51.

The unit controller has a plurality of search circuits to enable the address outputs in parallel in the output. Thus, it is possible to enhance the operational speed of the address generation.

A fifth modification of the invention will be described.

In the ATM communication, cells having various qualities are multiplexed and input into the cell switch. In order to ensure the quality required for each quality class, the priority controlling function is necessary for the cell switch.

The priority controlling function means a function of outputting the special priority class by a priority class identifier given to the cell.

The operation of the address generator for realizing the priority controlling function will be explained with reference to FIGS. 32(*a*) to 32(*d*).

In these figures, P denotes the value representative of the priority class.

Figure 32:
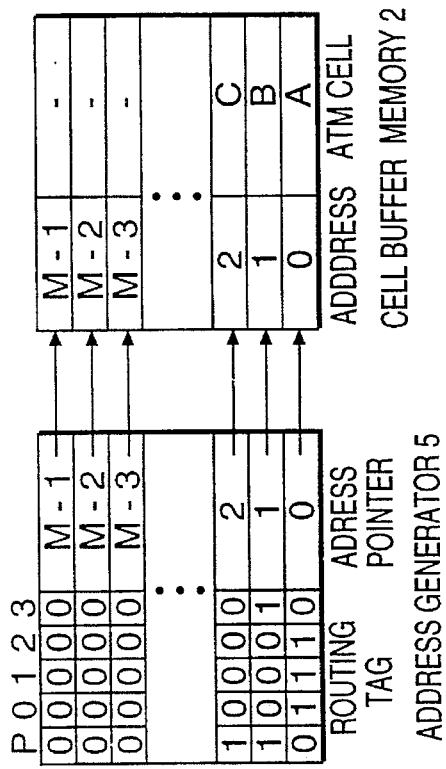
FIGS. 32(a), 32(b), 32(c) and 32(d) are charts showing the operation of the priority control function.
Figure 32:
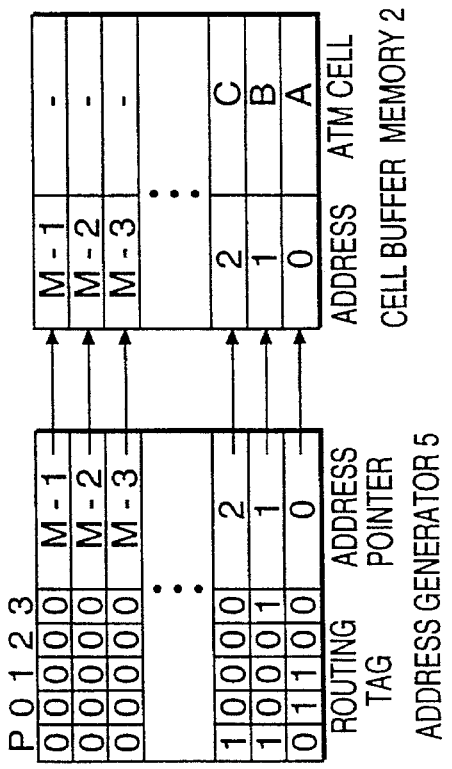
Figure 32:
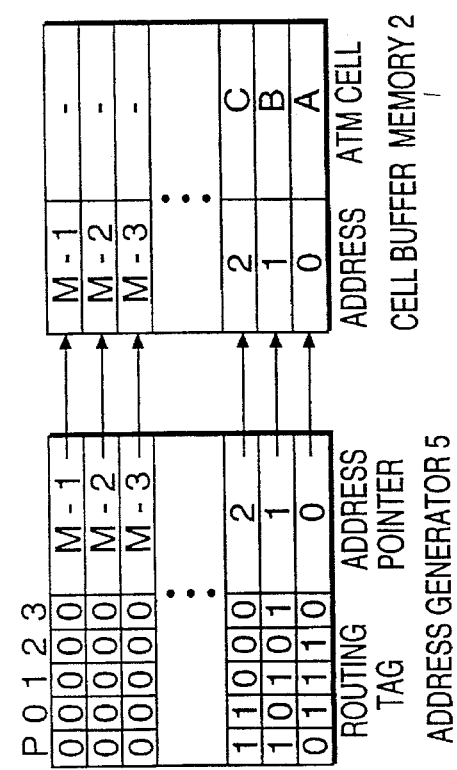
Figure 32:
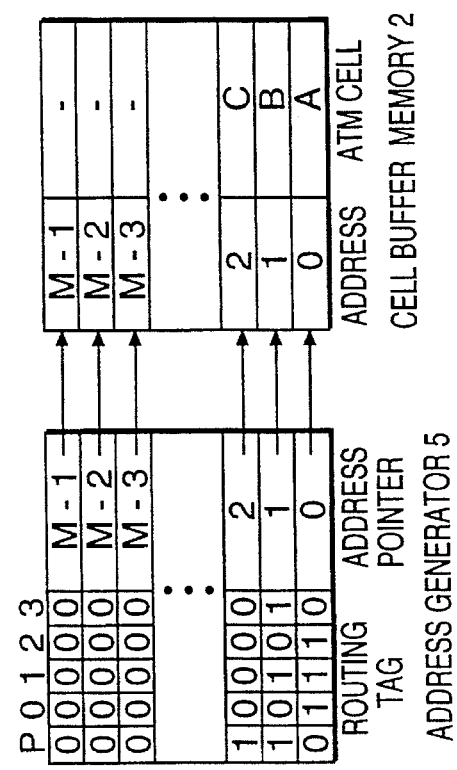

Assume that the address generator and the cell buffer memory be kept under the condition shown in FIG. 32(*a*). Namely, the oldest cell A is stored in the address 0, its output destination is the output ports 0, 1, 2 and its priority class is 0. The second oldest cell B is stored in the address 1, its output destination is the output ports 1 and 3 and its priority class is 1. The third oldest cell C is stored in the address 2, its output destination is the output port 0 and its priority class is 1.

In the figures, the priority class is shown by 0 and 1. In this example, 1 has the priority over 0.

The case where the cells routing to the output port 0, the output port 1 and the output port 2 are output in this order under this condition.

The operation will first be explained in the case where the cell routing to the output port 0 is output. The cell routing to the output port 0 is stored in the lowermost unit and the third unit from the bottom. The priority class of the cell of the lowermost unit is 0 and the priority class of the third unit from the bottom is 1. Accordingly, in this case, the cell of the third unit from the bottom is output with the priority. After the cell of the third unit from the bottom has been output, the content of the address generator and the cell buffer memory are changed as shown in FIG. 32(*b*).

The operation will next be explained in the case where the cell routing to the output port 1 is output. The cell routing to the output port 1 is stored in the lowermost unit and the second unit from the bottom. The priority class of the cell of the lowermost unit is 0 and the priority class of the second unit from the bottom is 1. Accordingly, in this case, the cell of the second unit from the bottom is output with the priority. After the cell of the second unit from the bottom has been output, the content of the address generator and the cell buffer memory are changed as shown in FIG. 32(*c*).

The operation will next be explained in the case where the cell routing to the output port 2 is output. The cell routing to the output port 2 is stored in the lowermost unit. The priority class of the cell of the lowermost unit is 0 but there is no other cell having the priority class of 1. Therefore, this cell is selected. Accordingly, in this case, the cell of the lowermost unit is output. The content of the address generator and the cell buffer memory are changed as shown in FIG. 32(d).

Figure 33:
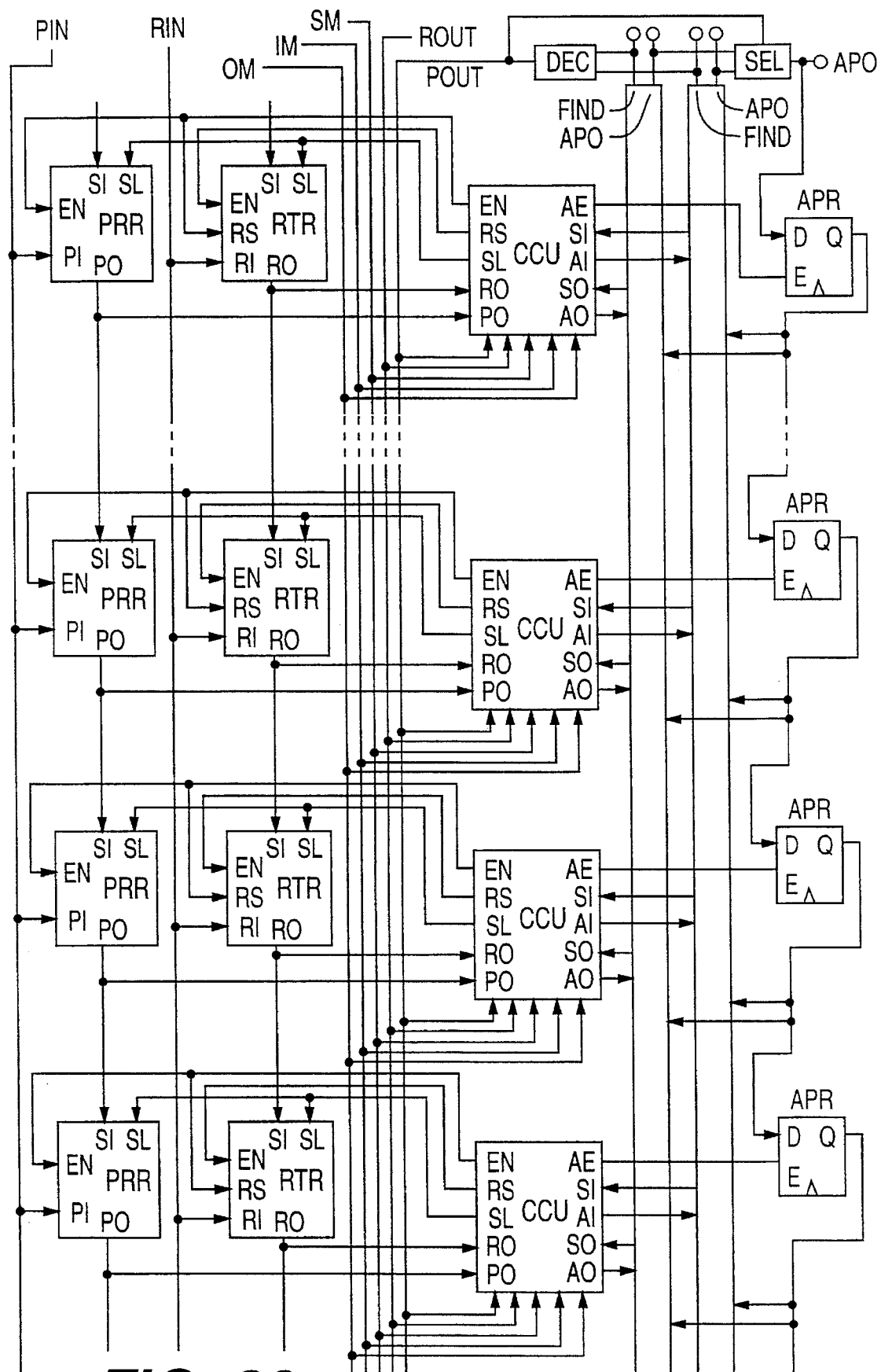
FIG. 33 is a diagram showing a structure 1 of the address generator for realizing the priority control function.

A structure of the address generator for realizing such an operation is shown in FIG. 33.

The address generator is composed of a plurality of address generator units connected to each and each composed of a priority information register PRR, a routing tag register RTR, a unit controller CCU and an address pointer register, search circuits, a selector for selecting the highest priority class from the values (APO) of the address pointers output from the search circuits corresponding to the respective priority class, and a decoder for decoding the value of the highest priority class from the values FIND output from the respective search circuits.

The structures of the routing tag registers and the address pointer registers are the same as those described in connection with the first embodiment. The search circuit described in connection with the third modification may be used as the search circuit. The number of the search circuits is the same as the number of the priority classes.

Figure 34:
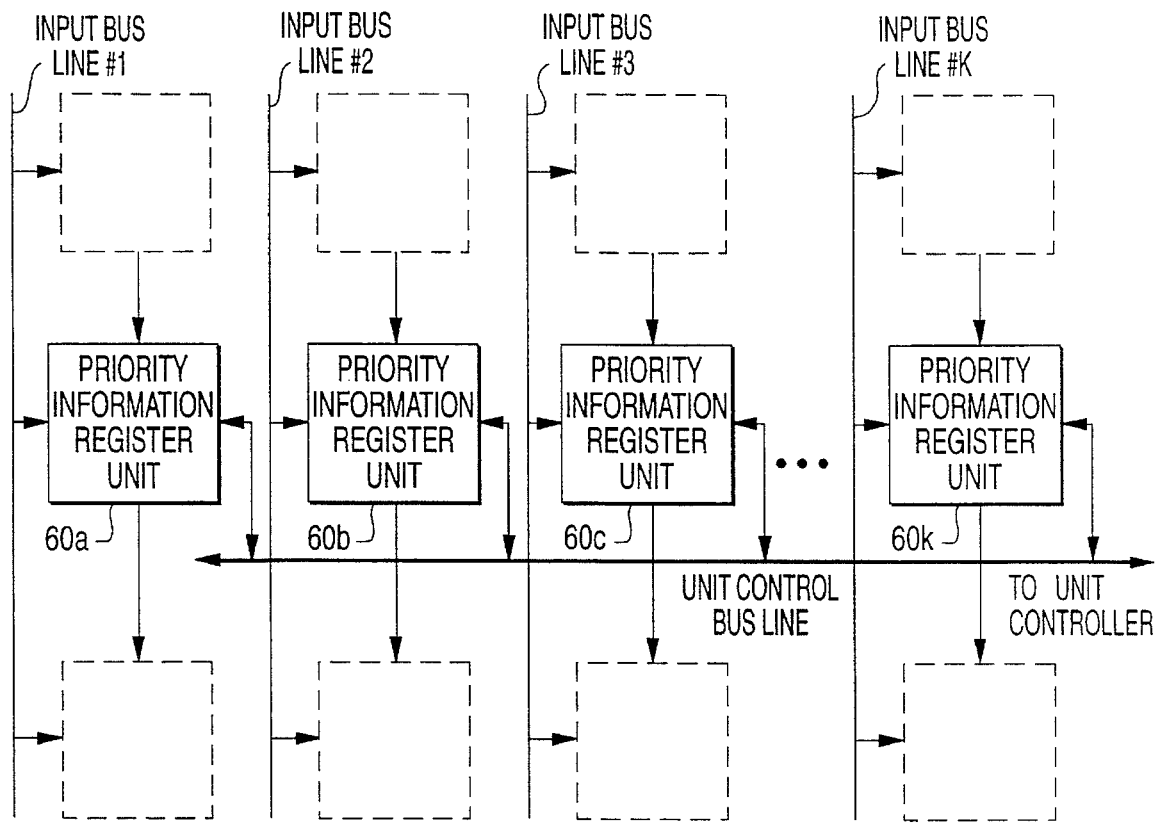
FIG. 34 is a diagram showing a structure of the priority control register for realizing the priority control function.
Figure 35:
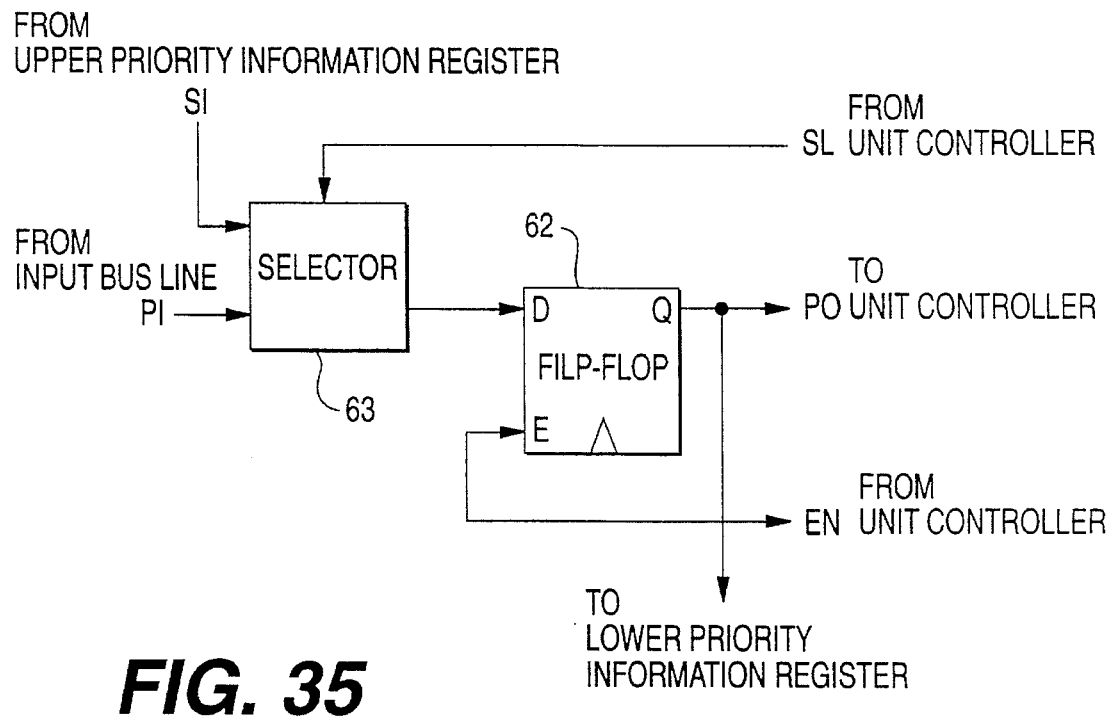
FIG. 35 is a diagram showing a structure of the priority control register unit for realizing the priority control function.

A structure of the priority information register composed of the priority information register units $60a, \ldots, 60k$ is shown in FIG. 34. A number (K) of priority information register units 60 are arranged as shown in FIG. 35 for the priority information register. K is the bit number needed for showing the priority class. If the number of the priority classes is represented by P, K is required to be $\log_2 P$. The selector 63 executes the priority information register is composed of the selector 63 and the flip-flop 62. The switching of the priority information from the input from the priority information input bus and the adjacent priority information register for inputting the priority information given to the cell in accordance with the instruction of the unit controller. The value corresponding to the cell stored in the unit is stored in the flip-flop.

Figure 36:
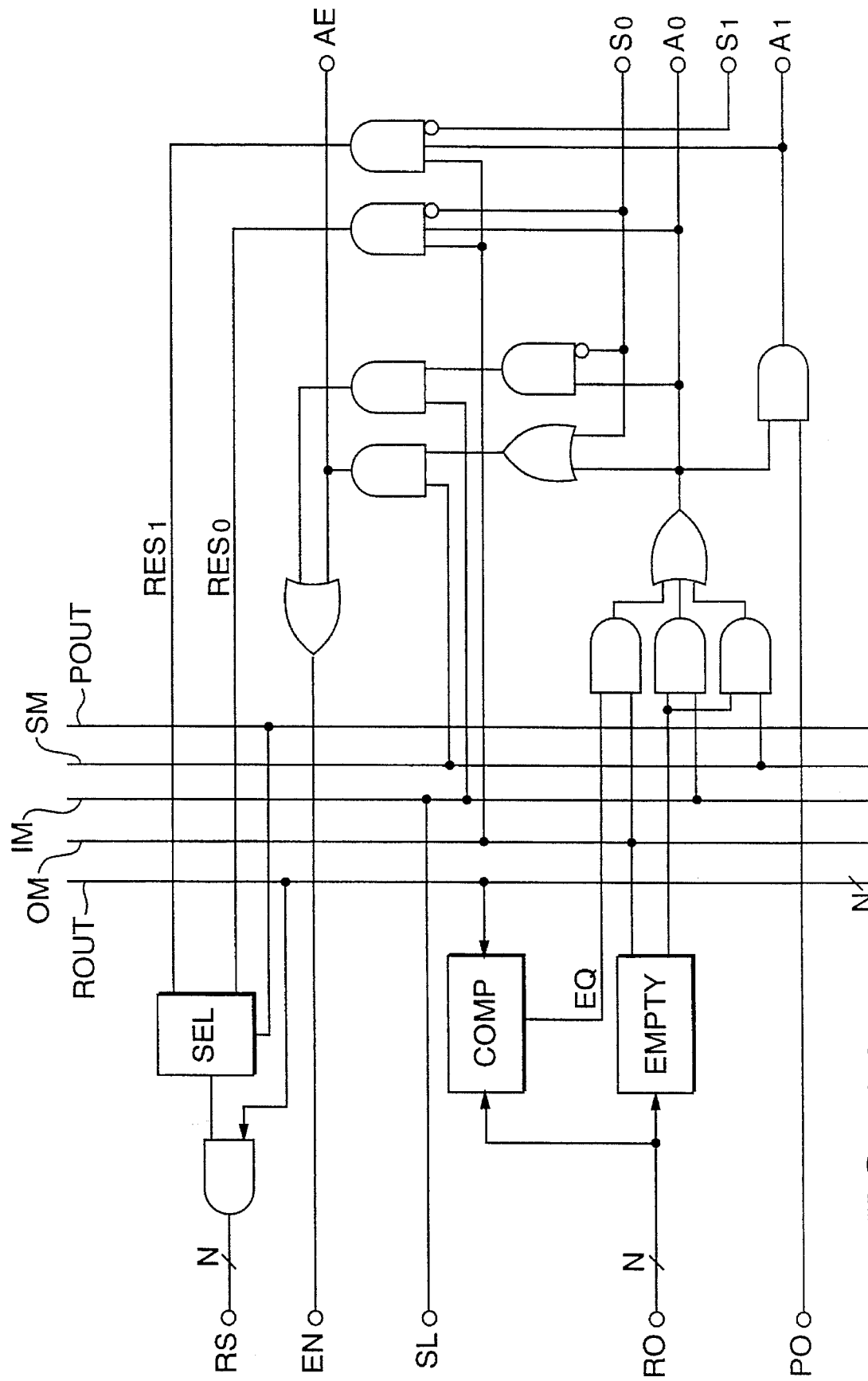
FIG. 36 is a diagram showing a structure 1 of the unit controller for realizing the priority control function.

FIG. 36 shows a structure of the unit controller. The unit controller is an example where the priority classes are two (0 and 1).

In FIG. 36, COMP is the comparator for detecting whether or not the routing tag to be output and indicated by ROUT in the routing tags stored in the routing tag register, EMPTY is the existence detector for detecting whether or not the meaningful information is stored in the routing tag resister, SEL is the selector, RS is the signal for instructing the reset to the special 1 bit of the routing tag, EN is the write enable signal of the priority information register and the routing tag register, SL is the signal for instructing the input switching of the priority information register and the routing tag register, RO is the output value of the routing tag resister, PO is the output value of the priority information register, AE is the write enable signal of the address pointer register, S0 is the output signal of the search circuit corresponding to the priority class of 0 and the signal representative of the fact that the meaningful output cell is stored in the unit, A0 is the input signal of the search circuit corresponding to the priority class 0 and the signal representative of the fact that the meaningful output cell is stored in the unit, S1 is the output signal of the search circuit corresponding to the priority class 1 and the signal representative of the fact that the meaningful output cell is stored in the units lower than this unit, A1 is the input signal of the search circuit corresponding to the priority class 1 and the signal representative of the fact that the meaningful output cell is stored in this unit, ROUT is the signal for instructing the output port of the cell to be output, OM is the signal representative of the output mode, IM is the signal representative of the input mode, SM is the signal representative of the shift mode, and POUT is the signal representative of the highest priority class in the cells which have been searched.

The operation in the input mode and the shift mode are the same as those of the first embodiment and the foregoing modification, and the explanation therefor will be omitted. The operation of the output mode will be explained.

In the case of outputting the cell, the value of the output port to be output is shown in ROUT. The unit controller of each unit compares the value of the routing tag register stored in each unit with this value. The comparison result is shown by EQ. In the case where the cell of the value of the port to be output is stored in the routing tag register of the unit, the value of EQ is 1 (H level). This value is input into the input A0 of the search circuit corresponding to the class 0. In the case where the cell of the priority class 1 is stored in the unit, a logic product of the value of EQ and the signal representative of the priority 1 is input into the search circuit corresponding to the priority class 1. The search result of each class is shown by S0 and S1. The value of S0 is representative of the fact that the equivalent cell is present in the output port in the cells stored in units lower than this unit. Namely, if the value of S0 is 0 (L level), this means that the cell having the same routing tag in the port to be output is not present in the units lower than this unit. If the value of S1 is 1 (H level), this means that the cell having the same routing tag in the port to be output is present in the units lower than this unit. The value of S1 shows the fact that the cell having the same routing tag to the port to be output is already present in the units lower than this unit, with respect to the cells having the priority class 1 with the output of the search circuit corresponding to the priority class 1. Therefore, when the value of A is 1 and the value of S is 0, the cell stored in the unit is the cell to be output.

Also, the highest priority class in the cells which are identical with the output port to be output is shown in POUT. Even if the unit having the priority 0 is detected but if there is any other higher priority cell, that unit is not selected. This situation is known by POUT. Accordingly, the unit in which the cell to be output in accordance with the output value obtained from the search result of the same priority class and the value shown by POUT is stored is selected. As a result, the bit corresponding to the output port of the routing tag register is reset.

By using the address generator having such a structure, it is possible to realize the priority controlling function.

Figure 37:
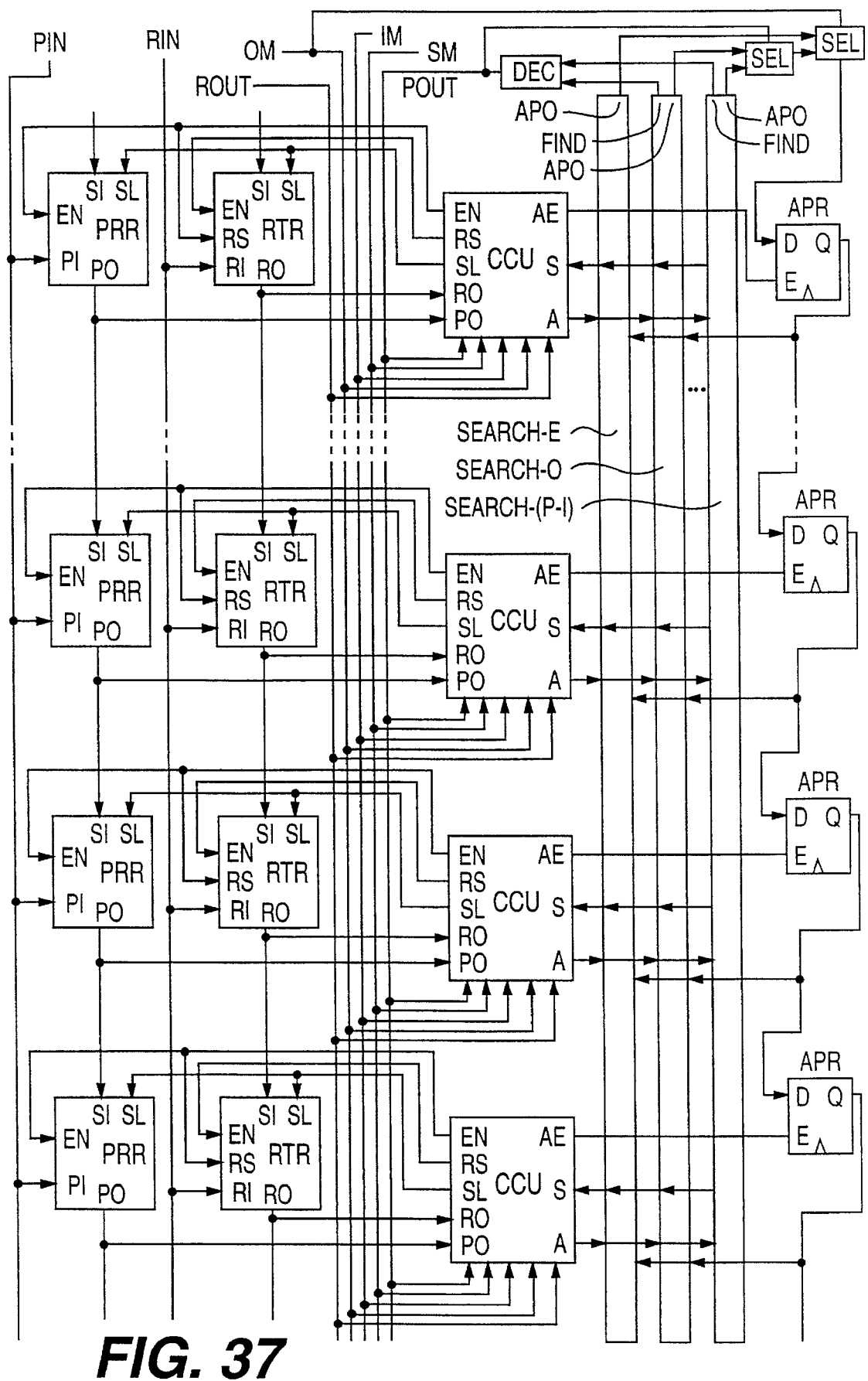
FIG. 37 is a diagram showing a structure 2 of the address generator for realizing the priority control function.

An example of the address generator in the case where the number (which is the sum of the priority classes plus 1) of the search circuits are used is shown in FIG. 37.

The address generator of this example has search circuits for outputting the respective priority classes and search circuits for carrying out the search in the input mode and the shift mode.

Figure 38:
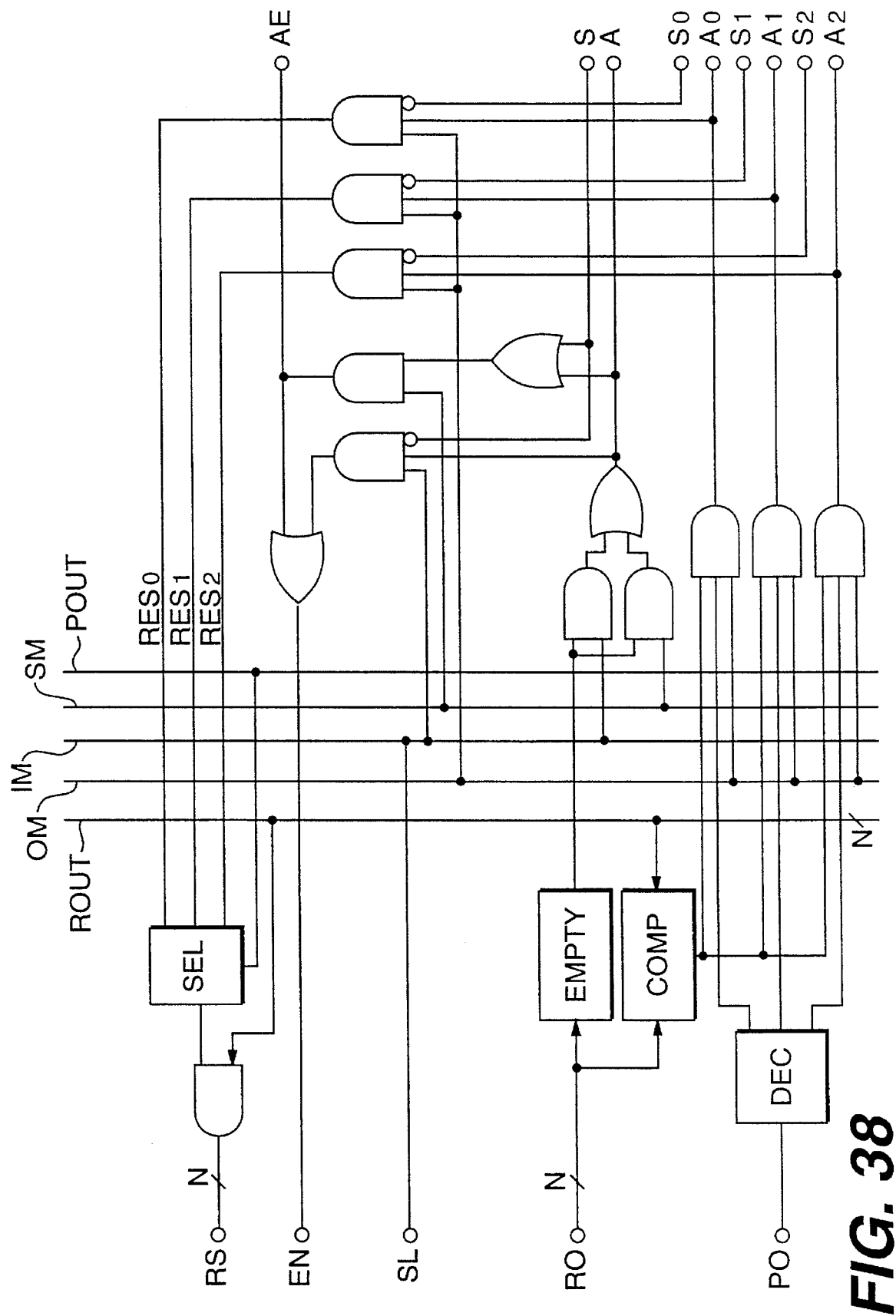
FIG. 38 is a diagram showing a structure 2 of the unit controller for realizing the priority control function.

The structure of the unit controller used in the address generator is shown in FIG. 38.

In FIG. 38, COMP is the comparator for detecting whether or not the routing tag to be output and indicated by ROUT in the routing tags stored in the routing tag register, EMPTY is the existence detector for detecting whether or not the meaningful information is stored in the routing tag resister, SEL is the selector, DEC is the decoder for decoding the values of the priority information for each priority class, RS is the signal for instructing the reset to the special 1 bit of the routing tag, EN is the write enable signal of the priority information register and the routing tag register, SL is the signal for instructing the input switching of the priority information register and the routing tag register, RO is the output value of the routing tag resister, PO is the output value of the priority information register, AE is the write enable signal of the address pointer register, S0 is the output signal of the search circuit corresponding to the priority class of 0 and the signal representative of the fact that the meaningful output cell is stored in the unit, A0 is the input signal of the search circuit corresponding to the priority class 0 and the signal representative of the fact that the meaningful output cell is stored in the unit, S1 is the output signal of the search circuit corresponding to the priority class 1 and the signal representative of the fact that the meaningful output cell is stored in the units lower than this unit, A1 is the input signal of the search circuit corresponding to the priority class 1 and the signal representative of the fact that the meaningful output cell is stored in this unit, S2 is the output signal of the search circuit corresponding to the priority class 2 and the signal representative of the fact that the meaningful output cell is stored in the units lower than this unit, A2 is the input signal of the search circuit corresponding to the priority class 2 and the signal representative of the fact that the meaningful output cell is stored in this unit, S is the output signal of the search circuit used in the input mode and the output mode and the signal representative of the fact that the meaningful output cell is stored in the units lower than this unit, A is the input signal of the search circuit used in the input mode and the output mode and the signal representative of the fact that the meaningful output cell is stored in the units lower than this unit, ROUT is the signal for instructing the output port of the cell to be output, OM is the signal representative of the output mode, IM is the signal representative of the input mode, SM is the signal representative of the shift mode, and POUT is the signal representative of the highest priority class in the cells which have been searched.

The foregoing unit controller is an example corresponding to the three priority classes. It is possible to easily realize the correspondence with any number of the priority classes.

An example of the address generator for the priority control in the case where the cell buffer is full and some of cells have to be nullified, i.e., for the nullification priority.

As one of the priority control methods, there is a method for nullifying the low priority cells by setting the threshold value in the number of the cell of the cell buffer and nullifying the low priority cells if the number exceeds the threshold value.

Figure 39:
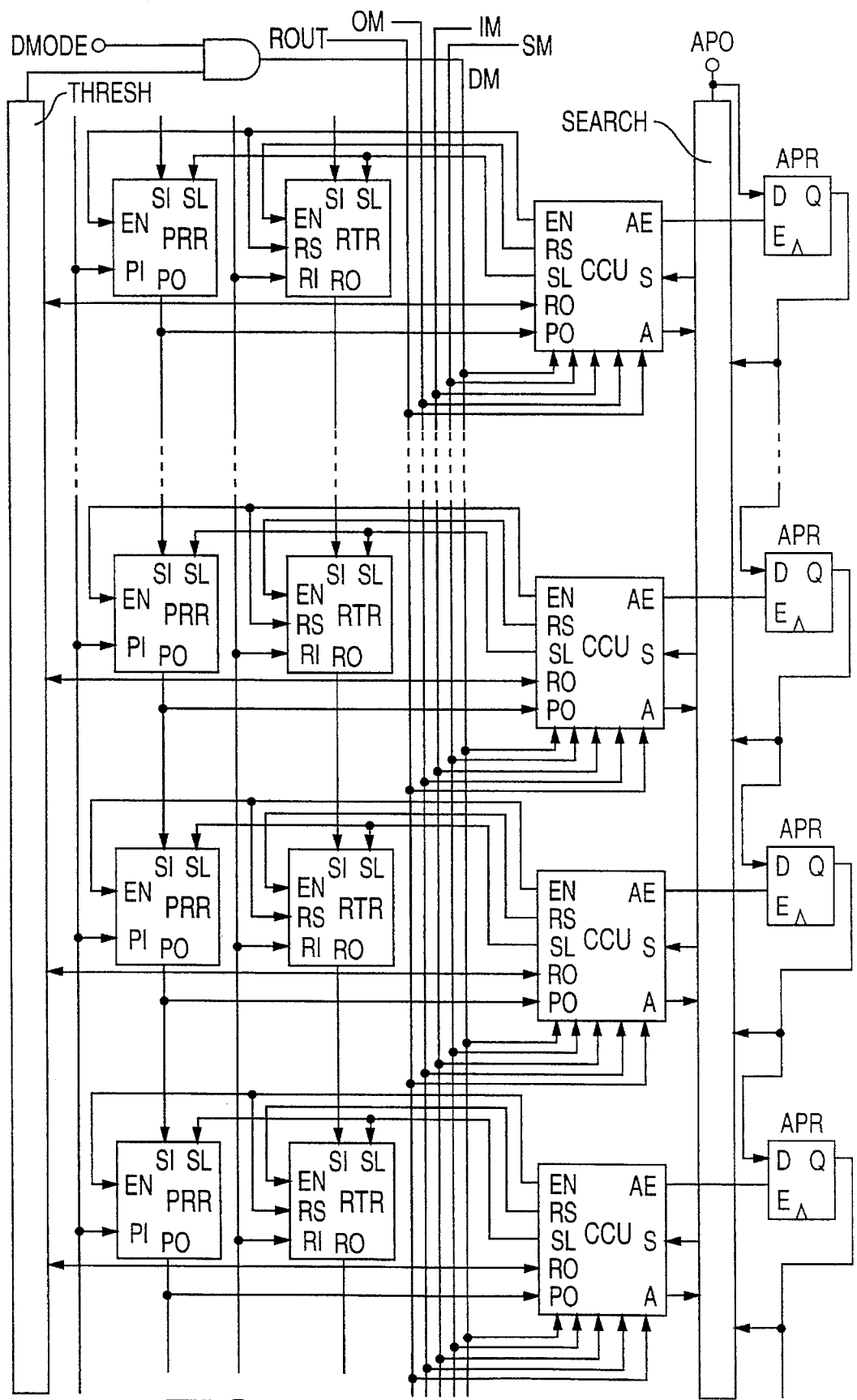
FIG. 39 is a diagram showing a structure 3 of the address generator for realizing the priority control function.
Figure 40:
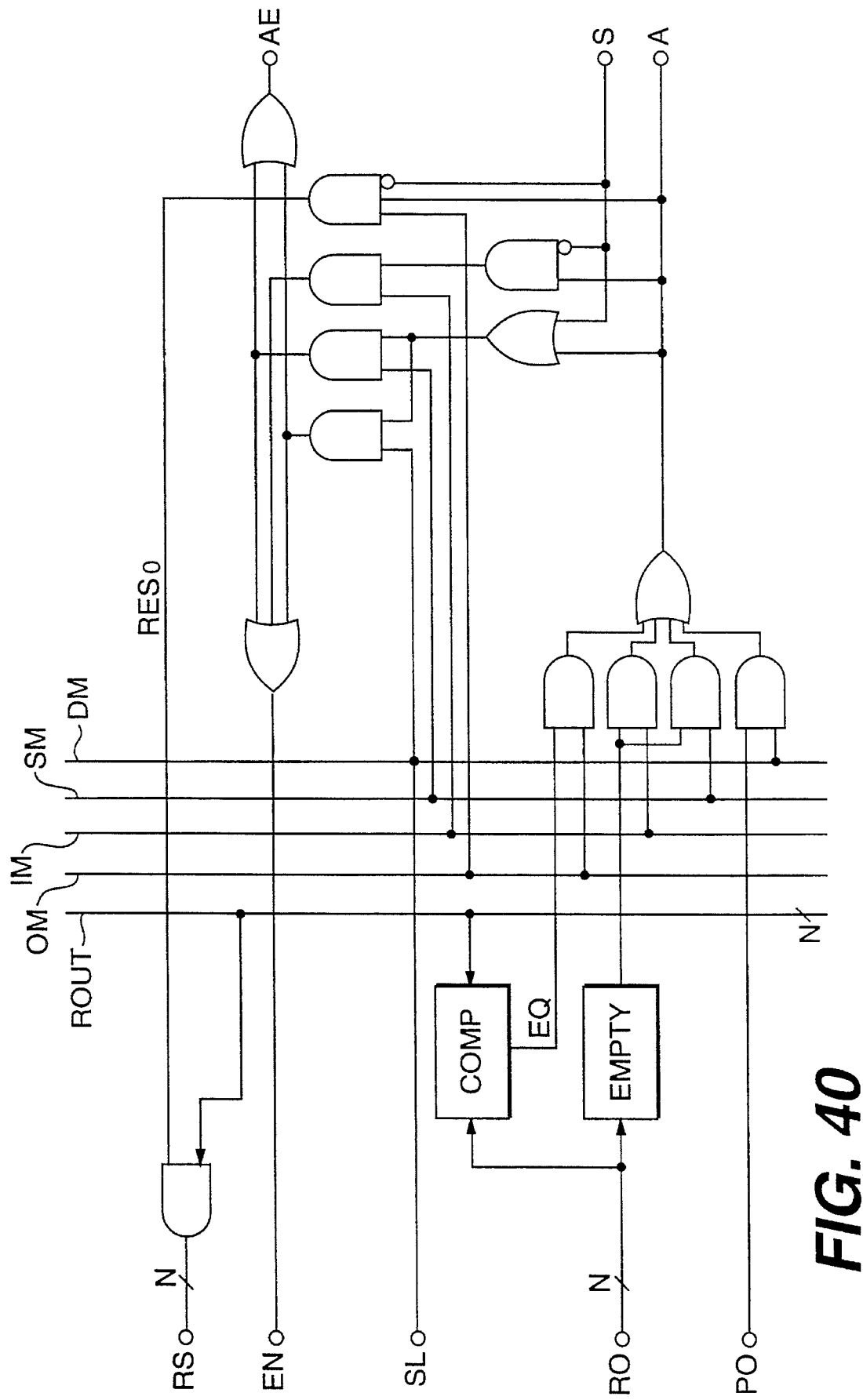
FIG. 40 is a diagram showing a structure 3 of the unit controller for realizing the priority control function.

A structure of the address generator for realizing this operation is shown in FIG. 39 and a structure of the unit controller is shown in FIG. 40. In this apparatus, when PRO is H, the cells are nullified with priority. DM is the signal representative of the mode for carrying out the nullification of the cells. In the cell nullification mode, the cell where PRO is H is searched. In the apparatus of this example, the search is effected from the older cells (lower cells) but it is possible to effect the search from the newer cells (upper cells). The routing tag of the unit that has been first searched through the search from the lower cells is nullified and the value of the address pointer is shifted to the uppermost unit.

The signal DM for instructing the cell nullification is H when the timing signal fed from the controller is in the cell nullification mode and exceeds the threshold value.

It is possible to determined the number of the cells to be nullified after the detection of the priority information of the input cells.

Also, it is possible to combine this address generator with the apparatus shown in FIG. 33 and 37.

By using the address generator having such structures, it is possible to readily realize the priority control function.

A second embodiment of the invention will now be described. The cell switch is composed of a multiplexer 1 for multiplexing input cells, a cell buffer memory 2 for storing the multiplexed cells, a demultiplexer 3 for demultiplexing the multiplexed cells, and an address controller 4 for controlling the addresses indicative of the memory region stored in the cell buffer memory 2.

The address controller 4 is composed of an address generator 5 for generating readout address and write addresses of the cells stored in the cell buffer memory 2, and a controller 6 for controlling the multiplexer 1, the demultiplexer 3, the cell buffer memory 2 and the address generator 5.

Figure 41:
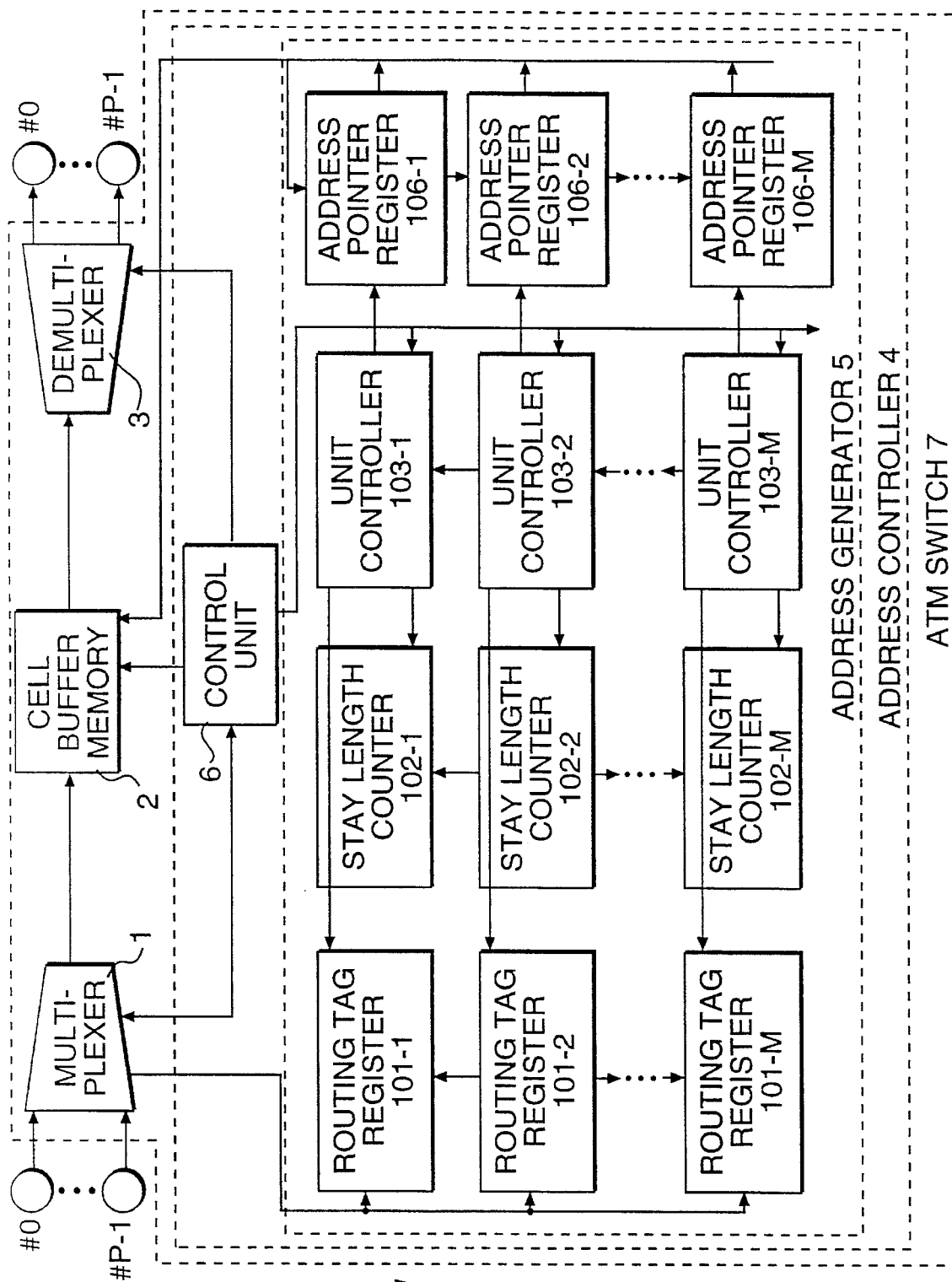
FIG. 41 is a diagram showing an overall structure according to a second embodiment to the invention.

The operation of the cell switch will be explained in FIG. 41.

The cells input from the input ports are multiplexed by the multiplexer 1. At this time, the routing tags given to the cells are transferred to the address generator 5. The address generator 5 generates a write address of the cell from the routing tag transferred from the multiplexer 1 and transfers it to the cell buffer memory 2. The cell buffer memory 2 stores the multiplexed cell, transferred from the multiplexer 1, into the write address generated by the address generator 5.

When the cell is output, the address generator 5 generates the readout address. The generated readout address is transferred to the cell buffer memory 2. The cell buffer memory 2 outputs the cell stored in the readout address generated by the address generator 5, and transfers it to the demultiplexer 3. The demultiplexer 3 demultiplexes the demultiplexed cell transferred from the cell buffer memory 2 and output it to the output port.

Figure 43:
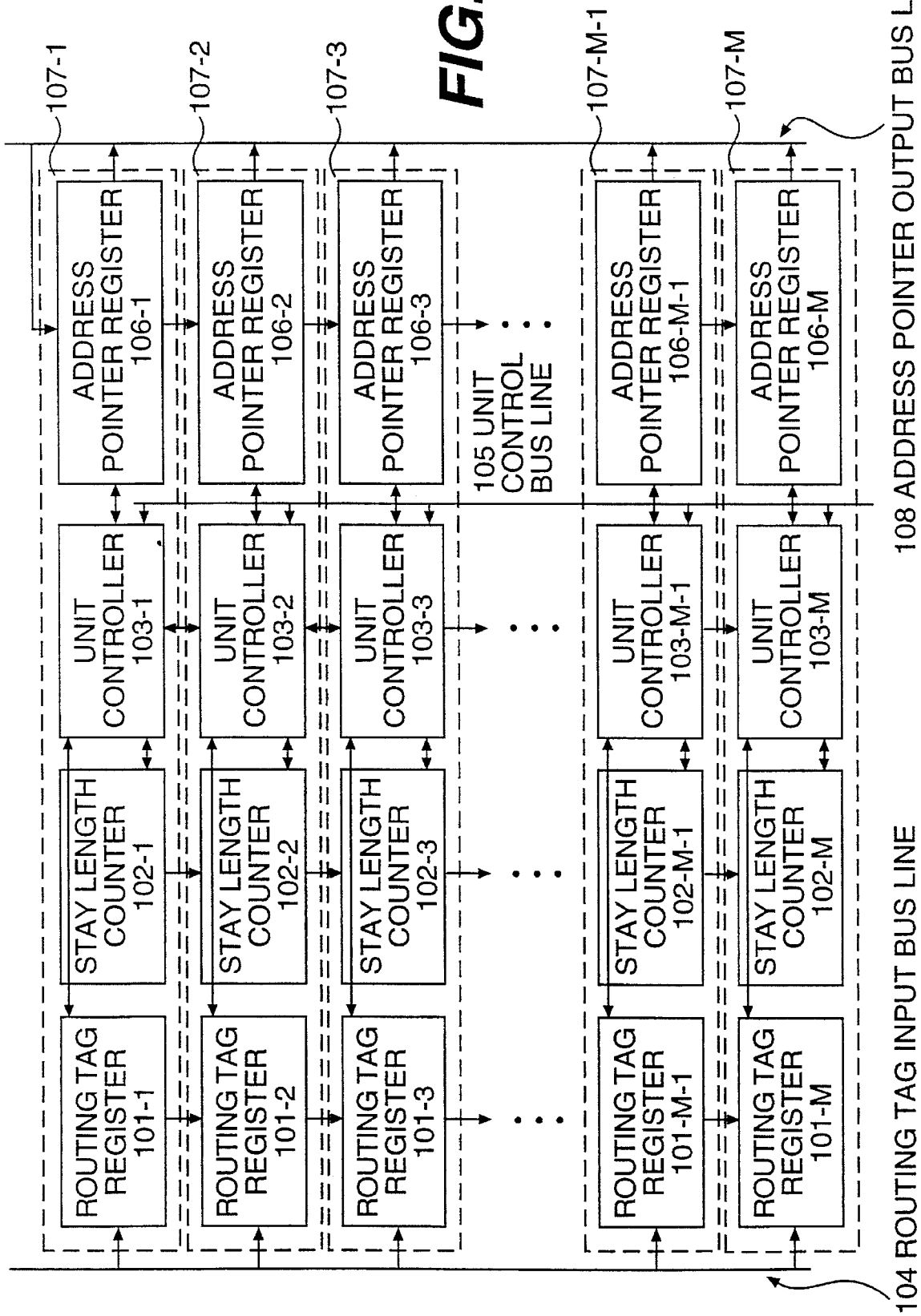
FIG. 43 is a diagram showing a structure of the address generator shown in FIG. 41.

A structure of the address generator is shown in FIG. 43. In the address generator 5, address generator units 107 each composed of a routing tag register 101, an address pointer register 106, a stay length counter 102, and a unit controller 103 are connected as shown in FIG. 43.

In the address generator 5, the positions of the address generator units 107 mean the order of the arrival order of the cells. In the example shown in FIG. 43, the lower the cells, the older the cells become. Namely, the routing tags of the input cells are stored from the bottom of the address generator unit 107 in order of the arrival. Also, if vacant regions of the routing tags are available by the output of the cells, the routing tag registers 101 and the address pointer registers 106 are shifted downwardly. Accordingly, it is understood that the lower the tag, the older the tag becomes.

The routing tag register 101 stores the routing tag trasferred from the routing tag extract unit.

The address pointer registers 106 are registers for storing the addresses indicative of the memory regions of the cells stored in the cell buffer memory 2. Each of the address pointer registers 106 is initialized so as to correspond to the address of the cell buffer memory 2 in one-to-one relation. For example, in the case where the addresses of the cells to be stored are 0 to M−1, the values of the address pointer registers 106 are each initialized 0 to M−1 like an example shown in FIG. 42.

The stay length counters 102 are to count the stay length of the cell stored in the cell switch.

The unit controllers 103 are controllers for controlling the routing tag registers 101, the address pointer registers 106 and the stay length counter 102.

The operation of the address generator 5 will now be described.

It is assumed that the cell buffer memory 2 has address spaces of 0, 1, 2, . . . , M-1 where M is the number of the cells which may be stored in the cell buffer memory 2.

Figure 42:
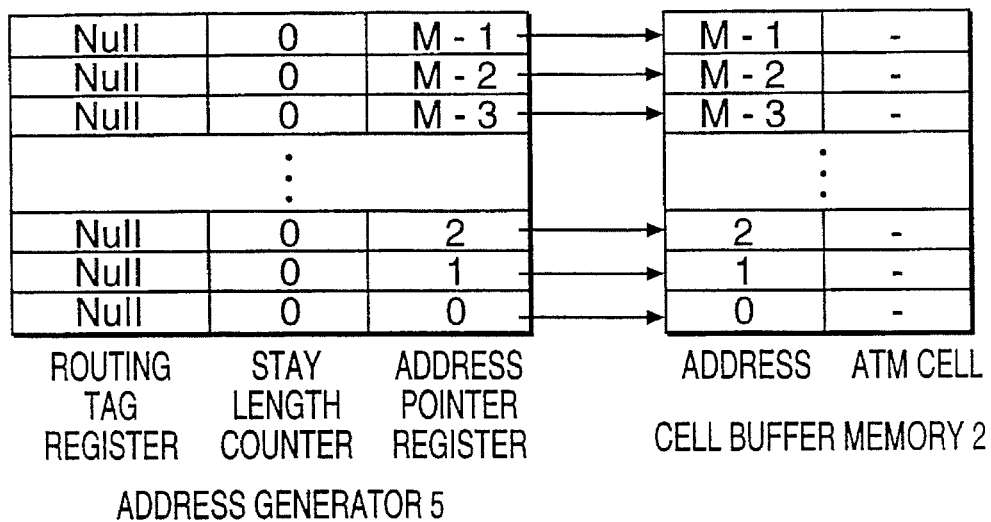
FIG. 42 is a chart showing a storage initial stage operation of the address generator and the cell buffer memory shown in FIG. 41.

It is assumed that the address generator 5 and the cell buffer memory 2 are initialized as shown in FIG. 42.

The address generator 5 stores the values of the routing tag and the address pointer register 106 and the value of the stay length counter 102 as a pair. The cells are stored in the cell buffer memory 2. In the figure, "–" means that the content is unstable.

In the initial condition, since the cells are unstable, all the cells are indicated by "–".

In the example shown in FIG. 42, the values of the address pointer registers 106 are stored in good order as 0, 1, 2, . . . , M-1 from below. Any order relation may be used if the addresses of the cell buffer memory 2 are in one-to-one relation with the values of the address pointer registers 106.

The "Null" representative of the absence of the cell is stored in the routing tag.

The operation in which the write address is output will be explained.

When the cell is input into the cell switch 7 and the writing to the cell buffer is carried out, the routing tag given to the cell is stored in the lowermost unit of the vacant units of the address generator 5 (i.e., the units where the routing tag value is "Null" or the value of the stay length counter 102 is zero), the value of the stay length counter 102 is set to "1", the value of the address pointer of the unit is transferred to the cell buffer memory 2, and the cell input to the address is written.

For instance, the operation in which the cell A routing to the output port 0 is input, subsequently, the cell B routing to the output port 1 is input and thereafter the cell C routing to the output port 0 is input will be explained.

The operation of the address generator 5 will now be described in the case where the cell A is input.

Figure 44A:
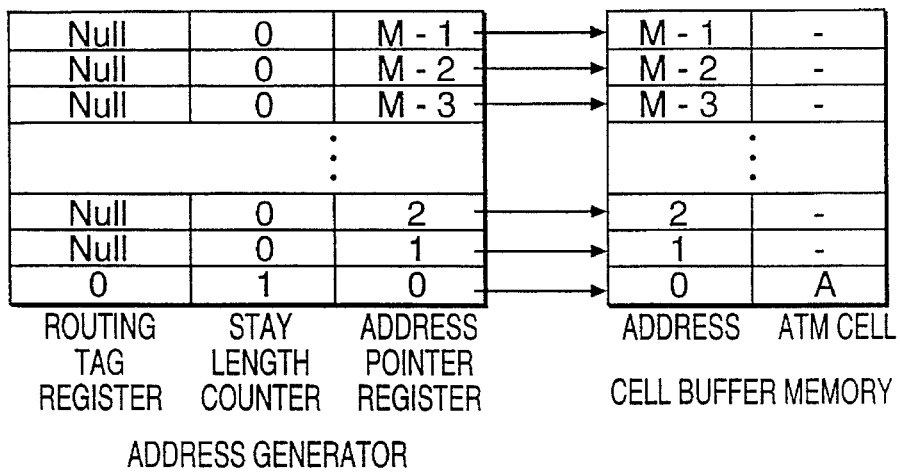
FIGS. 44(a), 44(b) and 44(c) are charts showing an example of the write operation shown in FIG. 41.

The routing tag of 0 is transferred to the address generator 5. The routing tag fed to the address generator 5 is shifted without any space from the bottom of the routing tag register 101. In the initial condition, since any routing tag is not written, the input routing tag is stored in the lowermost unit. The value of the address pointer register 106 of the written unit is the write address of the cell. Accordingly, the cell A is stored in the address 0. In this case, the value of the stay length counter 102 is set at 1. The condition where the routing tag and the cell have been written is shown in FIG. 44(a).

The operation of the address generator 5 will next be described in the case where the cell B having the routing tag of 1 is input.

Figure 44B:
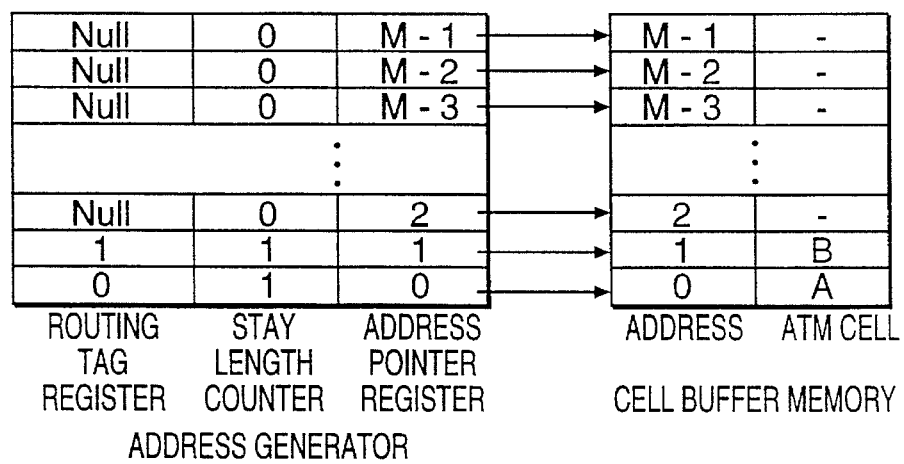

The routing tag of 1 is transferred to the address generator 5. The routing tag is stored in the lowermost unit where the routing tag is vacant. The value of 1 is written in the routing tag register of the second lowest unit from the bottom of the register since the single routing tag has been already written. In this case, the value of the stay length counter 102 is set to 1. The cell B is written in the address indicated by the value of the address pointer register 106, i.e., the address 1. The condition where the routing tag and the cell have been written is shown in FIG. 44(b).

The operation of the address generator 5 will next be described in the case where the cell C having the routing tag of 0 is input.

Figure 44C:
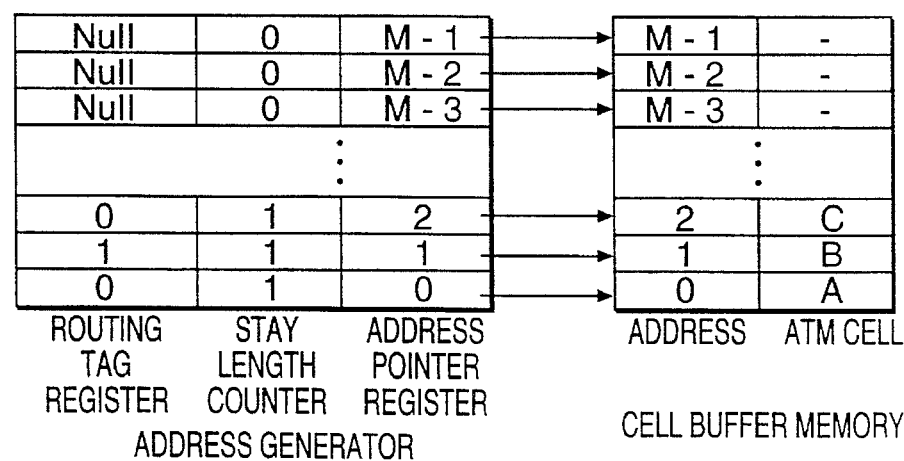

The routing tag of 0 is transferred to the address generator 5. The routing tag is stored in the lowermost unit where the routing tag is vacant. The value of 0 is written in the routing tag register of the third lowest unit from the bottom of the register since the two routing tags have been already written. In this case, the value of the stay length counter 102 is set to 1. The cell C is written in the address indicated by the value of the address pointer register 106, i.e., the address 2. The condition where the routing tag and the cell have been written is shown in FIG. 44(c).

The operation will be described in the case where the readout address is output.

When the cell is read out from the cell buffer and is output from the cell switch, the unit where the content of the routing tag register 101 is coincident with the output port number to be output is searched from below upwardly from the address generator 5, the value of the address pointer where the first identification is attained is transferred to the cell buffer, and the cell stored in the address is output. At this time, the value of the routing tag of the searched unit is reset to "Null", and the value of the stay length counter 102 is reset to "0".

For instance, the operation will be explained in the case where the cell routing to the output port is output and the cell routing to the output port 1 is output from the condition shown in FIG. 44(c).

In the cell output, the oldest cell in the cells routing to the output port is output. In the address generator 5, the old routing tags are stored in the lowermost position in FIG. 44(c) in the order of arrival.

The operation will be explained in the case where the cell routing to the output port 0 is output.

The oldest cell in the cells routing to the output port 0 is stored in the lowermost unit. Accordingly, the value of the address pointer of the lowermost unit is transferred to the cell buffer memory. The cell buffer memory outputs the fed cell A stored in the address 0.

The routing tag of the searched unit is reset to "Null". At the same time, also, the value of the stay length counter 102 is reset to "0". The content of the address generator is changed as shown in FIG. 45(a).

Subsequently, the operation will be explained in the case where the cell routing to the output port is output and the cell routing to the output port 1 is output.

Figure 45A:
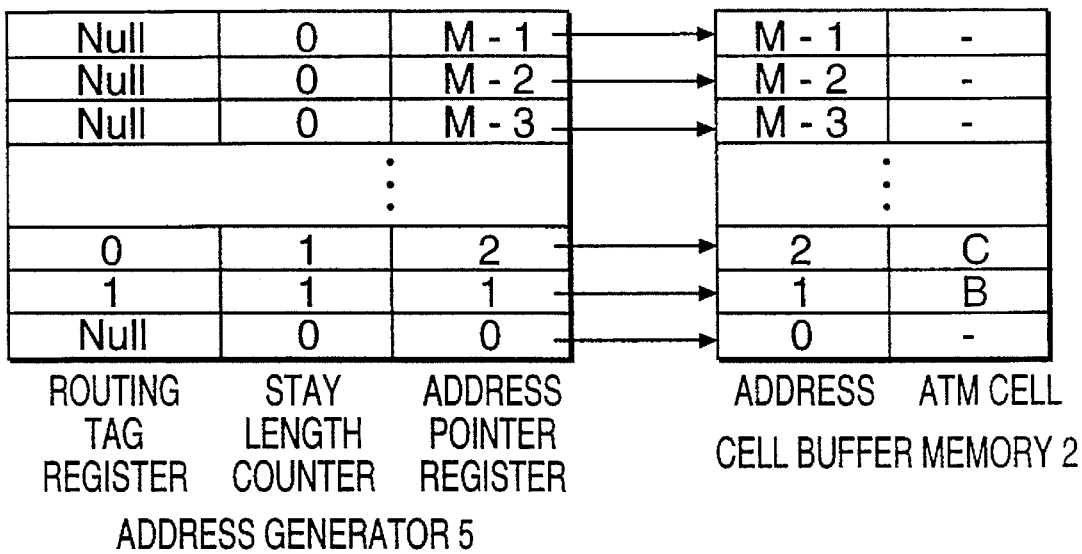
FIGS. 45(a) and 45(b) are charts showing an example of the read operation shown in FIG. 41.

Since the cell routing to the output port 0 is output, the contents of the address generator 5 and the cell buffer memory 2 are shown in FIG. 45(a).

When the cell routing to the output port 1 is output from this condition, the unit where the value of the register corresponding to the output port 1 is 1 is searched from the bottom to the top. In this case, the second unit from the bottom is selected. The value of the address pointer of the lowermost unit, i.e., 1 is transferred from the address generator 5 to the cell buffer memory CB. The cell buffer memory 2 outputs the cell B stored in the address 1.

The routing tag register 101 of the searched unit is reset to "Null". At the same time, the value of the stay length counter 102 is reset to "0". Accordingly, after the cell routing to the output port 1 has been output, the respective contents are changed as shown in FIG. 45(b).

The shift operation will now be described.

Figure 45B:
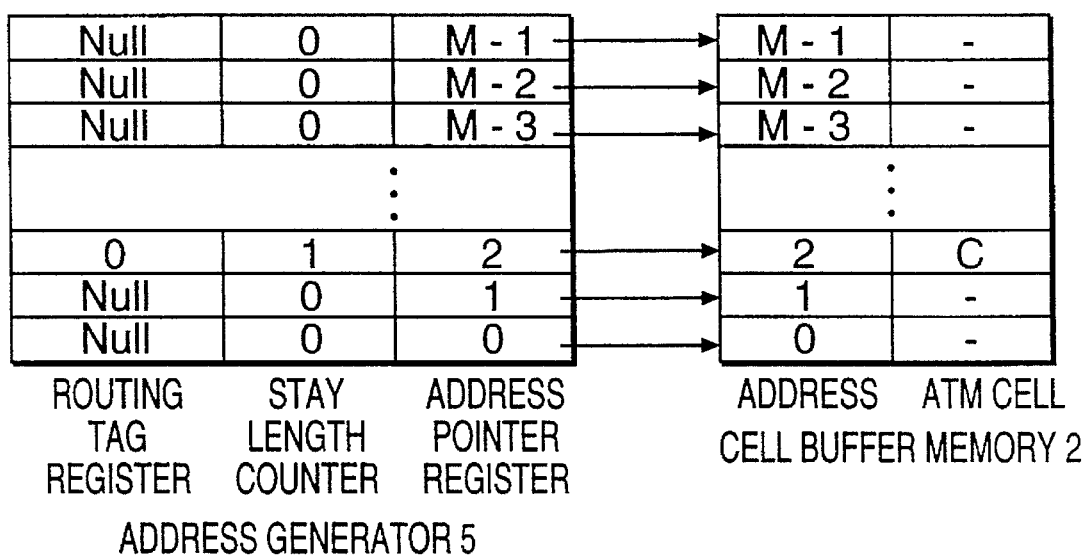

After the read operation, as shown in FIG. 45(b), the vacant unit is generated in the midway. In FIG. 45(b), the first and second units from the bottom are vacant. The shift operation means the operation for shifting the vacant units generated by the read operation or the like.

In the shift operation, the value of the address pointer of the vacant unit is input through the bus line, so that the value of the routing tag register of the unit located above the vacant unit, the value of the stay length counter 102, and the value of the address pointer register 106 are shifted downwardly.

For example, the operation for nullifying the vacant unit in the condition shown in FIG. 45(b) will be explained.

The operation for nullifying the unit of the first unit from the bottom will first be explained.

Figure 46A:
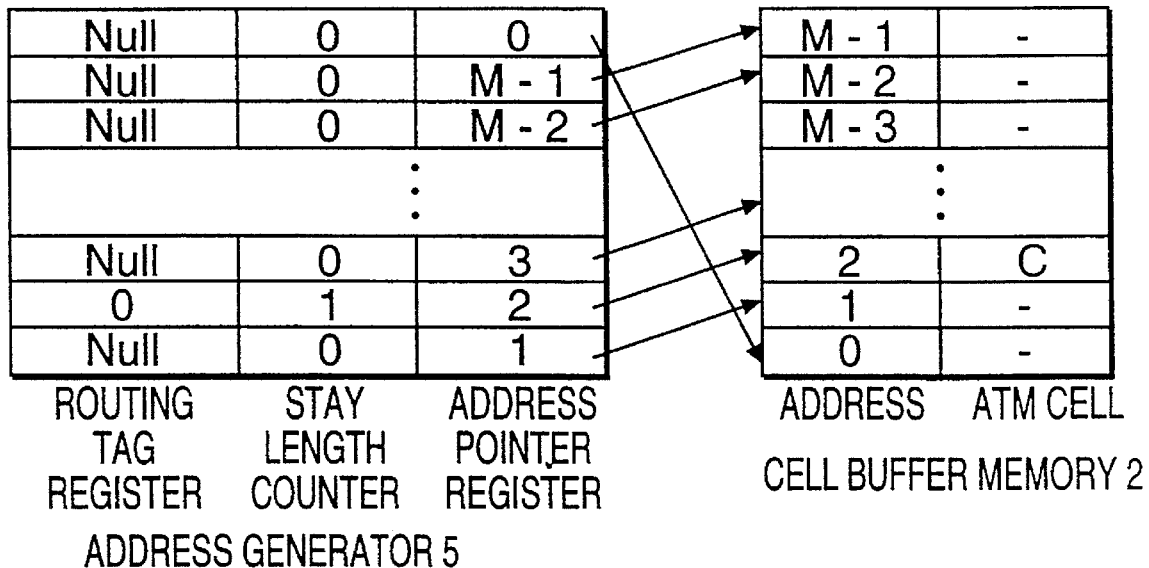
FIGS. 46(a) and 46(b) are charts showing an example of the shift operation mode shown in FIG. 41.
Figure 46B:
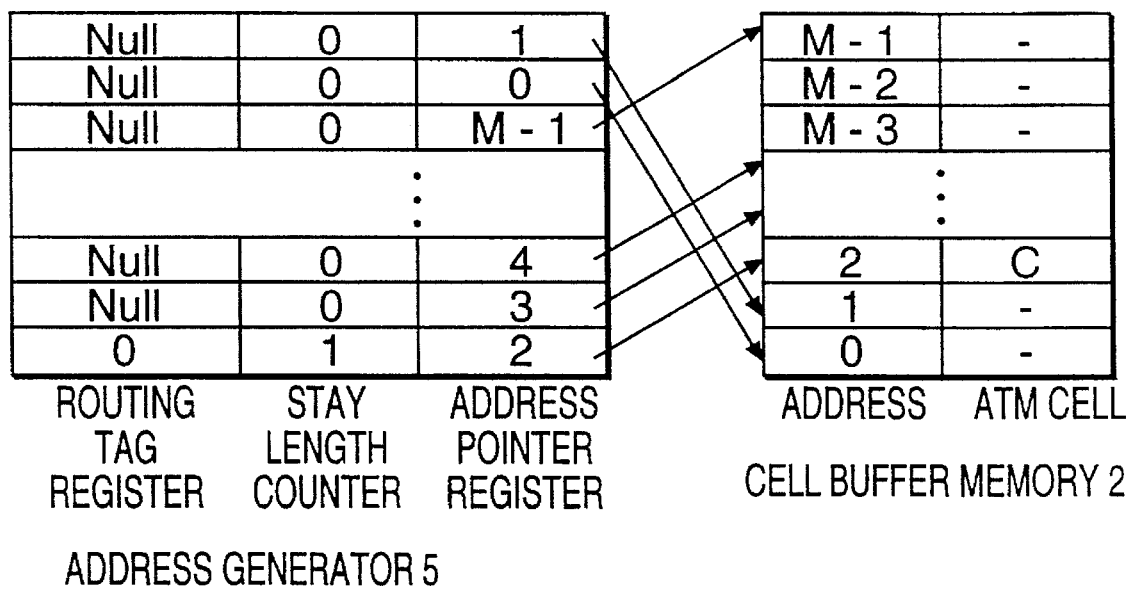

In the shift operation, the vacant unit is searched from the bottom, and the value of the address pointer of the first found vacant unit is output to the address pointer output bus line. The value of the routing tag register of the unit located above the vacant unit, the value of the stay length counter 102, and the value of the address pointer register 106 are shifted downwardly by one step, respectively. The value of the address pointer output to the address pointer output bus line is input into the uppermost unit. Accordingly, in the case of FIG. 45(b), since the lowermost unit is vacant, the value of the address pointer of the lowermost unit is input into the uppermost unit. The value of the routing tag register of the unit located above the second unit, the value of the stay length counter 102, and the value of the address pointer register 106 are shifted downwardly by one step to be the condition shown in FIG. 46(a). In the condition shown in FIG. 46(a), also, the lowermost unit is vacant, and this unit should be nullified. After this unit is nullified, the condition is changed as shown in FIG. 46(b). Namely, the value of 1 of the address pointer of the lowermost unit is shifted to the uppermost unit and the values of the units located from the second unit onward are shifted to the units by one step down. This operation is repeated to nullify the vacant units, the routing tag corresponding to the cell stored in the buffer, and the values of the stay length counter 102 and the address pointer register 106 are shifted downwardly and stored.

The count-up operation of the stay length counter 102 will now be described. The value of the stay length counter 102 for the non-vacant unit is set to "1" when the cell is input. Thereafter, the value of the counter is periodically incremented, for example, the value of the counter is incremented every time one cell cycle is terminated.

Figure 47A:
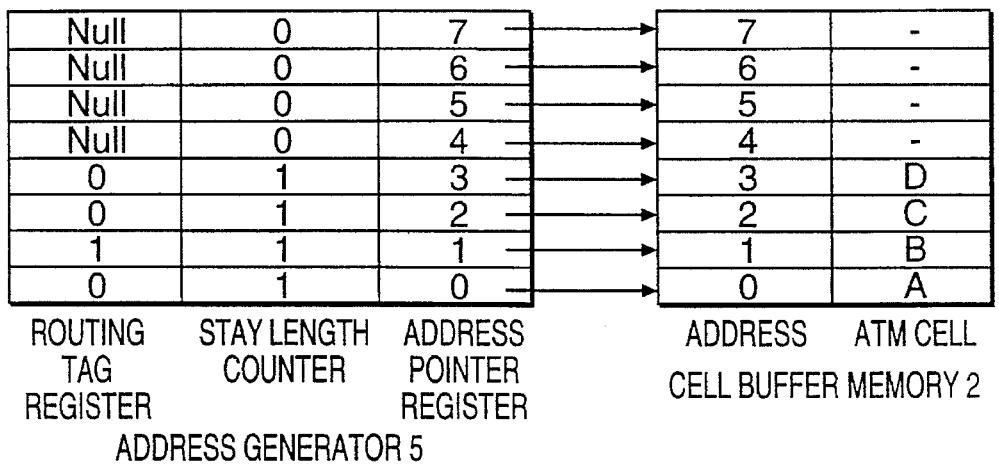
FIGS. 47(a), 47(b) and 47(c) are charts showing an example of the count-up operation shown in FIG. 41.
Figure 47B:
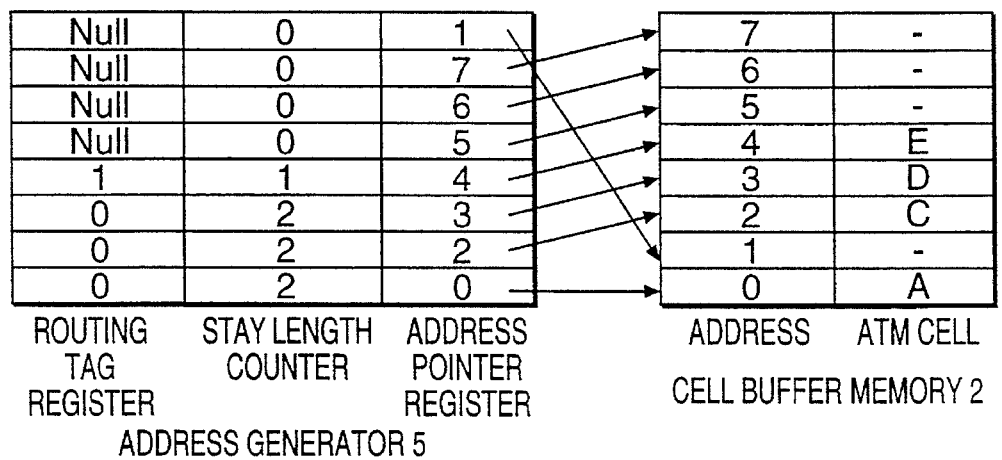

For example, the change in the case where the cell E routing to the output port 1 is input and the cell routing to the output port 1 is output at a cell cycle from the condition shown in FIG. 47(a) is shown in FIG. 47(b).

At the time the former cell cycle has been terminated, the value of the counter is incremented by one. The cell stored in the second unit from the bottom in FIG. 47(a) is output and the cell newly input in the fourth unit from the bottom in FIG. 47(b) is stored.

Figure 47C:
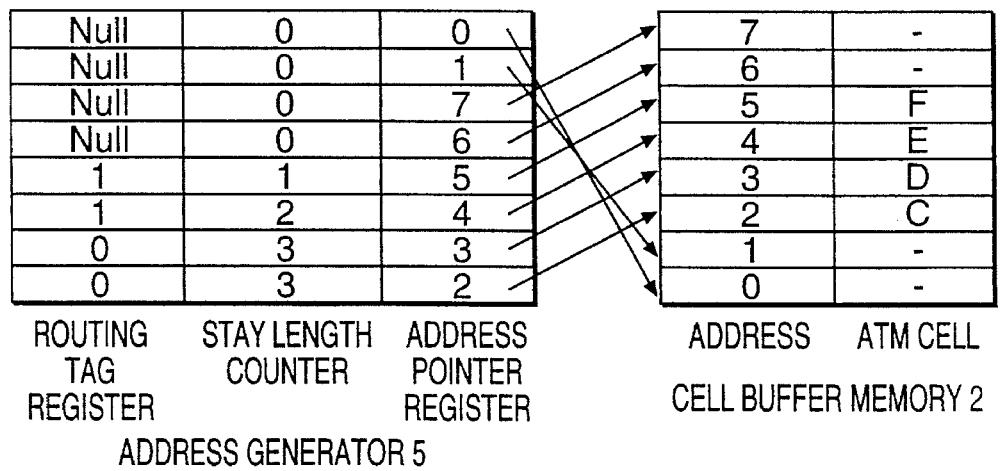
Figure 48:
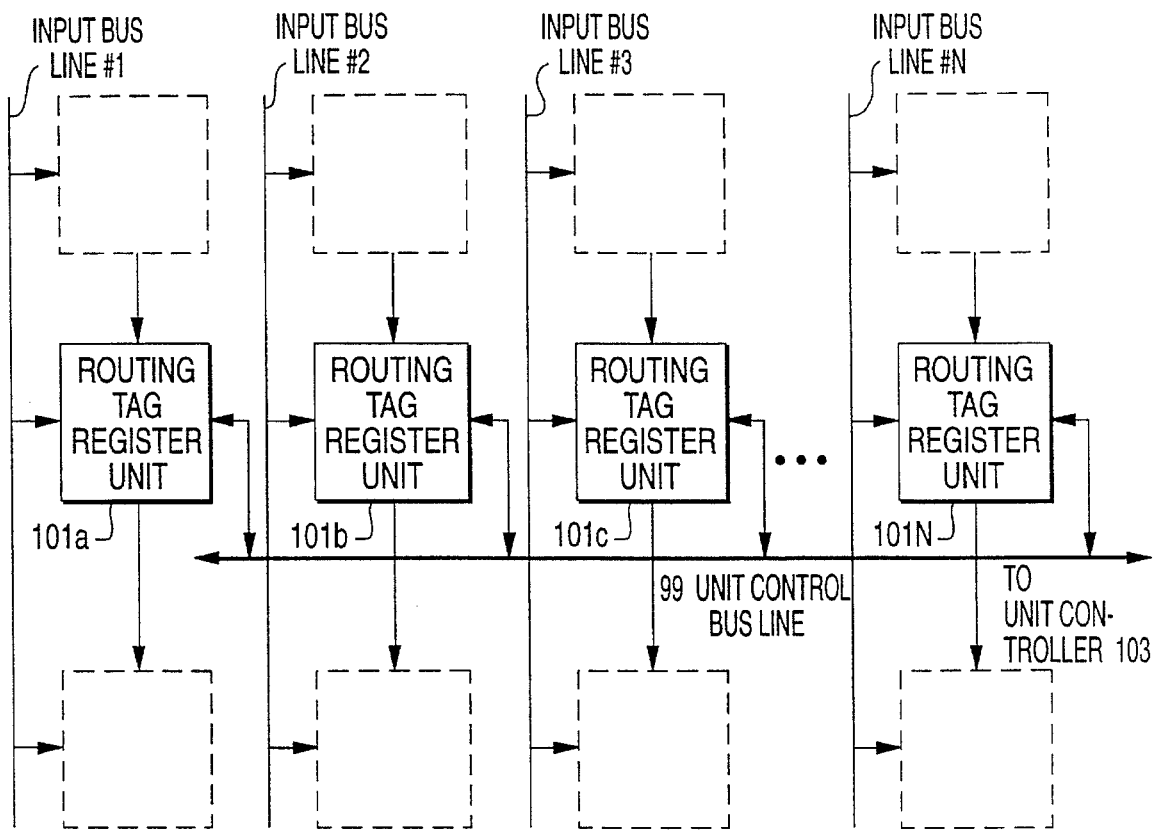
FIG. 48 is a diagram showing a structure of the routing tag register shown in FIG. 41.

In the same manner, the change in the case where the cell F routing to the output port 1 is input and the cell routing to the output port 0 is output at the next cell cycle from the condition shown in FIG. 47(b) is shown in FIG. 47(c).

Namely, under the condition of FIG. 47(a), the cells A, B, C and D are input, in the next cycle (FIG. 47(b)), the cell B is output and the cell E is input, and in the next cycle (FIG. 47(c)), the cell A is output and the cell F is input.

Accordingly, the cells C and D are stagnant in the cell switch during the three cell cycles, the cell E is stagnant during the two cell cycles, and the cell F is stagnant during the one cell cycle.

Next, the cell nullification operation will be explained. When the time of stay in the cell switch is longer than a predetermined time, in order to effectively utilize the band region, the cell should be nullified. The cell nullification operation means an operation for nullifying the cell having a long stay length.

In the cell nullification operation, the value of the stay length counter 102 is compared with the upper limit of the stay length. If the value of the stay length counter 102 exceeds the upper limit, the cell is nullified. At this time, the value of the routing tag register is reset to "Null" and the value of the counter is reset to "0". The nullified unit is shifted in the shift operation.

A structure of the routing tag register will be explained.

Figure 49:
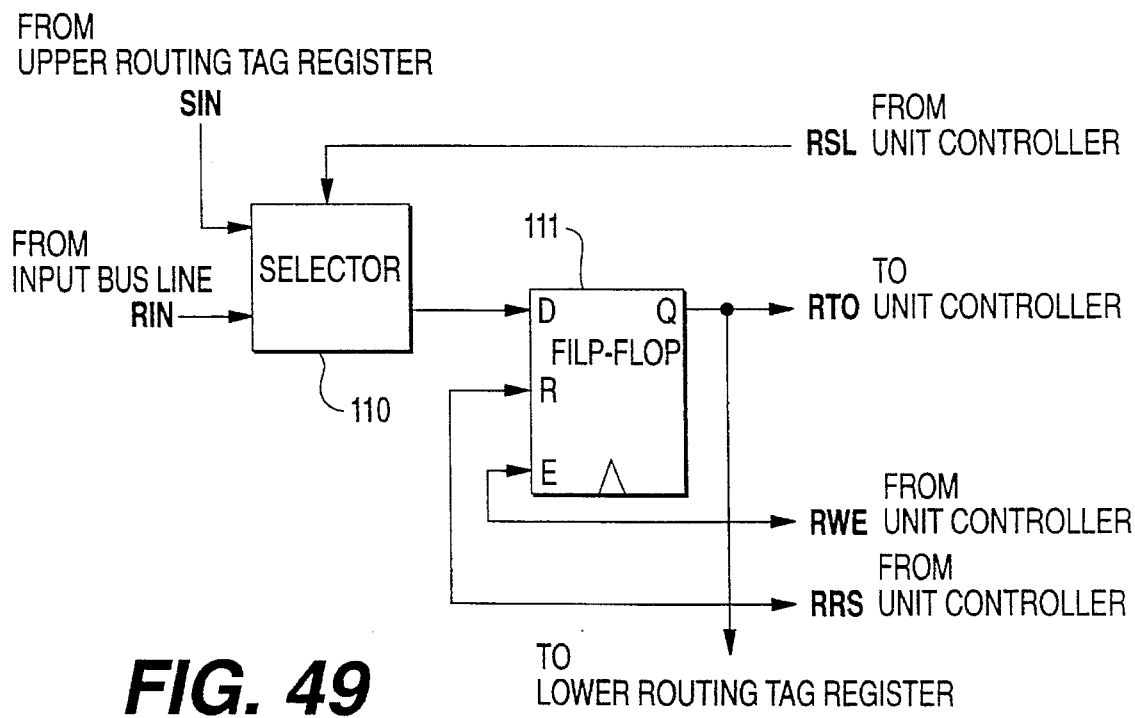
FIG. 49 is a diagram showing a structure of the routing tag register unit shown in FIG. 41.

The structure of the routing tag registers 101a, 101b, . . . , 101N is shown in FIG. 49. The routing tag registers 101 are N routing tag register units arranged as shown in FIG. 49.

The routing tag register units are composed of selectors 110 and flip-flop circuits 111 as shown in FIG. 49.

In FIG. 49, SIN is the routing tag input in the shift operation, RIN is the routing tag input in the cell input, RSL is the switching signal between RIN and SIN, RTO is the output of the flip-flop circuit 111, RRS is the reset signal of the flip-flop circuit 111, and RWE is the write enable signal of the flip-flop circuit 111. In accordance with the instruction from the unit controller, the selector 110 switches the signal RIN from the input bus line and the signal SIN from the adjacent routing tag register. The flip-flop circuit 111 stores the signal switched by the selector 110 in accordance with the instruction from the unit controller.

In the cell input, the selector 110 is instructed by the unit controller so as to output the signal from the input bus line. In the non-cell input, the selector 110 is instructed to output SIN.

The structure of the address pointer registers 106 will be explained.

Figure 50:
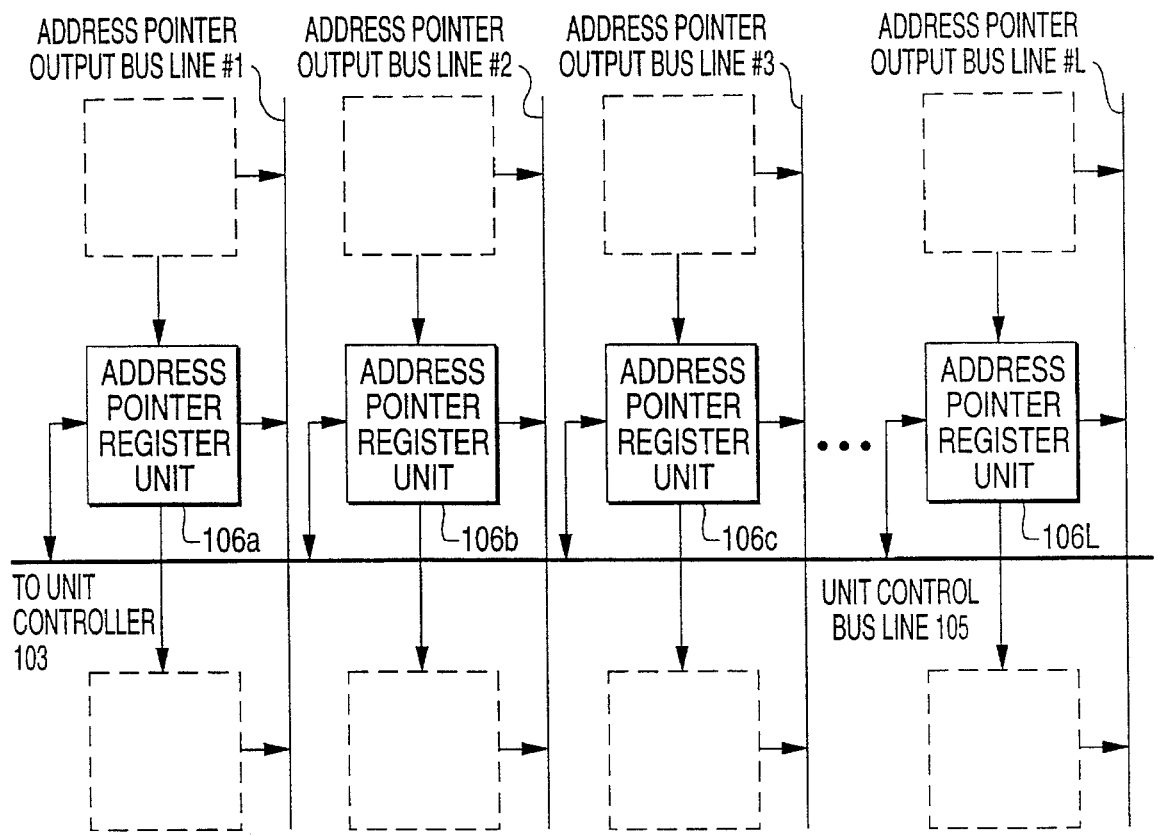
FIG. 50 is a diagram showing a structure of the address pointer register shown in FIG. 41.
Figure 51:
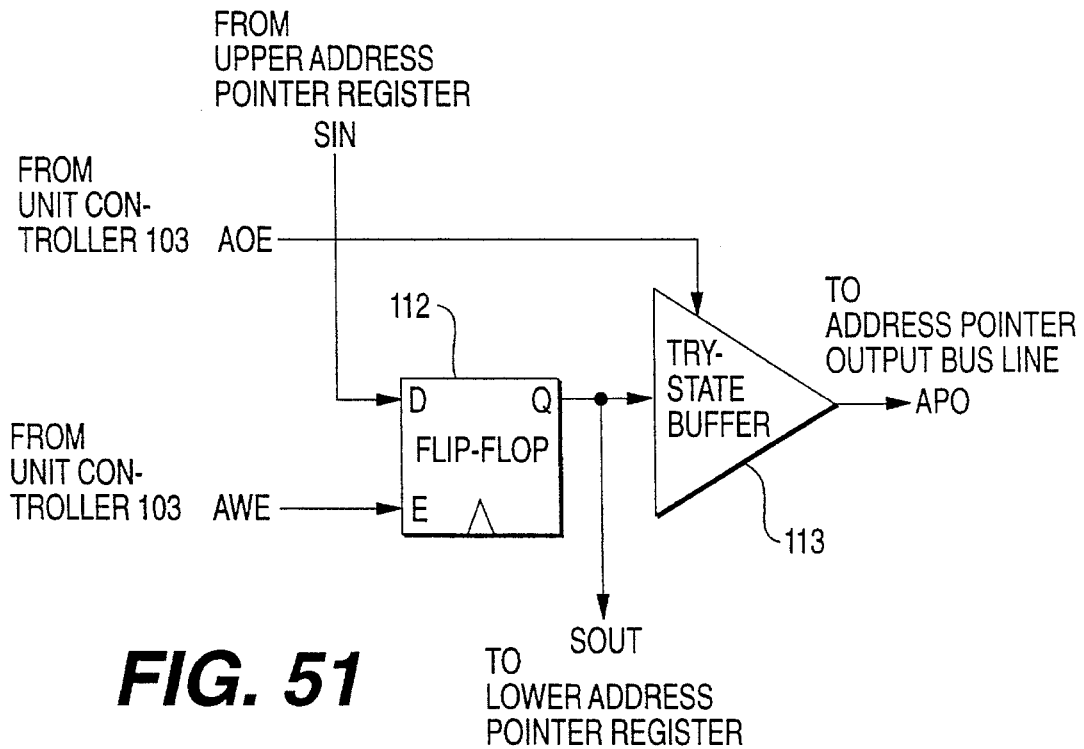
FIG. 51 is a diagram showing a structure of the address pointer register unit shown in FIG. 41.

The structure of the address pointer registers 106 is shown in FIG. 50. The address pointer registers 106 are a number (L) of address pointer register units 106a, 106b, . . . , 106L arranged as shown in FIG. 50.

The address pointer register units are composed of flip-flop circuits 112 for storing the values of the addresses and tristate buffers 113 for controlling the output of the values of the addresses to the address pointer output bus line.

In FIG. 50, SIN is the address pointer input in the shift operation, APO is the output of the flip flop circuit 112, AOE is the output enable signal to the bus line, and AWE is a write enable signal of the flip-flop circuit 112.

The writing to the flip-flop circuit 112 and the output control of the tristate buffer 113 are carried out by the unit controller.

Figure 52:
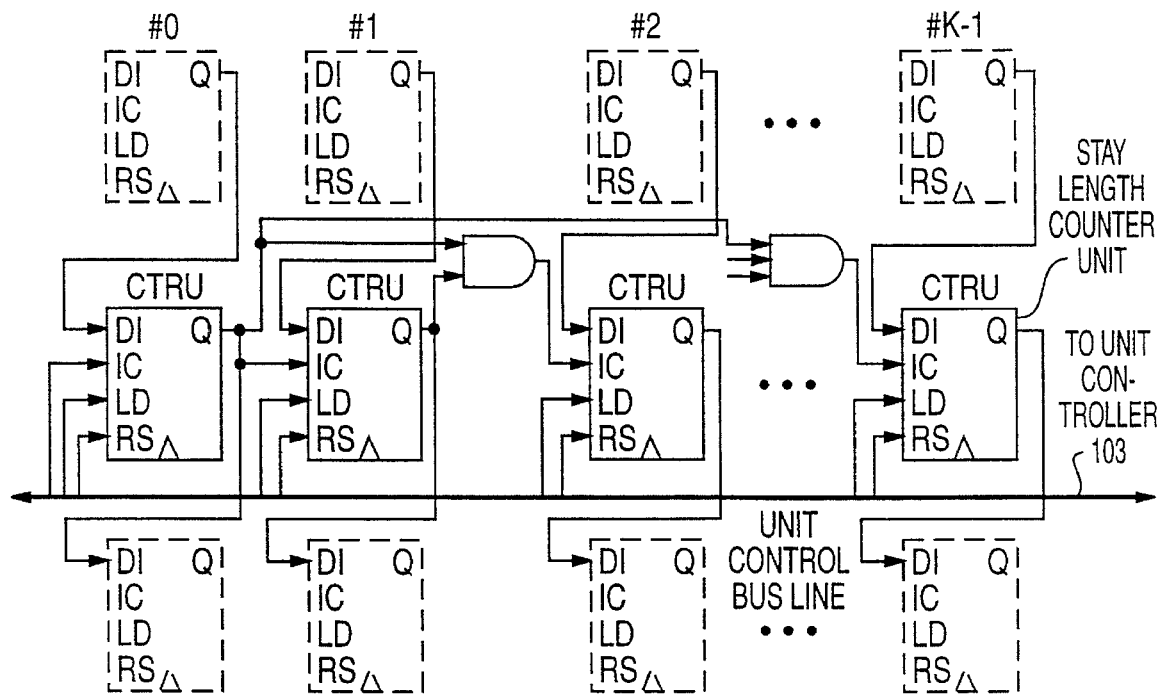
FIG. 52 is a diagram showing a structure of the stay length counter shown in FIG. 41.
Figure 53:
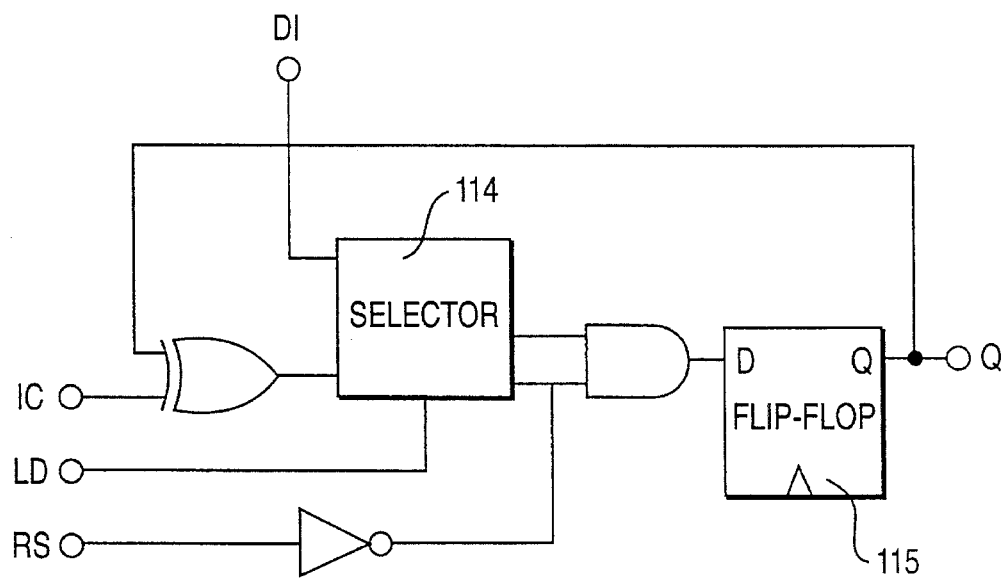
FIG. 53 is a diagram showing a structure of the stay length counter unit shown in FIG. 41.

The stay length counter 102 has a structure as shown in FIG. 52. Namely, a number (K) of stay length counter units CTRU are connected as shown. Each stay length counter unit has a selector 114 and a flip-flop circuit 115 as shown in FIG. 53.

The stay length counter unit is designed to meet a logic table shown in FIG. 68. Namely, if the reset signal RS is "H", without depending upon the other inputs, the output value Q of the flip-flop circuit 115 is set to "L", if RS is "L" and the load signal LD is "H", the value of the data input DI is set to Q, and if RS and LD are "I," and the increment signal IC is "H", a reverse signal of the value stored in the flip-flop circuit 115 is set.

If the stay length counter units are connected as shown in FIG. 52, it is possible to constitute a K bit binary counter.

Any counter may be used if the counting operation, the reset operation and the load operation may be carried out in the present embodiment.

The counter operation means an operation for incrementing the value of the counter by one when the increment signal is "enable", the reset operation means an operation for resetting the value of the counter to zero when the reset signal is "enable", and the load operation means an operation for setting the value of the data input ADI to the counter when the load signal is "enable".

Figure 54:
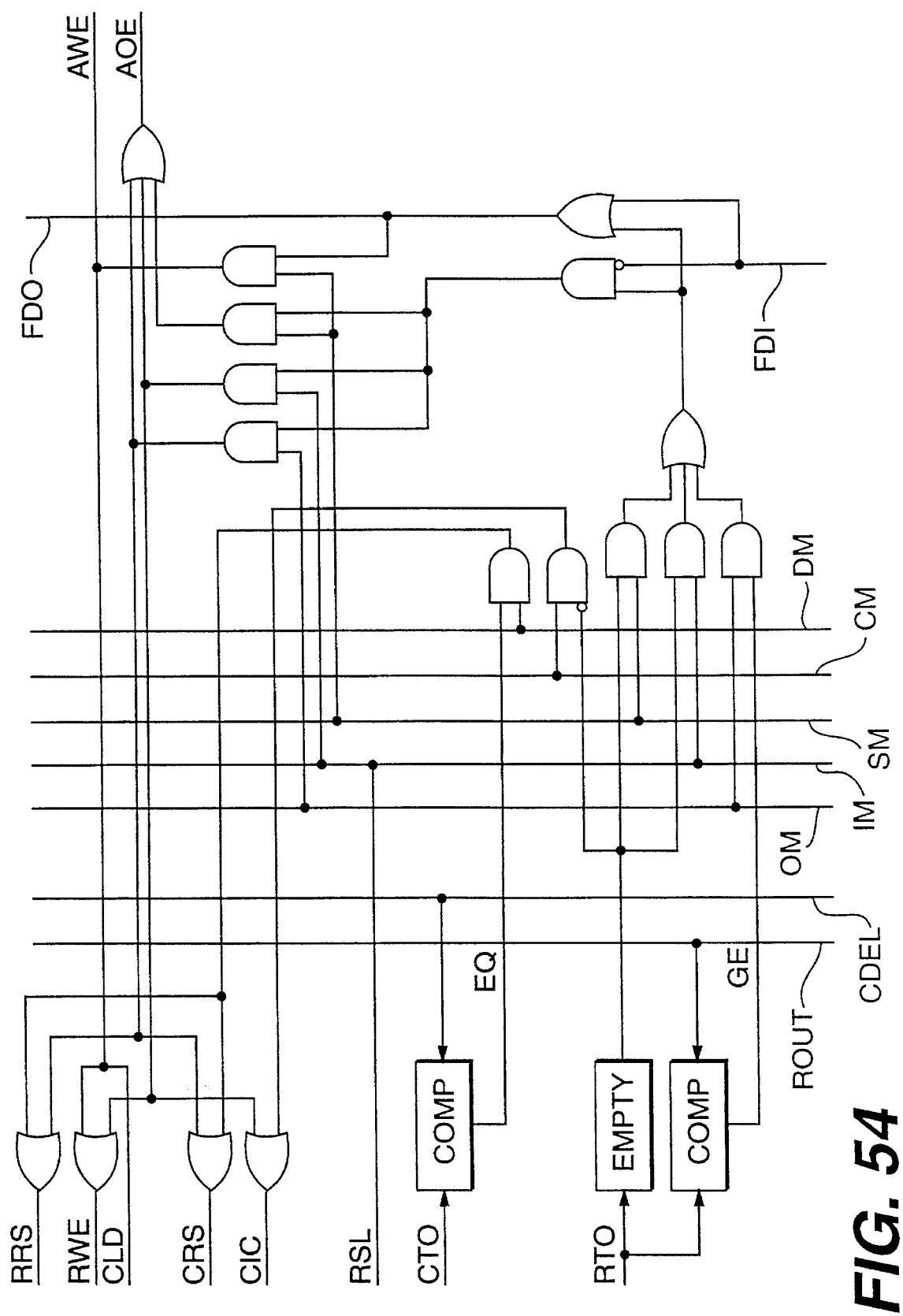
FIG. 54 is a diagram showing a structure of the unit controller shown in FIG. 41.

A structure of the unit controller is shown in FIG. 54.

The operation of the unit controller 102 will be explained.

In the cell input, in the case where the cell is stored in the address corresponding to the unit lower than the unit of interest and the cell is not stored in the unit of interest, the routing tag is written in the routing tag register from the input bus line, the value of the counter is incremented from zero to one, and the value of the address pointer register is output to the address pointer output bus line.

In the cell output, the value of the routing tag to be output, transferred from the controller unit CNT, is compared with the value of the routing tag stored in the routing tag register. If these values are identical with each other and the routing tag is not detected in the units lower than the unit of interest, the value stored in the address pointer resister is output to the address pointer register output bus line. At this time, the values of the routing tag register 101 and the stay length counter 102 are reset to "Null" and "0", respectively.

In the shift operation, the unit where the routing tag register is vacant is searched out. The value of the address pointer of the unit which has been searched is output to the address pointer output bus line. At the same time, the address pointer which has been output to the address pointer output bus line is input to the uppermost unit, and the values of the units onward from the searched unit are shifted by one unit.

In the count-up operation, the value of the stay length counter 102 is incremented by one.

In the cell nullification operation, the value of the stay length counter 102 is compared with the upper limit of the stay length. If the value of the stay length counter 102 exceeds the upper limit, the values of the routing tag register 101 and the stay length counter 102 are reset to "Null" and "0", respectively.

An example of the detailed structure of the unit controller 103 for realizing these operation is shown in FIG. 54.

In FIG. 54, OM is the signal representative of the output mode, IM is the signal representative of the input mode, SM is the signal representative of the shift mode, CM is the signal representative of the count-up operation mode, DM is the signal representative of the nullification operation mode, ROUT is the signal for instructing the output port of the cell to be output, CDEL is the value of the upper limit of the stay length, RTO is the value of the routing tag register 101, CTO is the value of the stay length counter 102, RWE is the write enable signal of the routing tag register 101, RSL is the input switching signal of the routing tag register 101, RRS is the reset signal of the routing tag register 101, AWE is the write enable signal of the address pointer register 106, AOE is the output enable signal of the address pointer resister 106, CLD is the load signal of the stay length counter 102, CRS is the set signal of the stay length counter 102, CIC is the increment signal of the stay length counter 102, FDI is the signal representative of the search of the unit lower than the unit to be searched, FDO is the signal representative of the search of the unit to be searched or the unit lower than the unit to be searched, EQ is the signal showing the fact that the value of the routing tag register 101 is equal to the value of the output port to be output, and GE is the representative of the fact that the value of the stay length counter 102 exceeds the upper limit of the stay length. Also, COMP is the comparator for comparing the values, and EMPTY is the detector for detecting that the content recorded in the routing tag is "Null".

With the address generator 5 having such a structure, it is possible to nullify the cells having the long stay length in the cell switch and to effectively utilize the band region.

A first modification of the second embodiment will now be described.

Figure 55:
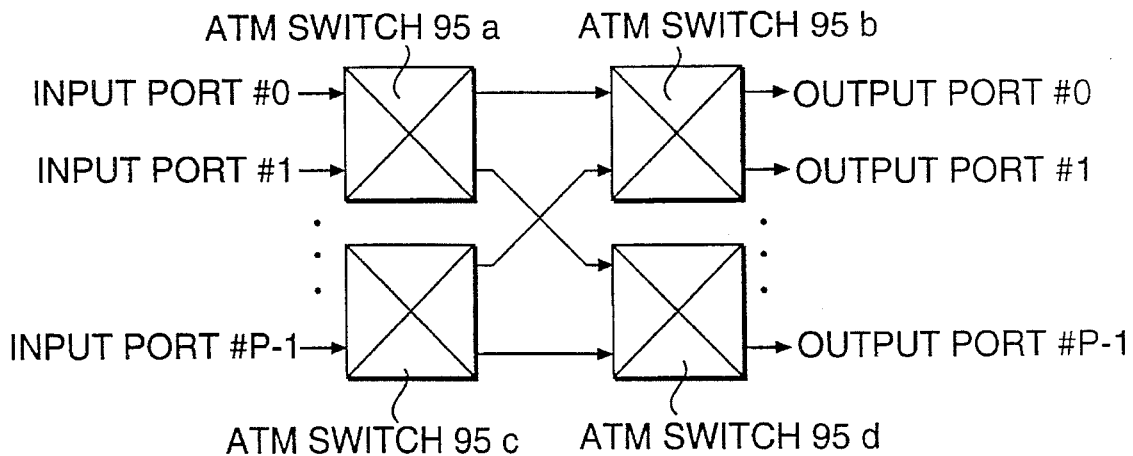
FIG. 55 is a diagram showing a structure where the cell switches are connected in a multi-layer manner.

In the first modification shown in FIG. 55, the ATM switch 95 will be explained in which ATM switches 95*a*, 95*b*, 95*c* and 95*d* are connected in a multi-stage manner. A region (hereinafter referred to as a stay length field) for recording the stay length to the cell is provided therein. In each ATM switch 95*a*, 95*b*, 95*c*, 95*d*, the stay length counted in each ATM switch 95*a*, 95*b*, 95*c*, 95*d* is added to the stay length written in the cell, and the sum is written in the stay length field.

Figure 56:
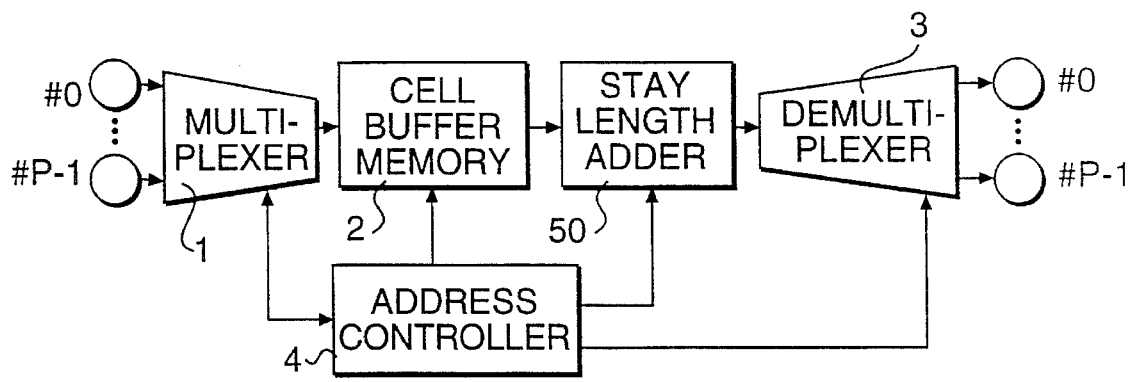
FIGS. 56(a) and 56(b) are diagrams showing structure showing the cell switches having the stay length adder function.
Figure 56:
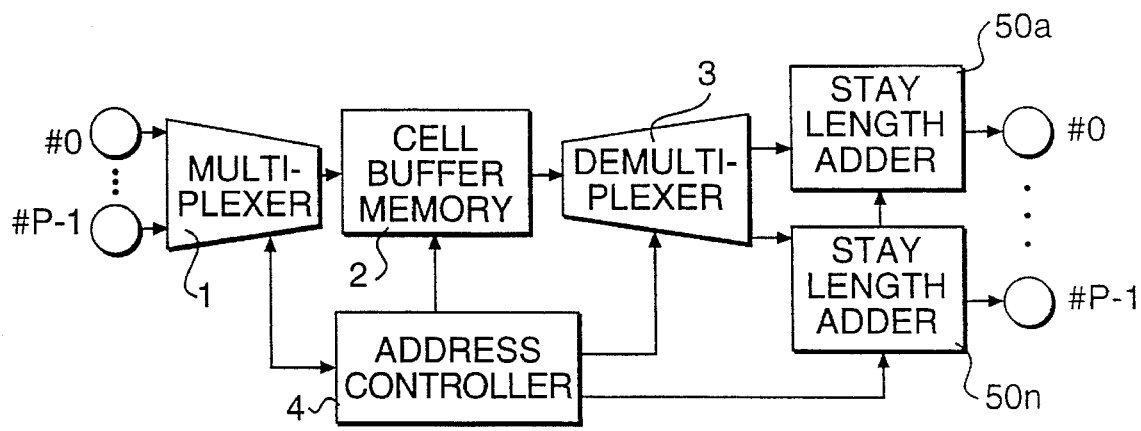

In order to add the stay length counted by the ATM switch 95 to the stay length field, the cell switch 95 is constructed as shown in FIGS. 56(*a*) and 56(*b*). In the ATM switch shown in FIG. 56(*a*), a stay length adder 50 is interposed between the cell buffer memory 2 and the demultiplexer 3. In the ATM switch shown in FIG. 56(*b*), stay length adders 50*a*, . . . , 50*n* are added to the outputs of the demultiplexer 3.

Figure 57:
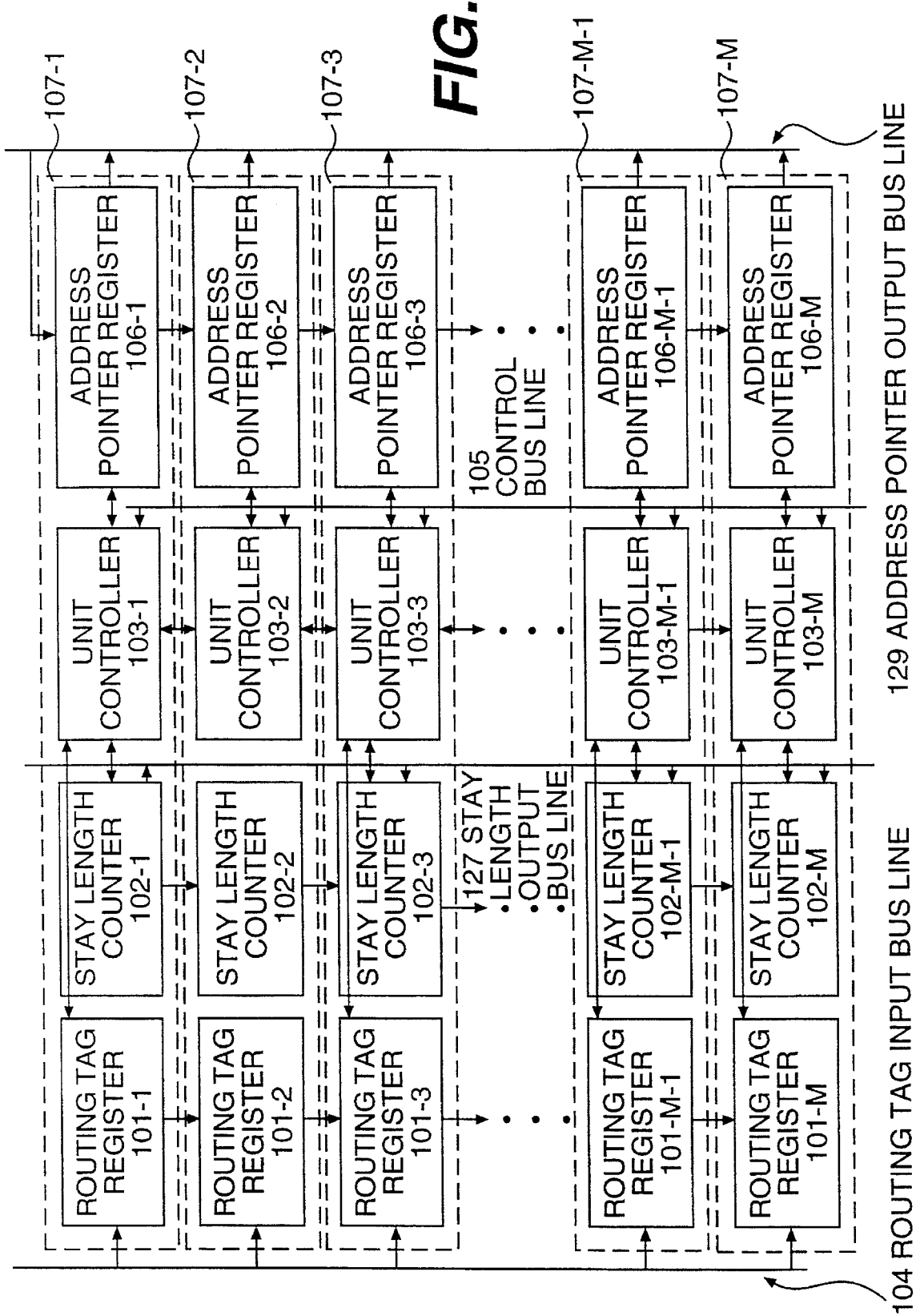
FIG. 57 is a diagram showing a structure of the address generator having the stay length output function.
Figure 58:
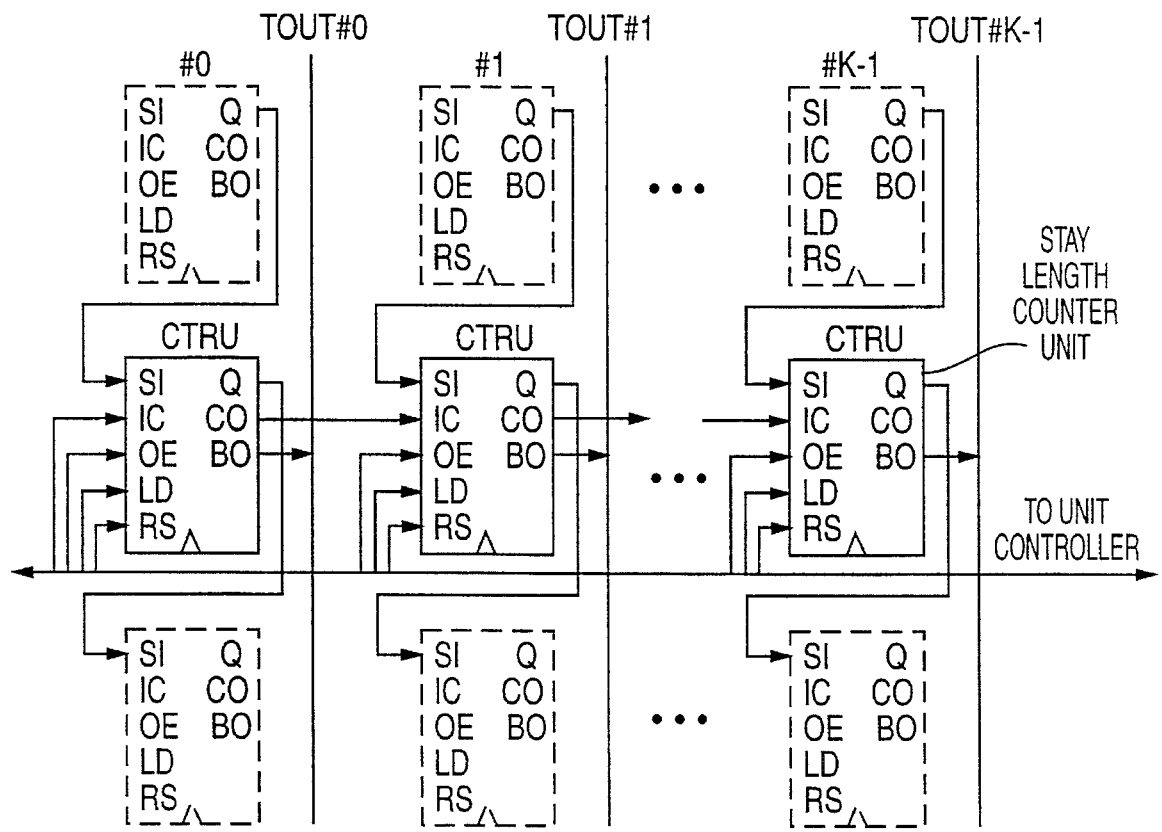
FIG. 58 is a diagram showing a structure of the stay length counter having the stay length output function.
Figure 59:
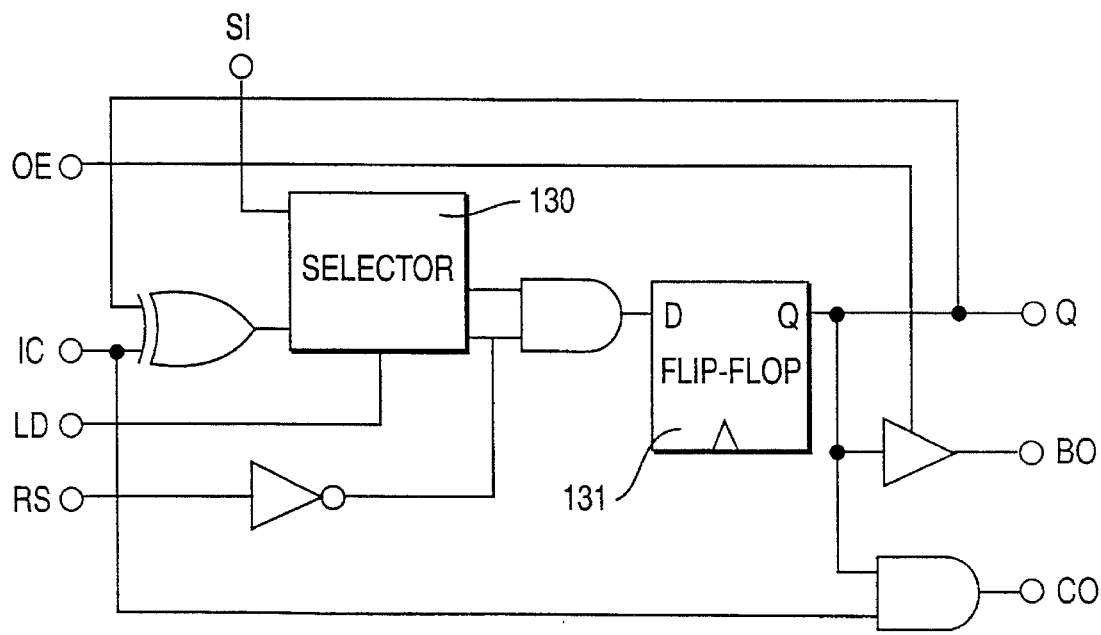
FIG. 59 is a diagram showing a structure of the stay length counter unit having the stay length output function.
Figure 60:
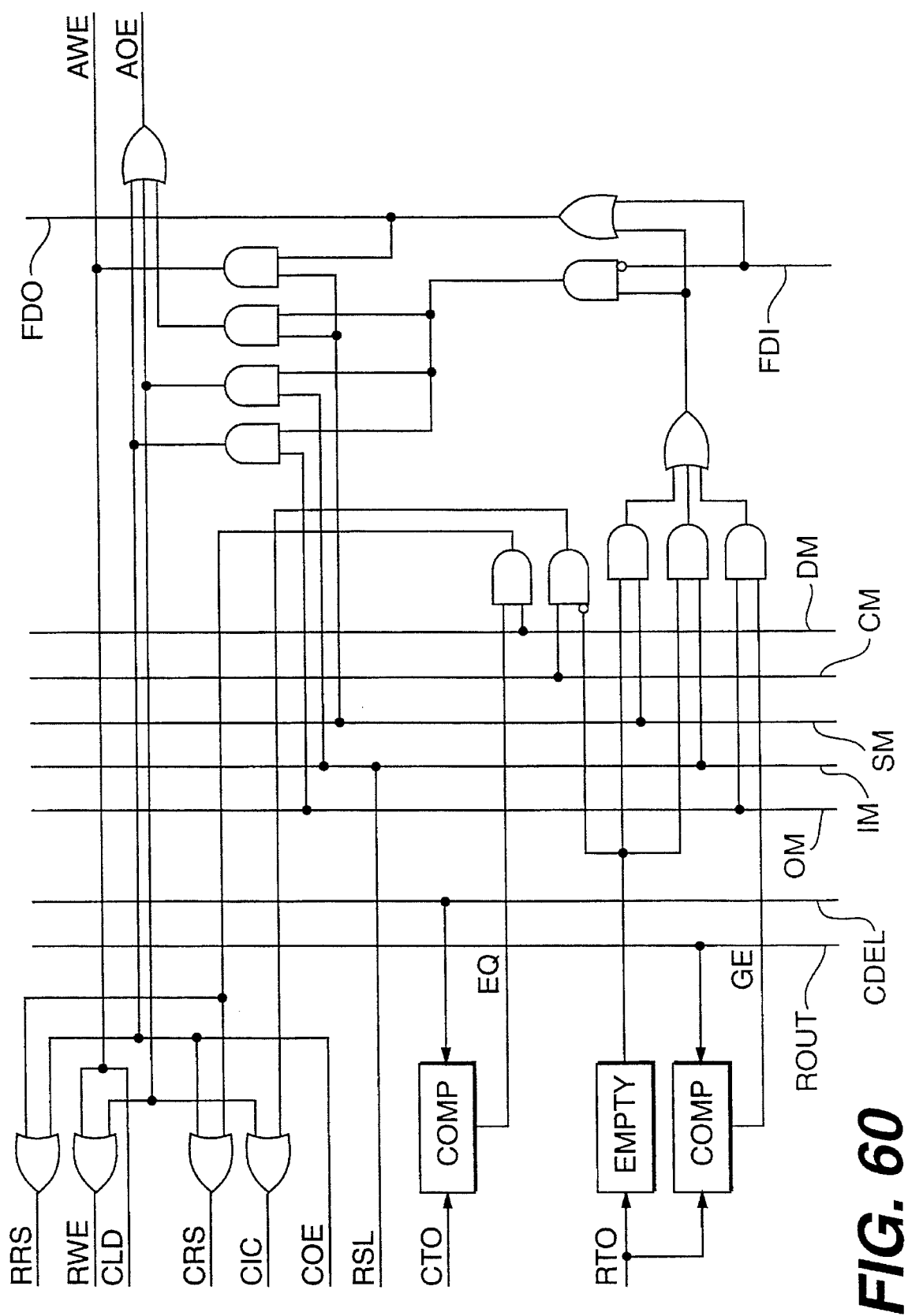
FIG. 60 is a diagram showing a structure of the unit controller having the stay length output function.

In the address generator 5 used in such ATM switches, as shown in FIG. 57, a stay length output bus line 127 is provided for outputting the value of the stay length counter 102. The value of the stay length counter 102 selected in the cell output is output to the bus line 127 and is transferred to the stay length adder. The output control to the stay length output bus line is effected by the unit controller 103 of each unit. Also, the stay length counter 102 assumes the structure shown in FIG. 58 for outputting the value of the stay length counter 102 to the stay length output bus line 127. As shown in FIG. 58, the stay length counter 102 is constituted by connecting a number (K) of stay length counter units (each composed of a selector 130 and a flip-flop circuit 131) shown in FIG. 59. A tristate buffer is connected to the stay length counter unit for outputting the value to the bus line as shown in FIG. 53. The unit controller 103 takes a structure shown in FIG. 60 for controlling the thus constructed stay length counter 102. In FIG. 60, the same reference characters as those in FIG. 54 in connection with the second embodiment are used to represent the like components but COE is added. COE is the output enable signal for outputting the value of the stay length counter 102 to the stay length output bus line.

The stay length adder adds the stay length transferred from the address generator 5, the stay length of the cell output from the cell buffer memory or the demultiplexer, and the value of the field, and outputs the sum thereof.

By using such ATM switches, it is possible to add the values of the stay length in each ATM switch, and to count the total sum of the stay length even if the cell switches are connected in the multi-stage fashion.

A second modification of the second embodiment will now be described. In respect of the second modification, a method will now be described for adding the stay length in each ATM switch without using the adder when the ATM switches are connected in the multi-stage fashion.

In this system, the stay length field written in the cell is extracted by the multiplexer and transferred to the address generator 5.

In the address generator 5, the value of the stay length field transferred from the multiplexer is loaded onto the stay length counter. The stay length counter 102 increments the count for every cell cycle, using the value as an initial value. Accordingly, the value of the stay length counter 102 is the sum of the value of the stay length of the former ATM switch and the stay length in this ATM switch. If this value is added to the stay length field when the cell is output, the stay length field is the total sum of the stay length in each ATM switch.

Figure 61:
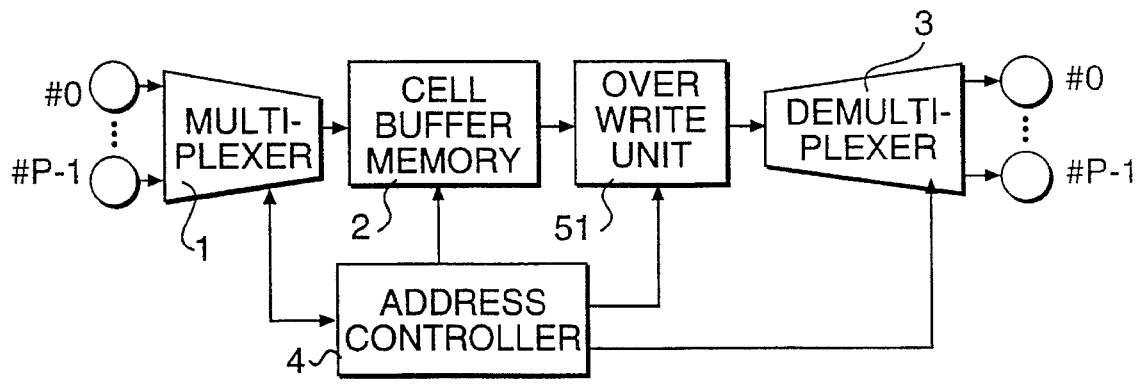
FIGS. 61(a) and 61(b) are diagrams showing structures of the cell switches having the stay length input and output function.
Figure 61:
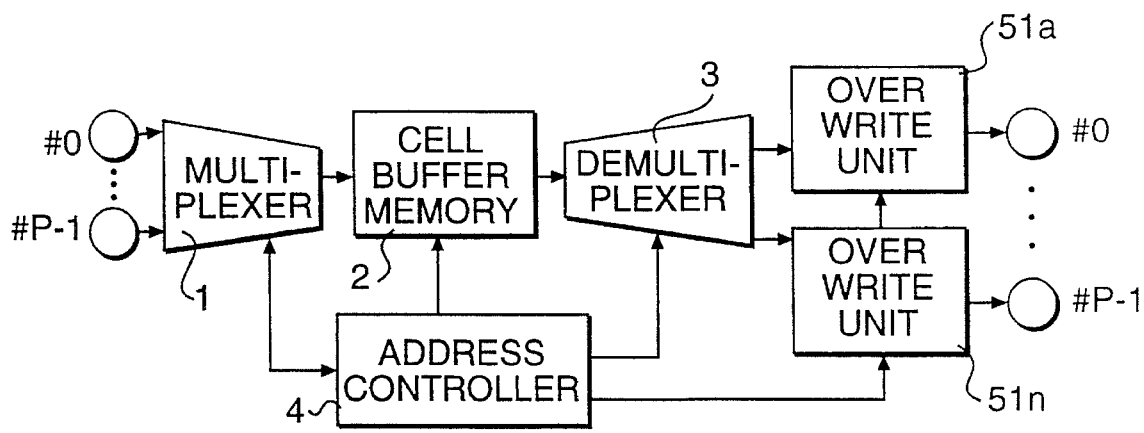
Figure 62:
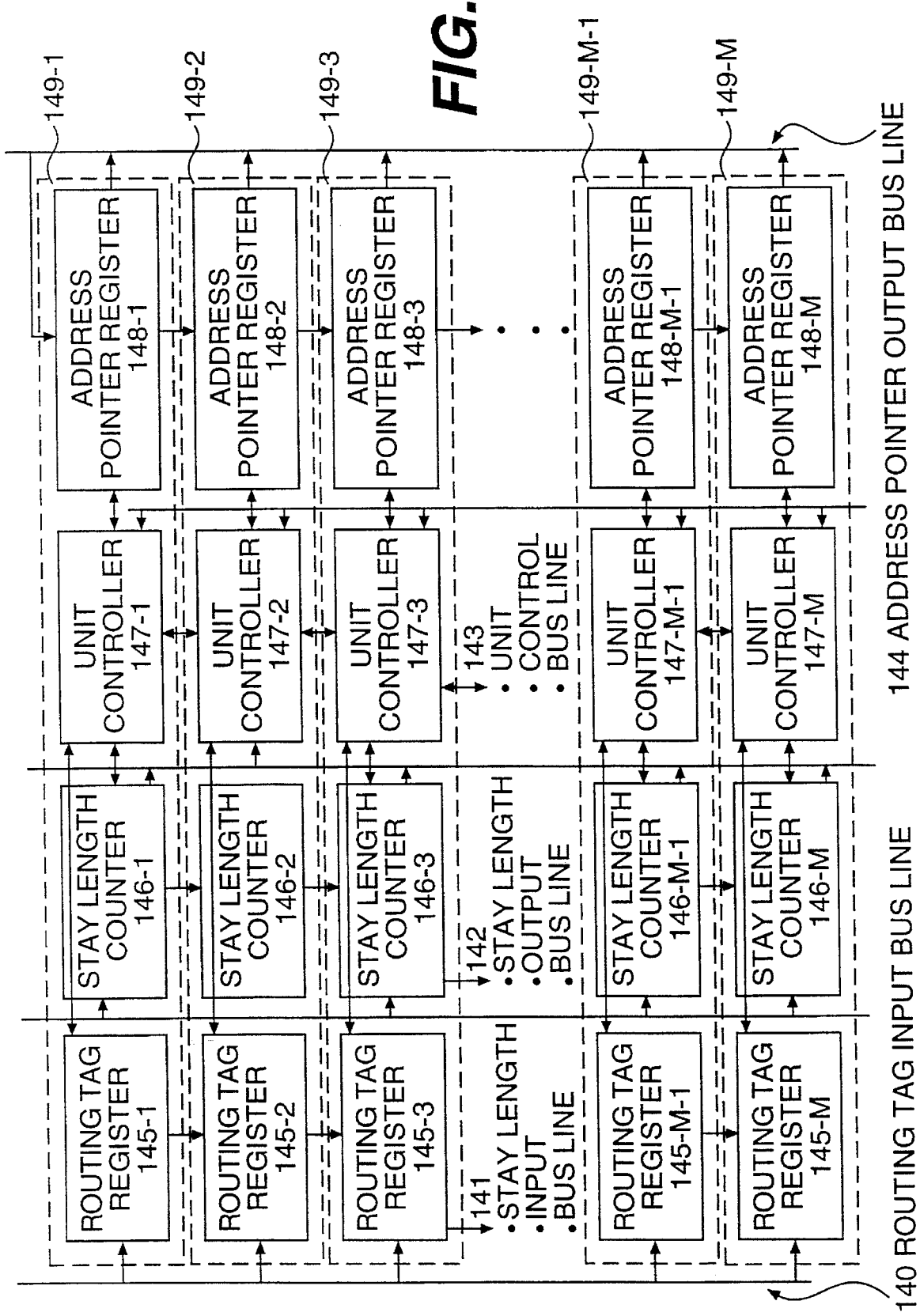
FIG. 62 is a diagram showing a structure of the address generator having the stay length input and output function.

The structure of the cell switch for realizing such an operation is shown in FIG. 61(*a*) and 61(*b*). Namely, over-write units 51 or 51*a*, . . . 51*n* for overwriting the stay length are added to the output of the cell buffer memory 2 or the outputs of the multiplexer 3.

Figure 63:
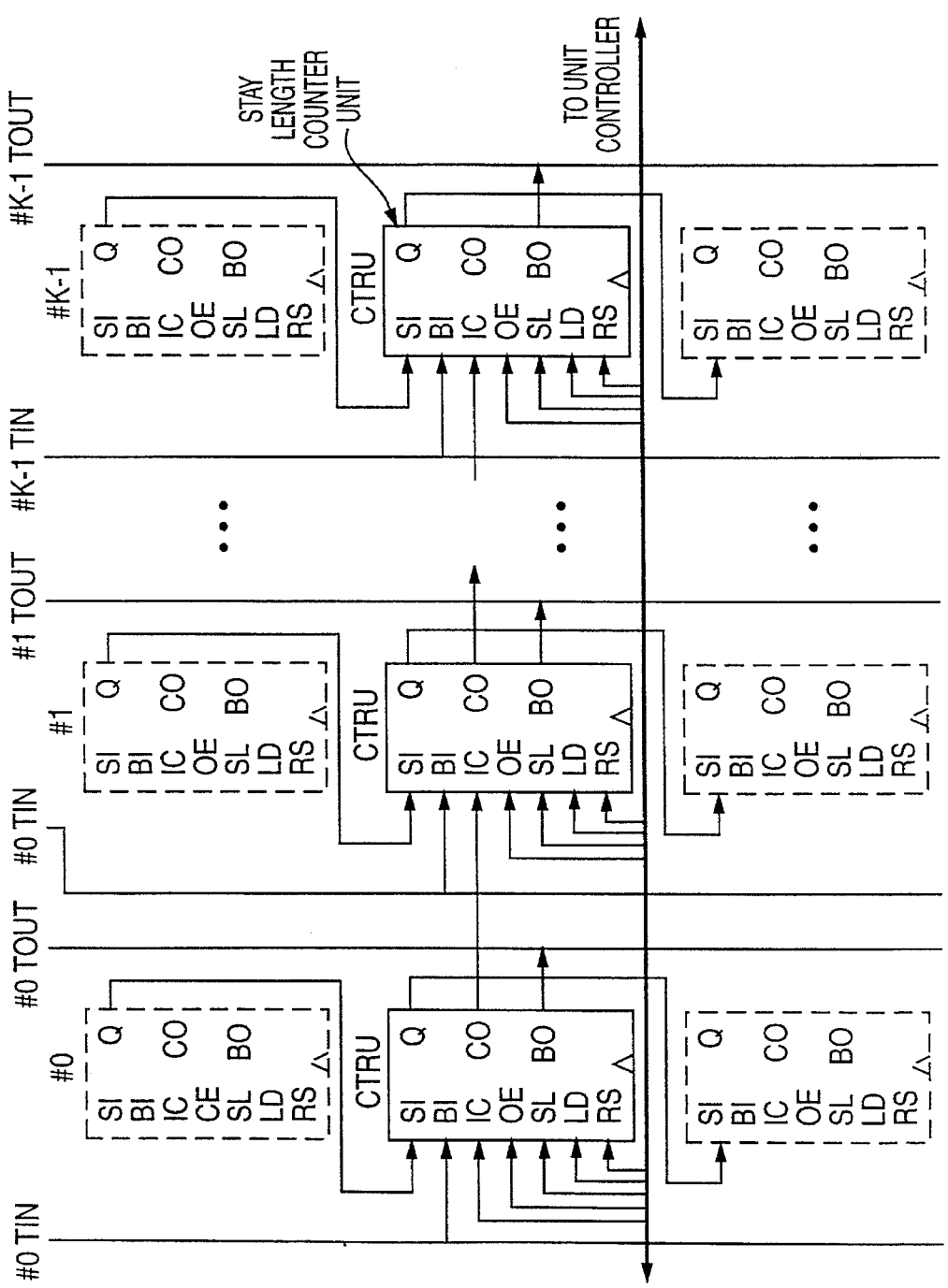
FIG. 63 is a diagram showing a structure of the stay length counter having the stay length input and output function.
Figure 64:
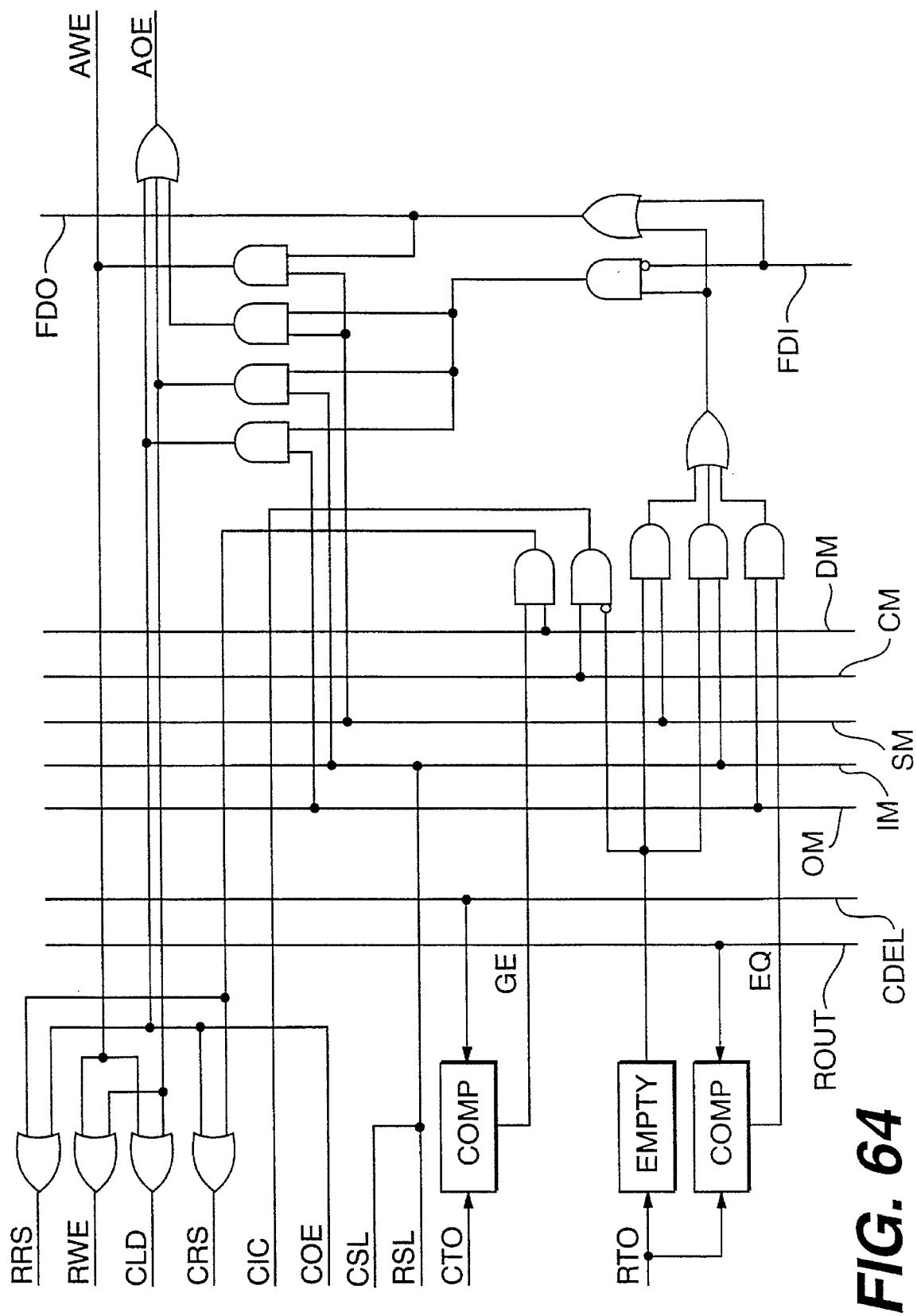
FIG. 64 is a diagram showing a structure of the unit controller having the stay length input and output function.
Figure 65:
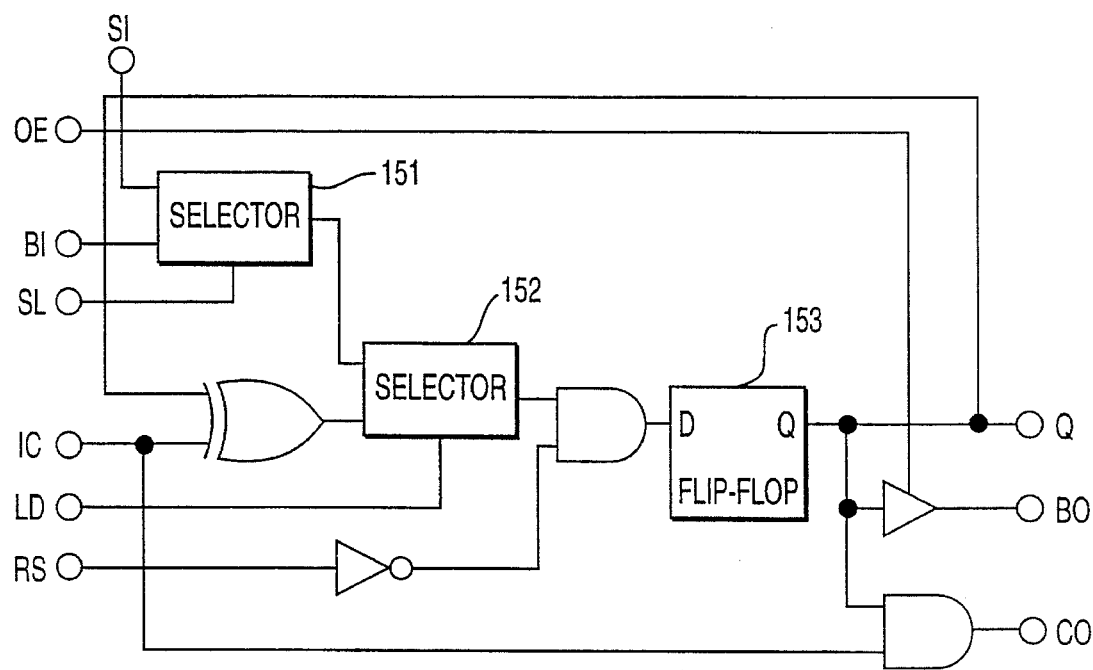
FIG. 65 is a diagram showing a structure of the stay length counter unit having the stay length input and output function.

The stay length input bus line is added to the system shown in FIG. 57 in the address generator 5 as shown in FIG. 57. Also, the stay length counter 102 is constituted by connecting the stay length counter units shown in FIG. 65 as shown in FIG. 63. Selectors 151 and 152 for switching the inputs from the stay length input bus line and the stay length counter 102 of one-step-up are added to the stay length counter unit. The switching control between the selectors 151 and 152 is carried out by the unit controller shown in FIG. 64. Namely, in the cell input (when the IM signal is enable), the selector is switched over on the side of the stay length input bus line, and when the unit is searched out, the load signal of the stay length counter is enable. The other operation is the same as that of the second embodiment. The same reference characters as those in FIG. 60 in connection with the first modification are used in this modification but CSL is added. CSL is the switching control signal for switching the value of the one-step-up stay length counter and the value of the stay length input bus line when the value of the counter is loaded.

With such ATM switches, it is possible to count the total sum of the stay length in each cell switch even if the ATM switches are connected in the multi-stage manner.

A third modification of the second embodiment will now be described.

In the third modification, the upper limit of the stay length is written in advance in the cell to be input in the ATM switch, the value is subtracted one by one by the cell switch every time the cell cycle is increased, and the cell is nullified when the value is zero.

In the second embodiment and the first and second modifications thereof, the upper limit of the stay length for each cell is kept constant. However, in the third modification, there are cells that requires short delay and other cells that do not require the short delay. Also, among the short delay cells, there are possible various values in the upper limit of the stay length. In the second embodiment and the first and second modifications thereof, the upper limit of the stay length for each cell is always kept constant.

Figure 66:
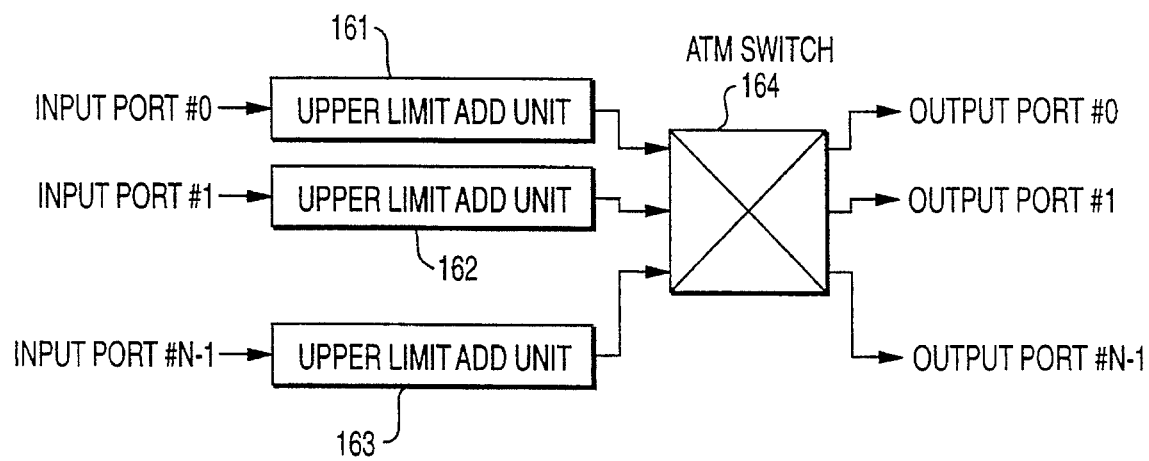
FIG. 66 is a diagram showing a structure of the cell switch for setting an upper limit of the stay length for each cell.

In order to make possible to set upper limits for the delay time for each cell, as shown in FIG. 66, upper limit adder units 161, 162 and 163 for writing the upper limits of the stay length into the stay length fields of the cells before being input into the cell switch 164 are provided.

There are method for setting the stay length upper limits in the upper limit adder units. For example, the upper limit may be set for every call, or the upper limit may be set in response to the condition of the cell switch 164.

In the address generator of the cell switch 164, the value of the stay length field is loaded on the stay length counter. Since the upper limit of the stay length is written in the stay length field, the stay length counter subtracts the value of the stay length counter one by one for every cell cycle. Thus, the counter counts down, and cancel the corresponding cell when the value of the stay length counter is zero.

With such a structure, it is possible to set the maximum stay length for each cell.

A fourth embodiment will be explained with reference to FIG. 67.

In the second embodiment and the first through third modifications thereof, the cell where the upper limit of the stay length is reached is canceled. In the fourth modification, the cell switch for outputting the cell where the stay length upper limit is reached with priority will be explained.

In order to output, with priority, the cell where the upper limit has been reached, it is searched whether or not the cell reaching the upper limit is present in the cells routing to each output port. If the cell reaching the upper limit is present, that cell is output. If no cell reaching the upper limit is present, the oldest cell in the cells routing to each output port is output.

Figure 67:
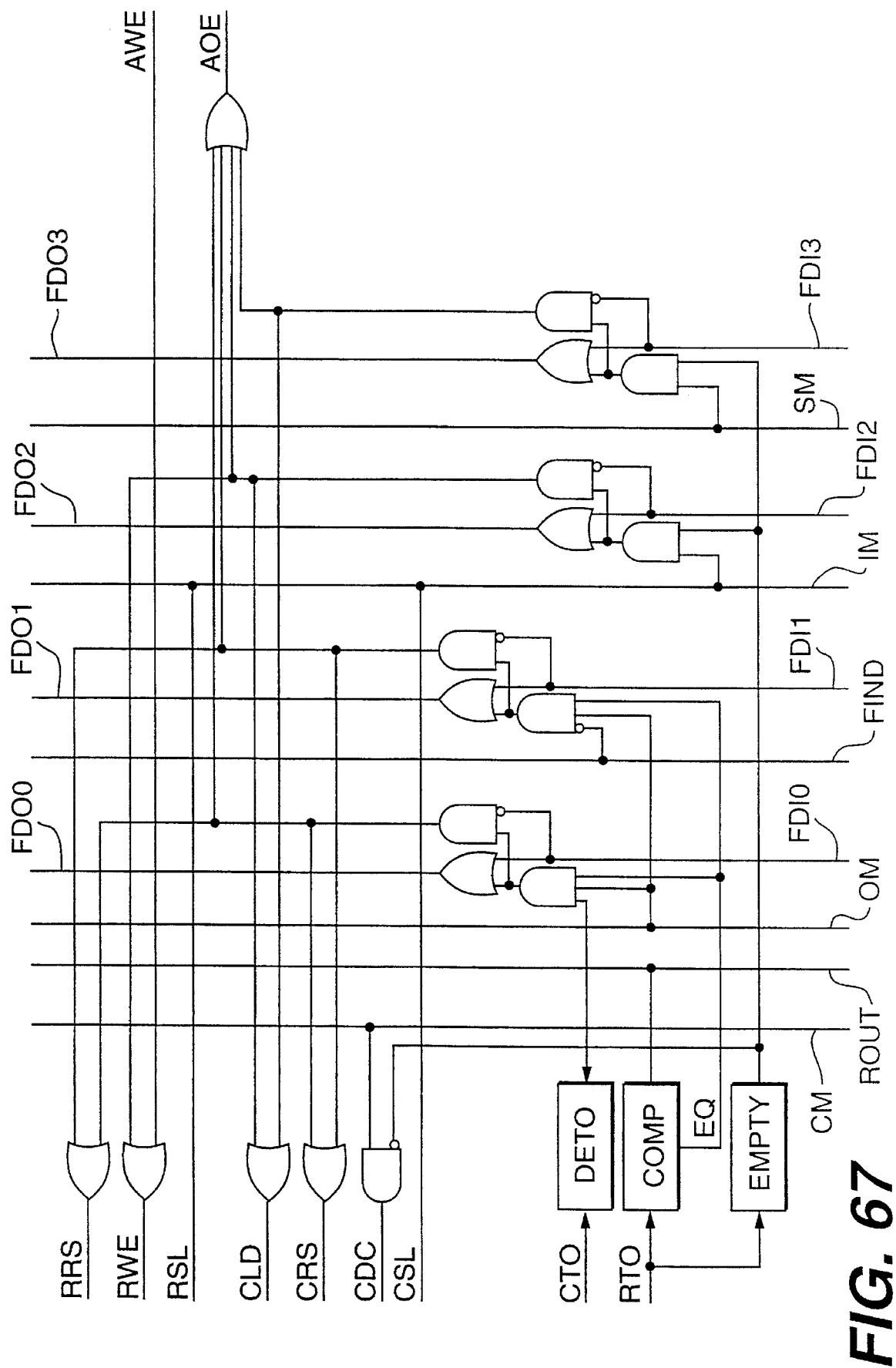
FIG. 67 is a diagram showing a unit controller for outputting the value with priority in accordance with the value of the stay length counter value.

In FIG. 67, OM is the signal representative of the output mode, IM is the signal representative of the input mode, SM is the signal representative of the shift mode, CM is the signal representative of the count-up operation mode, ROUT is the signal for instructing the output port of the cell to be output, RTO is the value of the routing tag register 101, CTO is the value of the stay length counter 102, RWE is the write enable signal of the routing tag register, RSL is the input switching signal of the routing tag register, RRS is the reset signal of the routing tag register, AWE is the write enable signal of the address pointer register, AOE is the output enable signal of the address pointer resister, CLD is the load signal of the stay length counter, FDI1 is the signal representative of the fact that the unit where the value of the stay length counter value is zero and which is coincident with the port number to be output is searched in the unit lower than that unit, FDO0 is the signal representative of the fact that the unit where the stay length counter value is zero and which is coincident with the port number to be output is searched in that unit or in the unit lower than that unit, FDI1 is signal representative of the fact that the unit which is coincident with the port number to be output is searched in that unit or in the unit lower than that unit, FDI2 is the signal representative of the fact that the vacant unit is searched out in the unit lower than that unit in the cell input, FDO2 is the signal representative of the fact that the vacant unit is searched out in that unit or the unit lower than that unit in the cell input, FDI3 is the signal representative of the fact that the vacant unit is searched out in the unit lower than that unit in the shift operation, FD03 is the signal representative of the fact that the vacant unit is searched out in that unit or the unit lower than that unit in the shift operation, and EQ is the signal showing the fact that the value of the routing tag register 101 is equal to the value of the output port to be output. Also, COMP is the comparator for comparing the values, EMPTY is the detector for detecting that the content recorded in the routing tag is "Null" and DETO is a circuit for detecting that the value of the stay length counter is zero.

With the unit controller having such structure, it is possible to realize the cell switch having the function to output the value with priority to the stay length counter value.

Figure 69:
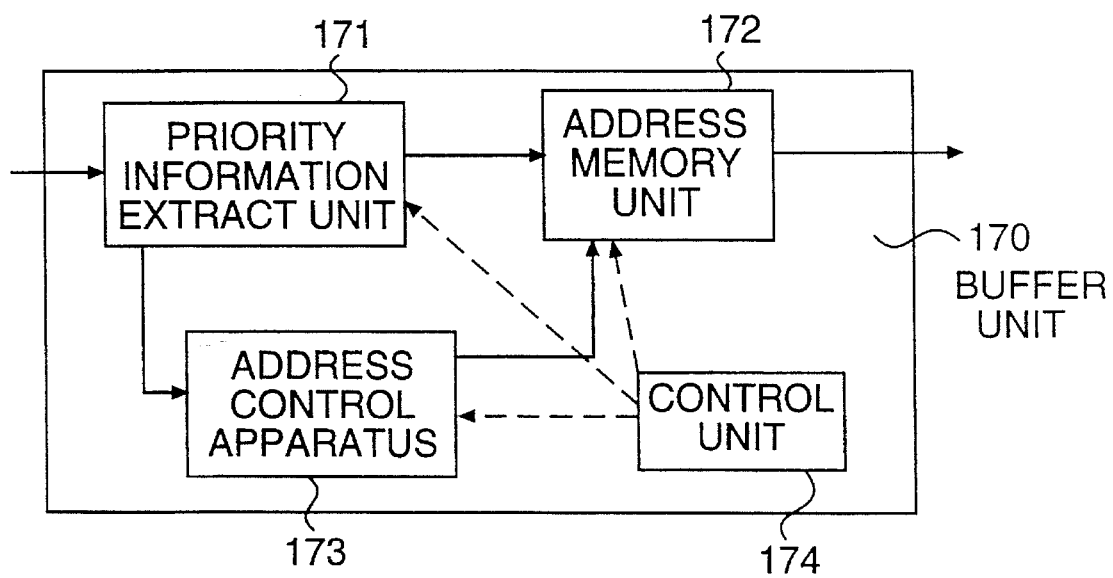
FIG. 69 is a diagram showing another embodiment of the invention.

Subsequently, the structure and the operation of the buffer for preferentially outputting the cell having the high priority based upon the priority information by storing the cells to which the priority information is given will now be described. The structure of the buffer 170 is shown in FIG. 69. The buffer 170 is composed of a priority information extract unit 171, an information data storage unit 172 for storing the information data of the cell, an address controller 173 for controlling the priority information thus extracted and for controlling the address representative of the storage region of the information data storage unit 172 storing the cell corresponding to this priority information, and a controller 174 for controlling these units. The address controller 173 generates the write address and the read address of the information data storage unit 172. When the information data are written in the information data storage nit 172, the address controller 173 for storing the priority information fed from the priority information controller 171 and at the same time transfers the write address of the information data to the information data storage unit 172. When the information data are read out, the address controller 173 searches the address including the oldest information data in the corresponding information data from the priority information of the information data to be read out and transfers the address to the information data storage unit 172. The information data storage unit 172 stores the information data. When the information data are written, the information data storage unit 172 writes the information data fed from the priority information extract unit 171 to the address fed from the address controller 173. When the information data are read out, the information data storage unit 172 reads out the information data of the address fed from the address controller 173 and outputs them to the outside.

Figure 70:
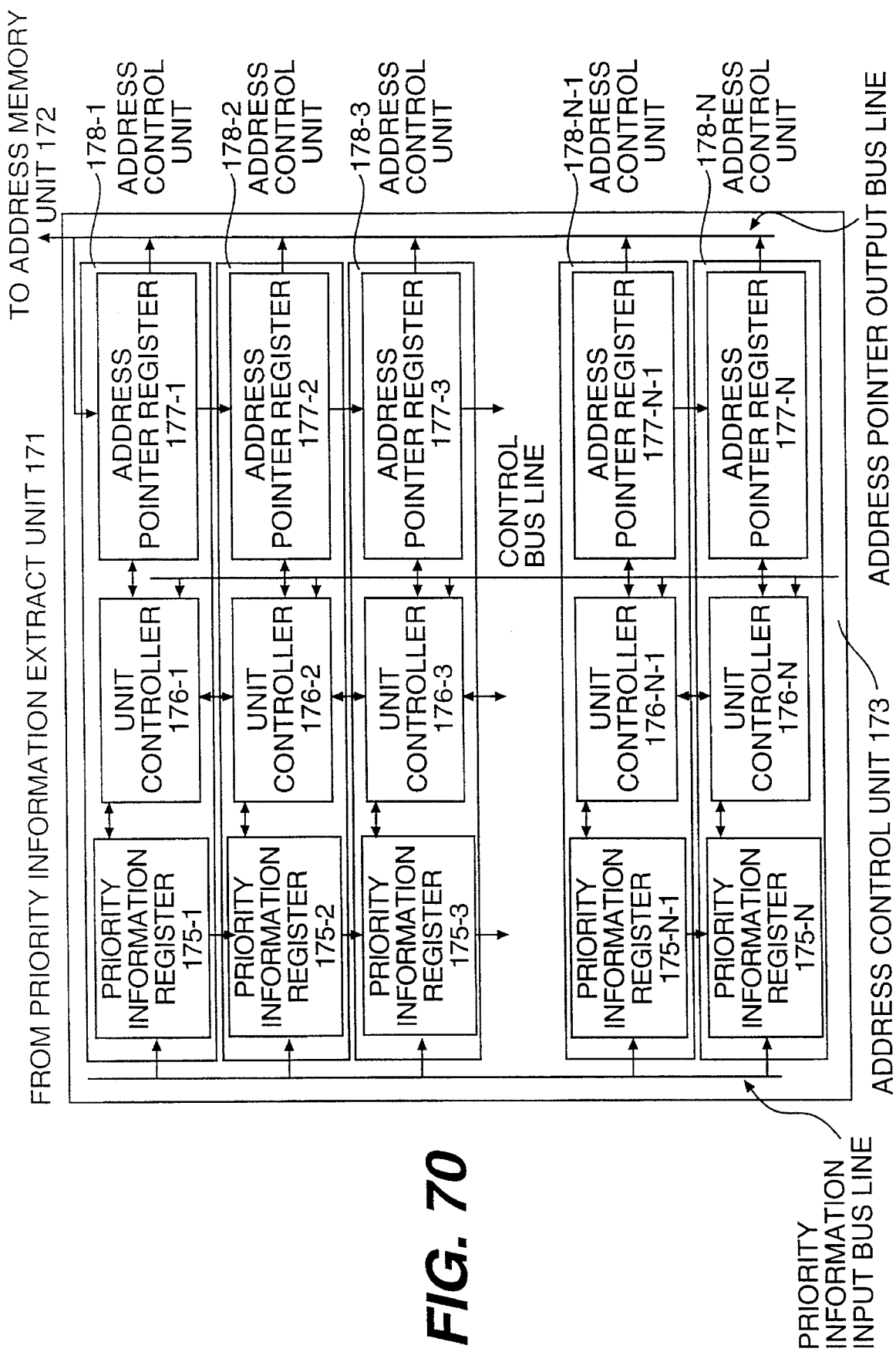
FIG. 70 is a diagram showing a structure of the address controller shown in FIG. 69.
Figure 71:
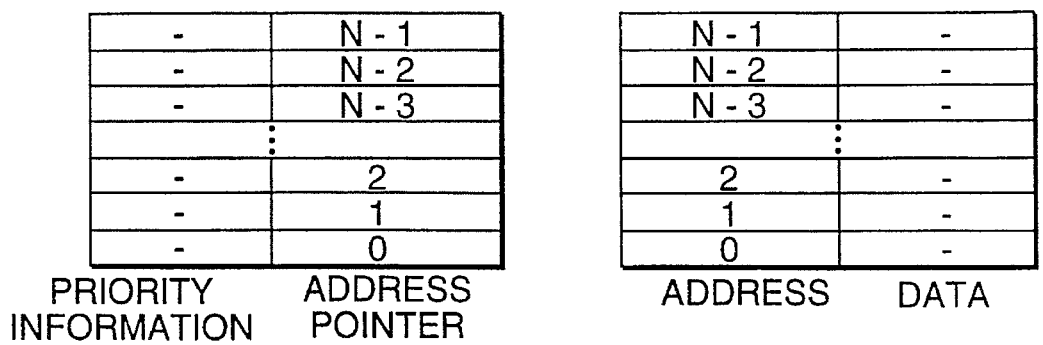
FIG. 71 is a diagram showing an example (initial condition) of the operation shown in FIG. 69.
Figure 72A:
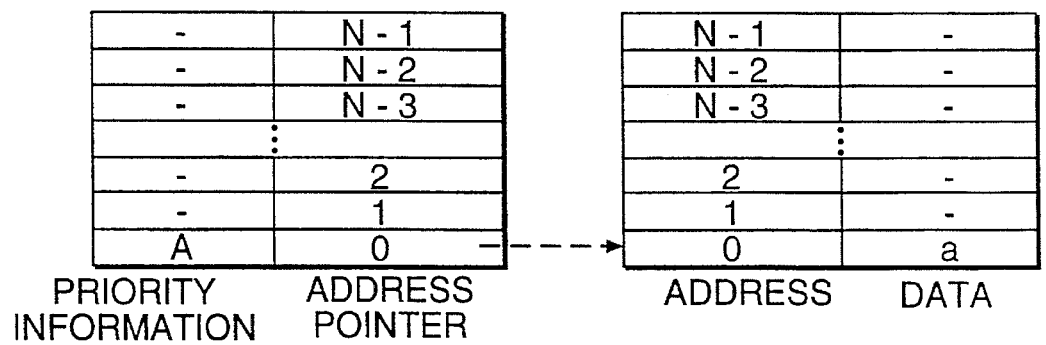
FIGS. 72(a), 72(b) and 72(c) are diagrams showing an example (write) of the operation shown in FIG. 69.

The structure of the address controller 173 is shown in FIG. 70. The address controller 173 is formed by connecting in series the address controller units 178-1 to 178-N composed of the priority information registers 175-1 to 175-N, the address pointer registers 177-1 to 177-N, and the unit controllers 176-1 to 176-N. In the address controller 173, the positions of the address controller units 178-1 to 178-N mean the arrival order of the information data. In the example shown in FIG. 70, the lower the unit, the older the information data. Namely, since the priority information registers 175-1 to 175-N and the address pointer registers 177-1 to 177-N are connected so as to shift downwardly, it is understood that the lower the unit, the older the information data. The priority information registers 175-1 to 175-N store the priority information fed from the priority information extract unit 171. The address pointer registers 177-1 to 177-N store the address including the information data. Each of the address pointer registers 177-1 to 177-N is initialized to correspond to the address of the information data storage unit 172 in one-to-one relation in the initial condition. For instance, in the case where the addresses where the information data are stored 0 to N-1, the values of the address pointer registers 177-1 to 177-N are initialized to 0 to N-1, respectively. The unit controllers 176-1 to 176-N control the write operation and output operation of the priority information registers 175-1 to 175-N and the address pointer registers 177-1 to 177-N on the basis of the control information fed from the controller 4. The operation of the address controller 173 will be explained. It is assumed that the address data storage unit 172 has linear address spaces of 0, 1, 2, ..., N-1 where N is the number of the cells which may be stored in the information data storage unit 172. It is herein assumed that the address controller 173 is initialized as shown in FIG. 71. In the example shown in FIG. 71, "–" means that the content is unstable. In the initial condition, since the cells are unstable, all the cells are indicated by "–". In the example shown in FIG. 71, the values of the address pointer registers are stored in good order as 0, 1, 2, ..., N-1 from below. Any order relation may be used if the addresses of the information data storage unit 172 are in one-to-one relation with the values of the address pointer registers. The operation of outputting the write addresses will be explained. For example, the operation will be explained in the case where data a having the priority information having a value A are input from the initial condition, data b having the priority information having a value B are input, and thereafter data c having the priority information having a value A are input. First of all, the operation will be explained in the case where the data a having the priority information A is input. The priority information A is transferred from the priority information extract unit 171 to the address controller 173. The priority information fed to the address controller 173 is shifted and written from the bottom of the priority information registers. Since any priority information is not written in the initial condition, the input priority information is stored in the lowermost register. The value of the address pointer of the written unit is the write address of the data. Accordingly, the data a are stored in the address 0. The condition after the priority information and data have been written is shown in FIG. 72(a).

Figure 72B:
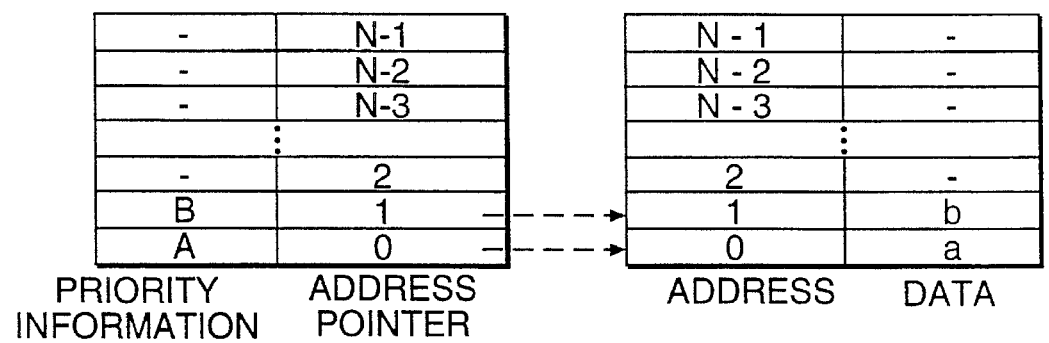

Next, the operation will be explained in the case where the data b having the priority information B is input. The priority information B is transferred to the address controller 173 and is stored in the lowermost vacant unit where the priority information is not stored. In this case, since one priority information has been already written in the address controller 173, the input priority information B is stored in the second lowest register from the bottom. The data b are written in the address indicated by the address pointer register of this unit, i.e., in the address 1. The condition after the priority information and data have been written is shown in FIG. 72(b).

Figure 72C:
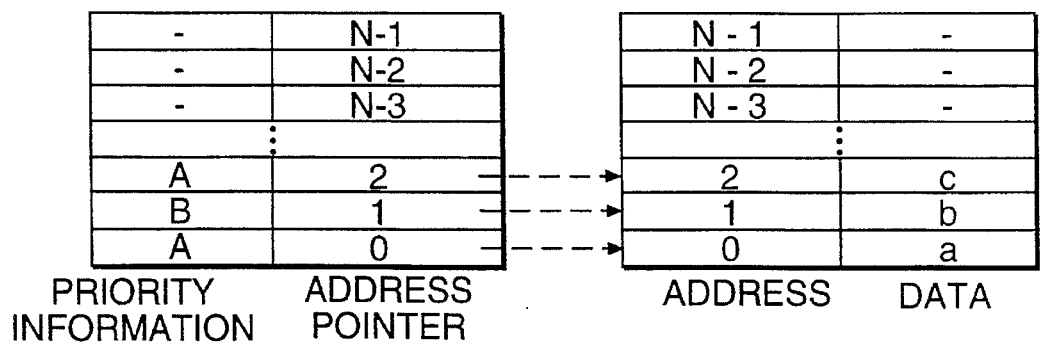

Next, the operation will be explained in the case where the data c having the priority information A is input. The priority information A is transferred to the address controller 173 and is stored in the lowermost vacant unit where the priority information is not stored. Since two pieces of priority information have been already written in the address controller 173, the input priority information A is stored in the third lowest register from the bottom. The data c are written in the address indicated by the address pointer register of this unit, i.e., in the address 2. The condition after the priority information and data have been written is shown in FIG. 72(c).

Figure 73A:
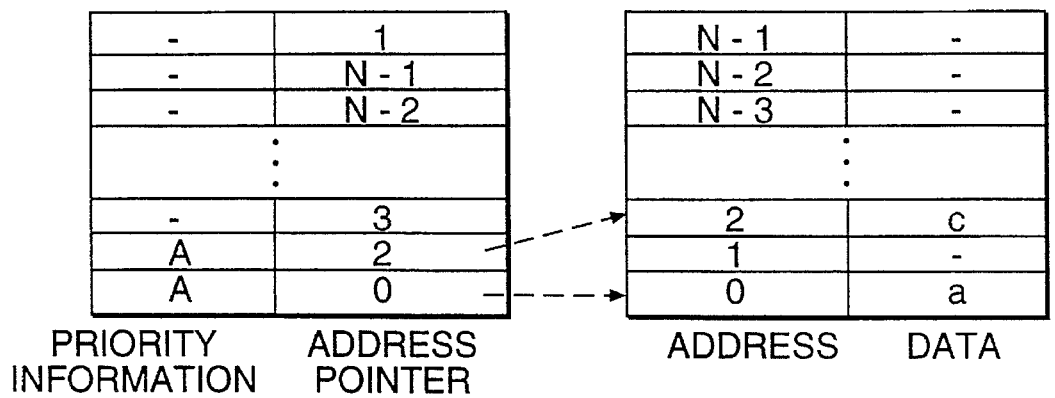
FIGS. 73(a), 73(b) and 73(c) are diagrams showing an example (read) of the operation shown in FIG. 69.

Next, the operation upon outputting the read address will be explained. For instance, the data having the priority information B are output from the condition shown in FIG. 72(c), next, the data having the value A of the priority information are input, and thereafter, the data having the value A of the priority information are output. In the condition shown in FIG. 72(c), the data of the data a and the priority information A are stored in the lowermost unit, the data of the data b and the priority information B are stored in the second unit from the bottom, and the data of the data c and the priority information A are stored in the third unit from the bottom. In the data output, the oldest data in the data having the same priority information are output. The older information is stored in the lower unit in the drawings in the address controller 173. First of all, the operation will be explained in the case where the data of the priority information B are output. When the data of the priority information B are output, the data having the information B in the stored data are the data stored in the second unit from the bottom of the address controller 173. Accordingly, the address controller 173 transfers the value 1 of the second address pointer from the bottom to the information data storage unit 172. The information data storage unit 172 outputs the data b stored in the fed address. In the address controller 173, the priority information corresponding to the output data is nullified, and the newer priority information that the nullified priority information is shifted thereto. In the address pointer, in the same manner as in the priority information, the value of the address pointer after the output address pointer is shifted, and the value of the nullified and output address pointer is input in the uppermost one. Accordingly, after the data having the priority information B have been output, the content of the address controller 173 is changed in order so that the value of 1 which has been located in the second unit from the bottom as shown in FIG. 73(a) is input into the uppermost unit, the value of 3 which has been located in the third unit from the bottom is input into the second unit from the bottom, and the value of 4 which has been located in the fourth unit from the bottom is input into the third unit from the bottom.

Figure 73B:
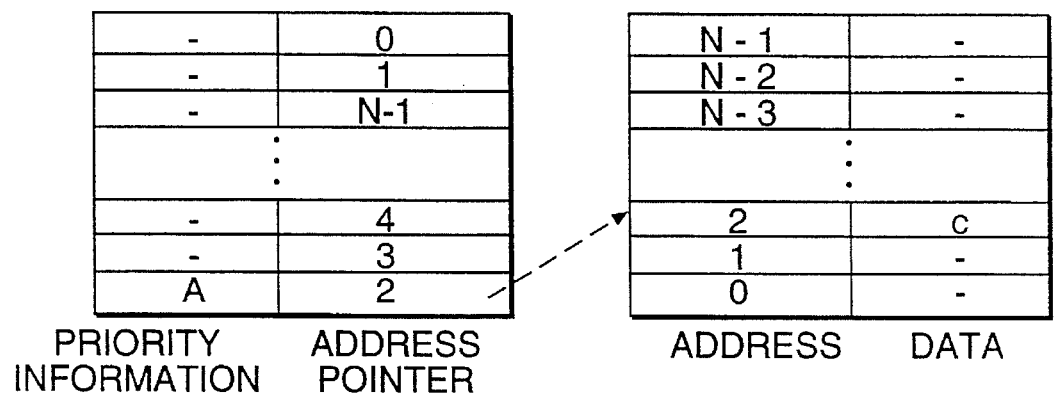
Figure 73C:
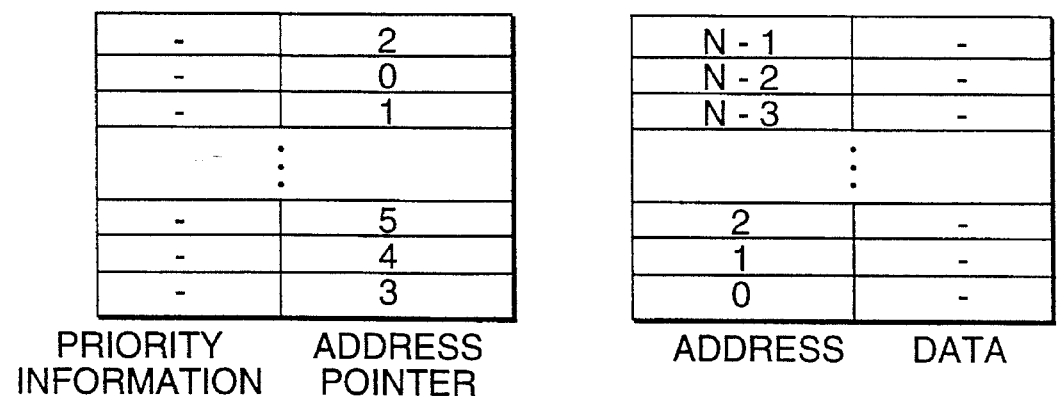

Next, the operation will be explained in the case where the data having the priority information A are output. Since the data having the priority information B have been output, the contents of the address controller 173 and the information data storage unit 172 are arranged as shown in FIG. 73(*a*). Namely, the priority information A (corresponding to the data a) are stored in the lowermost unit, and the priority information A (corresponding to the data c) are stored in the second unit from the bottom. When the data having the priority information A are output from this condition, the unit having the priority information A is searched from the bottom to the top. In this case, the units having the priority information A are the first unit and the second unit from the bottom but since the lower priority information, i.e., the older priority information is selected, the lowermost unit is selected. The value of 0 of the address pointer of the lowermost unit is transferred from the address controller 173 to the information data storage unit 172. The information data storage unit 172 outputs the data a stored in the address 0. With respect to the priority information, the content of the unit corresponding to the output data is nullified, and the priority information located above that unit is shifted. With respect to the address pointer, the content of the unit after that unit is shifted, the content of the corresponding unit is stored in the uppermost unit. Accordingly, after the data of the priority information A have been output, the contents thereof are changed as shown in FIG. 73(*b*). Next, the operation will be explained in the case where the data having the priority information A are output. Since the data having the priority information B have been output, the contents of the address controller 173 and the information data storage unit 172 are arranged as shown in FIG. 73(*b*). When the data having the priority information A are output from this condition, the unit having the priority information A is searched from the bottom to the top. In this case, the units having the priority information A is the first unit from the bottom and this unit is selected. The value of 2 of the address pointer of the lowermost unit is transferred from the address controller 173 to the information data storage unit 172. The information data storage unit 172 outputs the data a stored in the address 2. With respect to the priority information, the content of the unit corresponding to the output data is nullified, and the priority information located above that unit is shifted. With respect to the address pointer, the content of the unit after that unit is shifted, the content of the corresponding unit is stored in the uppermost unit. Accordingly, after the data of the priority information A have been output, the contents thereof are changed as shown in FIG. 73(*c*).

Figure 74:
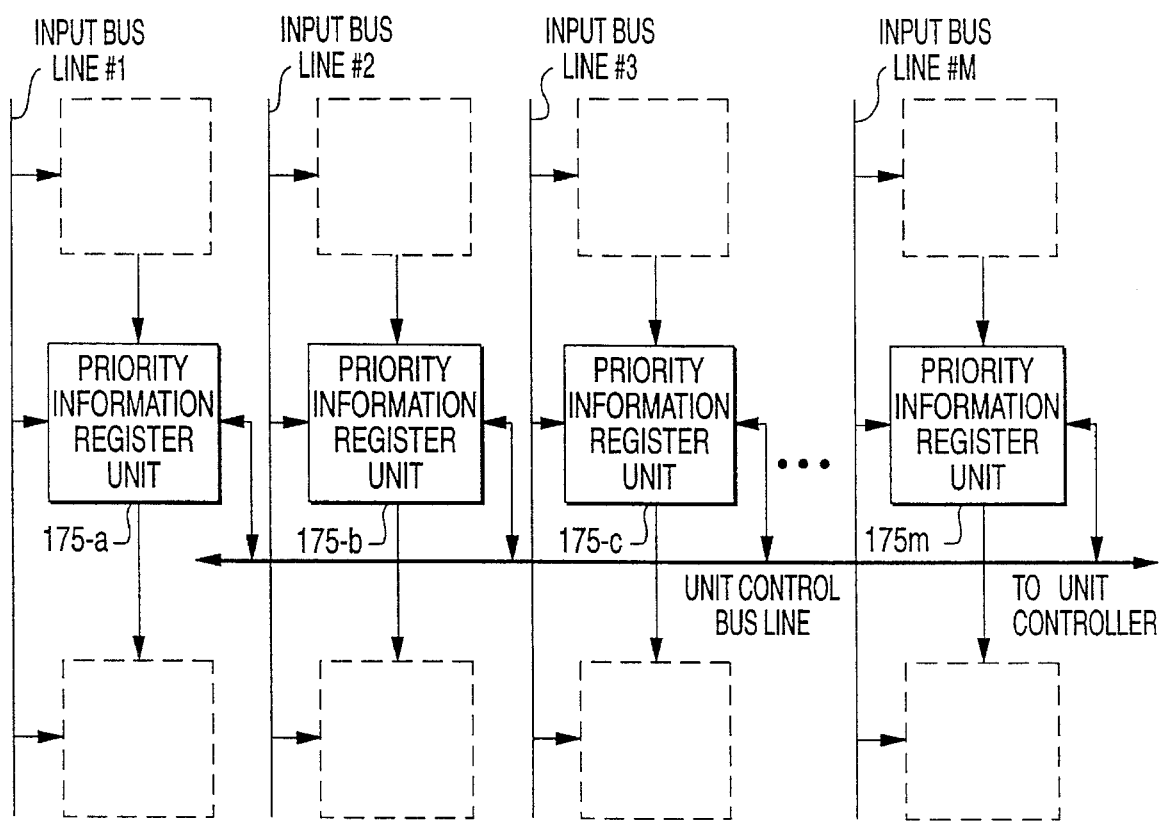
FIG. 74 is a diagram showing a structure of the priority information register shown in FIG. 69.
Figure 75:
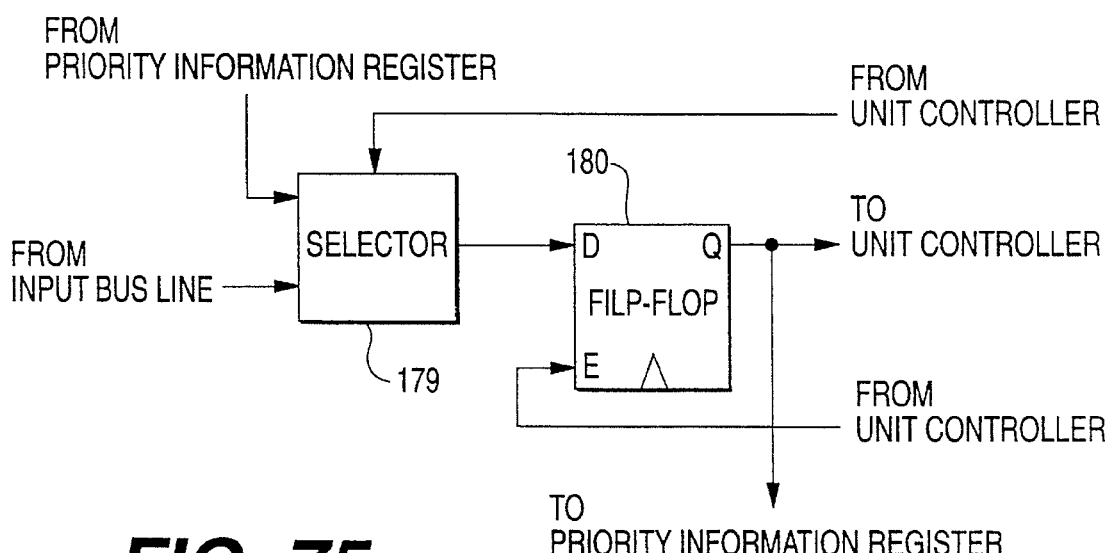
FIG. 75 is a diagram showing a structure of the priority information register unit shown in FIG. 69.

The structure of the priority information register will now be described. The structure of the priority register is shown in FIG. 74. Each priority information register 175-1, . . . , 175-N is constituted by arranging a number (M) of priority information register units 175*a*, . . . , 175*m* shown in FIG. 75. Assuming that Np is the kind of the priority information, the information needed for identify the priority information is Np+1 where 1 is used for identifying the existence of the data. Accordingly, the register length of the priority information register is needed to be $\log_2(Np+1)$ bits or more. An example where the priority information is encoded into $\log_2(Np+1)$ bits will be explained below. In this case, the value of M is $\log_2(Np+1)$ bits. The case where the kinds of the priority information are three, i.e., A, B and C. Two bits are required to identify the four factors such that the priority information is A, the priority information is B, the priority information is C, and the data are present. A method of encoding is to encode, for example, like A:01, B:10, C:11 and the existence of data:00. In order to identify the existence of the data, if all bits 0 are allotted, it is advantageous to make simple the circuit for detecting the existence of the data. In this case, the logic adder circuit may be used for detecting the existence of the data. Also, another method is to use the registers of Np+1 without encoding the priority information. In this case, the value of M is Np+1. For instance, if the kinds of the priority information are three, i.e., A, B and C, the four-bit register is used. In this method, one bit is used for identifying the information A, one bit is used for identifying the information B, one bit is used for identifying the information C, and one bit is used for identifying the existence of the data. A, B, C and existence of the data are allotted in the first bit from the left, in the second bit from the left, in the third bit from the left and the first bit from the right, respectively. In the case where the bit is allotted as 1 when each of the information is stored, and the bit is allotted as 0 when each of the information is not stored, the bit patten showing that the priority information is A is 1001, the bit patten showing that the priority information is B is 0101, the bit patten showing that the priority information is C is 0011, and the bit pattern showing that the data are not present is 0000. According to this method, in the case where the data are present, the bit of 1 is present always anywhere in the bits up to the third bit from the left. Accordingly, it is possible to dispense with the bit which shows the existence of the data. In the case there the bit showing the existence of the data is dispensed with, the value of M in FIG. 74 is Np. The detection of the existence of the data may be obtained by calculating the logic sum of each bit. It is possible to detect that if the logic sum is 1, the data are present, and if the logic sum is zero, the data are not present. In the case where the bit showing the existence of the data is used, it is advantageous to dispense with the circuit for detecting the data existence, and to save the processing time for the detection. In the case where the bit showing the existence of the data is not used, it is advantageous to dispense with the register showing the data existence and to make compact the scale of the hardware. Also, in the case where the priority information is encoded, it is advantageous to make short the register length for storing the priority information. In the case where the priority information is not encoded, it is advantageous to allot a plurality of pieces of priority information to a single datum. The priority information register unit is, as shown in FIG. 75, composed of a selector 179 and a flip-flop circuit 180. The selector switches the signal from the input bus line and the signal from the adjacent priority information register in accordance with the instruction of the unit controller. The flip-flop circuit stores the signal switched by the selector in accordance with the unit controller. The selector is instructed to output the signal from the input bus line in data input. Also, the flip-flop write signal is "write enable" when the data have been written in the priority information register before the unit of interest (lower side in FIG. 70) and the information has not yet been written in the unit of interest. The selector is instructed to output the signal from the priority information register of the adjacent unit (upper unit in FIG. 70) upon the data output. The flip-flop write signal is "write enable" when the unit before that unit (lower unit in FIG. 70) or the unit of interest itself has been detected.

Figure 76:
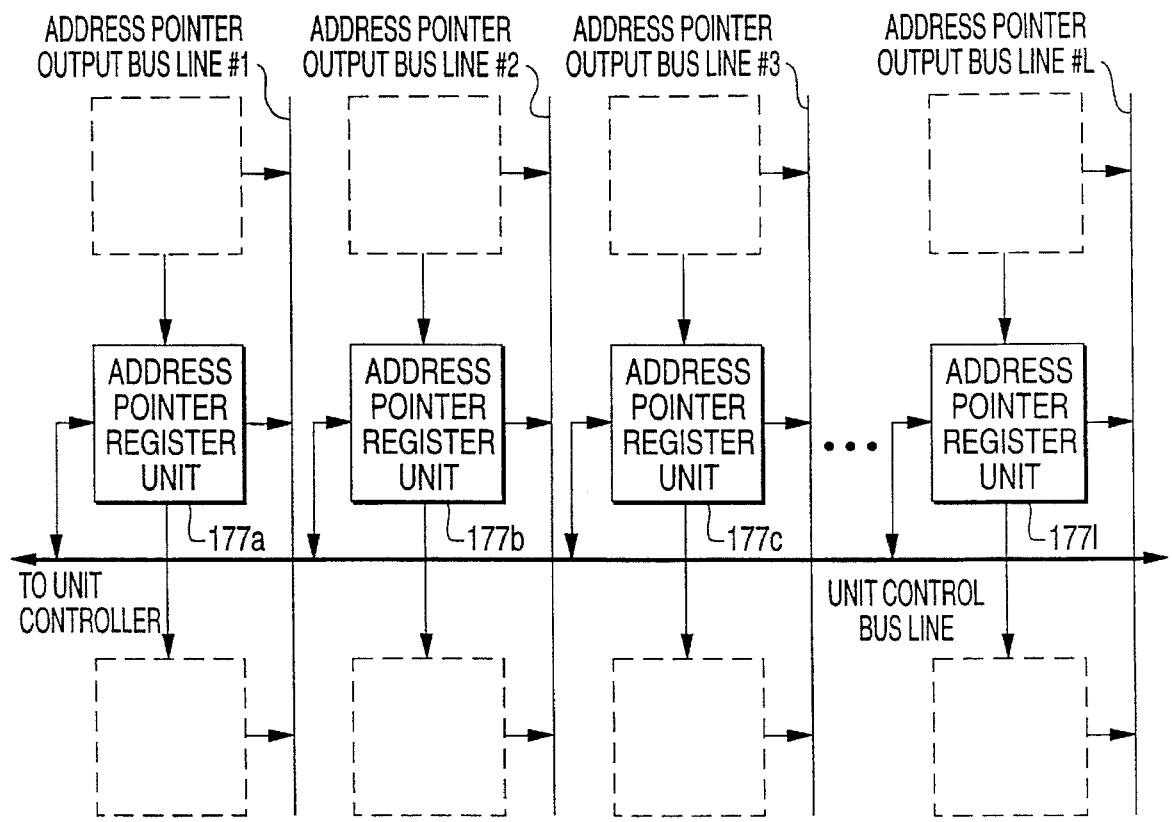
FIG. 76 is a diagram showing a structure of the address pointer register shown in FIG. 69.
Figure 77:
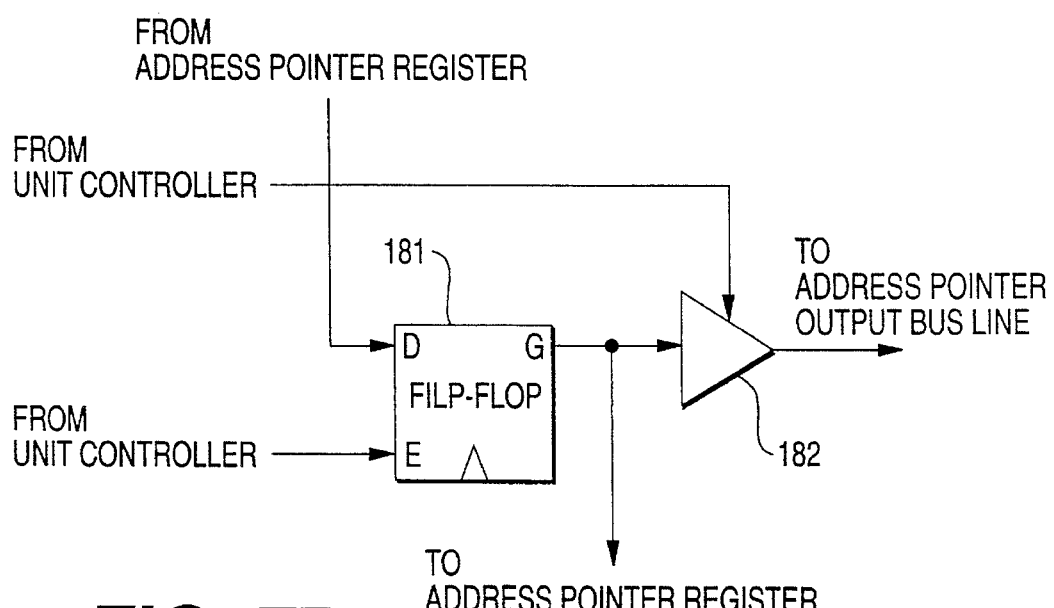
FIG. 77 is a diagram showing a structure of the address pointer register unit shown in FIG. 69.

The structure of the address pointer register will next be explained. The structure of the address pointer register is shown in FIG. 76. The address pointer registers are a number (L) of address pointer register units 177a, 177b, . . . , 177l arranged as shown in FIG. 77. If the size of the address space of the information data storage unit 172 is N, the value of L is $\log_2 N$. The address pointer register units 177a, 177b, . . . , 177l are composed of flip-flop circuits 181 for storing the values of the addresses and tristate buffers 182 for controlling the output of the values of the addresses to the address pointer output bus line. The write to the flip-flop circuit 181 and output control of the tristate buffer 182 are carried out by the unit controller. The write to the flip-flop circuit is carried out when the cell indicated by the address pointer of the unit older than the unit (including the unit of interest) in the cell output is output. The output enablement of the tristate buffer 182 is executed when the corresponding unit of interest is searched upon the cell input and output.

Figure 78:
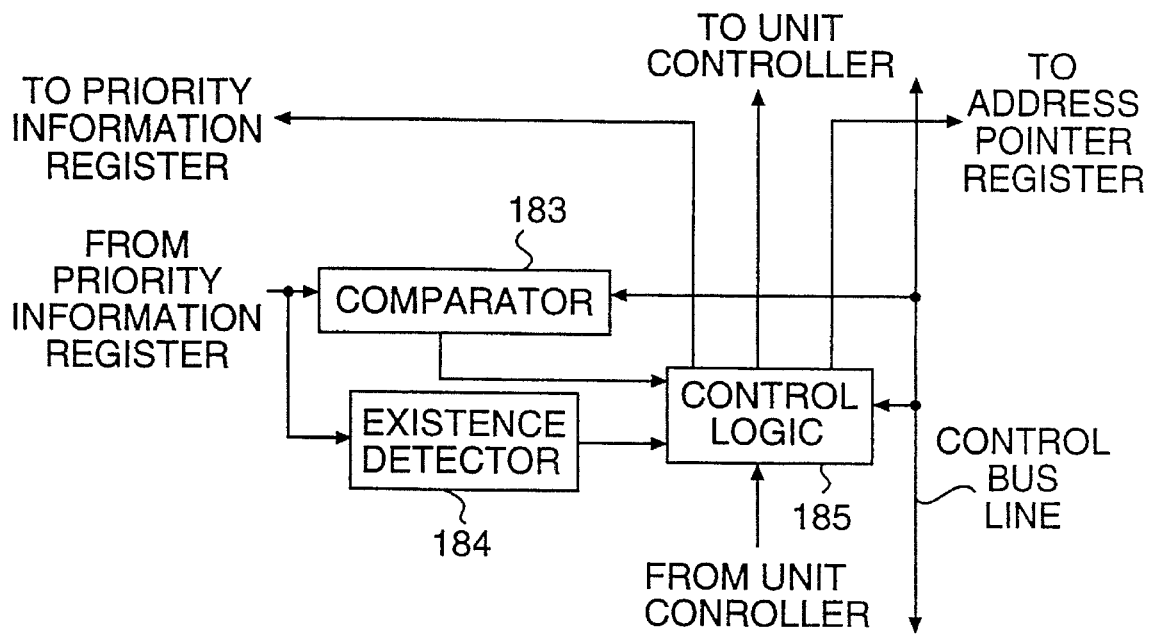
FIG. 78 is a diagram showing a structure of the unit controller shown in FIG. 69.
Figure 79:
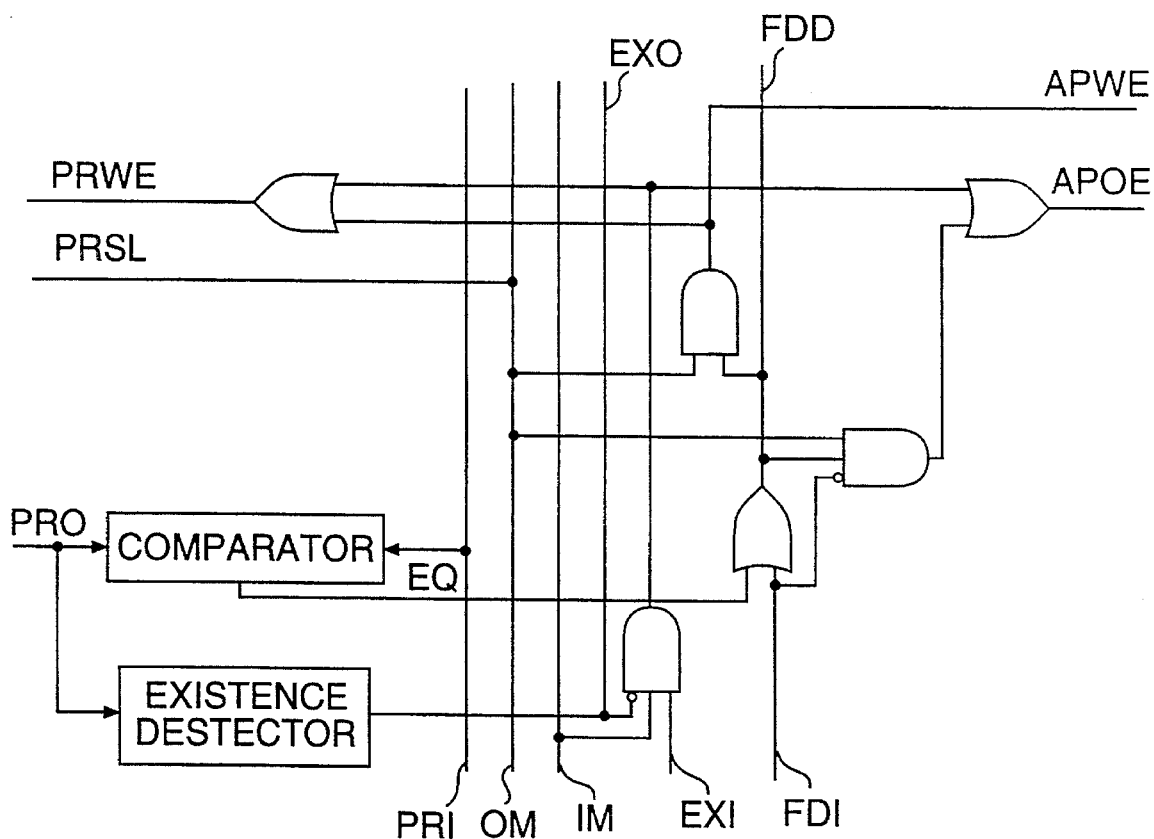
FIG. 79 is another diagram showing a structure of the unit controller shown in FIG. 69.

Next, the structure of each unit controller 176-1, . . . , 176-N is shown in FIG. 78. Each unit controller 176-1, . . . , 176-N is composed of a comparator 183 for comparing the priority information of the priority control register and the priority information to be output with each other, an existence detector 184 for detecting whether or not the data are stored in the address of the unit of interest, and an arithmetic controller 185 for producing control information of the priority control register and the address pointer register and information to the next unit from the information fed from the comparator 183, the existence detector 184, the control bus line and the adjacent unit. If such a coding method described with respect to the priority information is used, it is possible to realize the existence detector 184 with the logic adder circuit. The arithmetic circuit operation will be explained. In the data input, in the case where the data are stored in the address corresponding to the unit before the unit of interest and the data are not stored in the address corresponding to the unit of interest, the priority information is written in the priority information register from the input bus line, and the value of the address pointer register is output to the address pointer output bus line. In the data output, the value of the priority information to be output is compared with the value of the priority information stored in the priority information register, and if these pieces of information are identical with each other, and the information is not detected in the unit before the unit of interest, the value stored in the address pointer register is output to the address pointer output bus line. Also, if the value is detected in the unit of interest or the unit before that unit, the shift operation is effected to the address pointer register and the priority information register. An example of the detailed structure of the unit controller for realizing these operations is shown in FIG. 79 where PRWE is the write enable signal of the priority information, PRSL is the input switching signal of the priority information registers, PRO is the value of the priority information register, APWE is the write enable signal for the address pointer register, APOE is the output enable signal for the address pointer register, PRI is the value of the priority information to be output, OM is the signal representative of the output mode, IM is the signal representative of the input mode, SM is the signal representative of the shift mode, EXI is the signal representative of the fact that the data are stored in the address corresponding to the lower unit, EXO is the signal representative of the fact that the data are stored in the address corresponding to the unit of interest, FDI is the signal representative of the fact that the priority information to be output prior to the unit of interest is detected, FDD is the signal representative of the fact that the priority information to be output prior to the unit of interest or the unit of interest is detected, and EQ is the signal showing the fact that the priority information of the unit of interest is identical with the priority information to be output.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A packet switch for storing and switching a plurality of packets for routing to different output ports, comprising:

storage means for storing at least information data obtained, respectively, from the packets which include routing tags, the packets being received from a plurality of different input ports:

a plurality of routing tag storage means for storing each routing tag of each received packet, in an input order in which the packets are received;

a plurality of address information storage means, respectively corresponding to said plurality of routing tag storage means, for storing address information identifying storage regions of said storage means respectively storing information data corresponding to said routing tags stored in said routing tag storage means;

and control means for controlling a search of each of said plurality of routing tag storage means in the input order of the packets;

said address information storage means corresponding to said routing tag storage means storing the routing tags corresponding to a currently processed output port to read out said address information stored therein;

said storage means identified by said address information to output to the currently processed output port information data stored in the storage region thereof; and said routing tag storage means and said address information storage means to shift the contents therein and to reposition the routing tag and the address information corresponding to information data that have been output.

2. The packet switch according to claim 1, wherein said packets have a fixed information length.

3. The packet switch according to claim 1, wherein said plurality of routing tag storage means and said plurality of address information storage means are composed of shift registers to which each of said routing tag storage means and said address information means are connected.

4. The packet switch according to claim 1, wherein the routing tag stored in each of said routing tag storage means is composed of bit information at least corresponding to a number of the output ports, and each of said routing tag storage means is so constructed that the bit information at least corresponding to the number of said output ports has bit information region where the bit information may be stored for storing the routing tag for each of said output ports.

5. The packet switch according to claim 4, wherein each of said routing tag storage means is composed of a comparison section for comparing each of said bit information with the information input from said control means to search the routing tag for said special output pert from said control means, and an identifying section for identifying whether the routing tag for each of said output ports is stored as each of said bit information.

6. The packet switch according to claim 1, wherein each of said routing tag storage means is composed of a selecting section for selecting one out of the routing tags shifted to next routing tag storage means in order from said routing tag storage means corresponding to the routing tag obtained from each of said packets or at least information data output to said special output port; and a routing tag storage means for storing the selected routing tag.

7. The packet switch according to claim 1, further comprising a plurality of stay length counters for counting a time from a moment when said routing tag is stored in each of said routing tag storage means corresponding to each of said address storage means, wherein said control means controls compares predetermined time information with a value of each of said stay length counters, and shifts, if the value of each of said stay length counters is larger than said predetermined time information, contents of said routing tag storage means and said address information storage means corresponding to said time counter, to next routing tag storage means and address information storage means in order, and as a result, storing the address information read out into the address information means of vacant routing tag storage means and address information storing means.

8. A packet switch for storing and switching a plurality of packets for routing to different output ports, comprising:

a plurality of input ports for receiving the respective packets each including information data and a routing tag multiplexer means for multiplexing each of said packets input from said plurality of input ports;

storage means for storing at least information data obtained, respectively, from the packets multiplexed by said multiplexer means;

a plurality of routing tag storage means for storing each routing tag of each received packet in an input order in which the packets are received;

a plurality of address information storage means respectively corresponding to said plurality of routing tag storage means, for storing address information identifying storage regions of said storage means respectively storing information data corresponding to said routing tags stored in said routing tag storage means;

control means for controlling:

a search of each of said plurality of routing tag storage means in the input order of the packets;

said address information storage means corresponding to said routing tag storage means storing the routing tags corresponding to a currently processed output port to read out said address information stored therein;

said storage means identified by said address information to output the currently processed output port information data stored in the storage region thereof;

said routing tag storage means and said address information storage means to shift the contents therein and to reposition the routing tag and the address information corresponding to information data that have been output; and demultiplexer means for demultiplexing and outputting at least information data read out by said control means to the currently processed output port.

9. The packet switch according to claim 8, wherein said packets have a fixed information length.

10. The packet switch according to claim 8, wherein said plurality of routing tag storage means and said plurality of address information storage means are composed of shift registers to switch each of said routing tag storage means and said address information means are connected.

11. The packet switch according to claim 8, wherein the routing tag stored in each of said routing tag storage means is composed of bit information at least corresponding to a number of the output ports, and each of said routing tag storage means is so constructed that the bit information at least corresponding to the number of said output ports has bit information region where the bit information may be stored for storing the routing tag for each of said output ports.

12. The packet switch according to claim 11, wherein each routing tag storage means is composed of a comparison section for comparing each of said bit information with the information input from said control means for searching the routing tag for said special output port from said control means, and an identifying section for identifying whether the routing tag for each of said output ports is stored as each of said bit information.

13. The packet switch according to claim 12, wherein each of said routing tag storage means is composed of a selecting section for selecting one of the routing tags shifted to a next routing tag storage means in order from said routing tag storage means corresponding to the routing tag obtained from each of said packets or at least information data output to said special output port; and a routing tag storage means for storing the selected routing tag.

14. The packet switch according to claim 8, further comprising a plurality of stay length counters for counting a time from a moment when said routing tag is stored in each of said routing tag storage means corresponding to each of said address storage means, wherein said control means controls compares predetermined time information with a value of each of said stay length counters, and shifts, if the value of each of said stay length counters is larger than said predetermined time information, contents of said routing tag storage means and said address information storage means corresponding to said time counter, to next routing tag storage means and address information storage means in order, and as a result, storing the address information read out into the address information means of vacant routing tag storage means and address information storing means.

15. A buffer memory comprising:

storage means for storing at least information data obtained, respectively, from information data having routing tags included therewith;

a plurality of routing tag storage means for storing each routing tag of each received information data, in an input order in which the information datas are received;

a plurality of address information storage means, respectively corresponding to said plurality of routing tag storage means, for storing address information identifying storage regions of said storage means respectively storing information data corresponding to said routing tags stored in said routing tag storage means; and control means for controlling:

a search of each of said plurality of routing tag storage means in the input order of the packets;

said address information storage means corresponding to said routing tag storage means storing the current routing tag to read out said address information stored therein;

said storage means identified by said address information to read out the currently processed routing tag information data stored in the storage region thereof; and said routing tag storage means and said address information storage means to shift the contents thereof and to reposition the routing tag and the address information corresponding to information data that have been read out.

16. The buffer memory according to claim 15, wherein said plurality of routing tag storage means and said plurality of address information storage means are composed of shift registers to which each of said routing tag storage means said address information means are connected.

17. The buffer memory according to claim 15, wherein the routing tag stored in each of said routing tag storage means is composed of bit information at least corresponding to a number of the output ports, and each of said routing tag storage means is so constructed that the bit information at least corresponding to the number of said output ports has a bit information region where the bit information may be stored for storing the routing tag.

18. A buffer memory comprising:

storage means for storing at least information data obtained, respectively, from information data having priority information associated therewith;

a plurality of priority information storage means for storing the priority information associated with said information data, in an order of input;

a plurality of address information storage means, respectively corresponding to said plurality of priority information storage means, for storing address information identifying storage regions of said storage means respectively storing information data corresponding to said priority information stored in said priority information storage means; and control means for controlling:

a search of each priority information storage means in the order that the pieces of priority information have been input;

said address information storage means corresponding to said priority information storage means storing a currently processed priority information to read out said address information stored therein;

said storage means identified by said address information to read out the currently processed priority information stored in the storage region thereof; and said priority information storage means and said address information storage means to shift the contents thereof and to reposition the priority information and the address information corresponding to information data that have been read out.

19. A method for controlling information data storage for a packet switch comprising storage means for storing at least information data obtained, respectively, from the packets composed of information data to which routing tags that have been input from a plurality of different input ports are given; a plurality of routing tag storage means connected for storing each routing tag obtained from each of said packets, in the order of input; a plurality of address information storage means provided in correspondence with said plurality of routing tag storage means, respectively, for storing address information representative of storage regions of said storage means where at least information data corresponding to said routing tags stored in each of said routing tag storage means are stored; and a plurality of output ports for outputting at least information data readout from said storage means, said method comprising the steps of:

(a) searching each of said routing tag storage means in the order that said routing tags have been input;

(b) reading out said address information stored in said address information storage means in correspondence with said routing tag storage means storing the routing tags corresponding to a special output port of said output ports;

(c) reading out at least information data stored in the storage region of said storage means indicated by said address information that has been read out;

(d) shifting storage contents of said routing tag storage means and said address information storage means stored in and after said routing tag storage means and said address information storage means in correspondence with at least said information data that have been output to said special output port, in order, to next routing tag storage means and address information storage means; and (e) as a result of the execution of said shifting, controlling storing the address information read out by said address information storage means into said routing tag storage means and address information storage means that are vacant.

20. A buffer control method for a buffer memory comprising storage means for storing at least information data obtained, respectively, from information data to which routing tags are given; a plurality of routing tag storage means connected for storing each routing tag obtained from each of information data, in the order of input; and a plurality of address information storage means provided in correspondence with said plurality of routing tag storage means, respectively, for storing address information representative of storage regions of said storage means where at least information data corresponding to said routing tags stored in each of said routing tag storage means are stored, said method comprising the steps of:

(a) searching each of said routing tag storage means in the order that said routing tags have been input;

(b) reading out said address information stored in said address information storage means in correspondence with said routing tag storage means storing special routing tags;

(c) reading out at least information data stored in the storage region of said storage means indicated by said address information;

(d) shifting storage contents of said routing tag storage means and said address information storage means stored in and after said routing tag storage means and said address information storage means in correspondence with at least said information data that have been read out in said reading out, in order, to next routing tag storage means and address information storage means; and (e) as a result of the execution of said shifting, controlling storing the address information read out by said address information storage means into said routing tag storage means and address information storage means that are vacant.

* * * * *